(12) United States Patent
Partovi

(10) Patent No.: US 10,141,770 B2
(45) Date of Patent: *Nov. 27, 2018

(54) POWERING AND/OR CHARGING WITH A PLURALITY OF PROTOCOLS

(71) Applicant: Mojo Mobility Inc., Santa Clara, CA (US)

(72) Inventor: Afshin Partovi, Palo Alto, CA (US)

(73) Assignee: Mojo Mobility, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,315

(22) Filed: Oct. 31, 2015

(65) Prior Publication Data

US 2016/0056664 A1 Feb. 25, 2016

Related U.S. Application Data

(63) Continuation-in-part of application No. 13/352,096, filed on Jan. 17, 2012, now Pat. No. 9,178,369.

(Continued)

(51) Int. Cl.
| | |
|---|---|
| *H02J 7/00* | (2006.01) |
| *H02J 7/02* | (2016.01) |
| *H02J 17/00* | (2006.01) |
| *H04B 5/00* | (2006.01) |
| *H02J 5/00* | (2016.01) |
| *B60L 11/18* | (2006.01) |
| *H01F 38/14* | (2006.01) |
| *H02J 50/12* | (2016.01) |

(Continued)

(52) U.S. Cl.
CPC ............ *H02J 7/025* (2013.01); *B60L 11/182* (2013.01); *H01F 38/14* (2013.01); *H02J 5/005* (2013.01); *H02J 7/0042* (2013.01); *H02J 17/00* (2013.01); *H02J 50/12* (2016.02); *H02J 50/50* (2016.02); *H02J 50/80* (2016.02); *H04B 5/0037* (2013.01); *H04B 5/0081* (2013.01); *B60L 2210/30* (2013.01); *B60L 2240/547* (2013.01); *H02J 7/0027* (2013.01); *Y02T 10/7005* (2013.01); *Y02T 10/7072* (2013.01); *Y02T 10/7241* (2013.01); *Y02T 90/122* (2013.01); *Y02T 90/127* (2013.01); *Y02T 90/14* (2013.01); *Y02T 90/16* (2013.01)

(58) Field of Classification Search
USPC .......................................... 320/108, 139, 150
See application file for complete search history.

(56) References Cited

U.S. PATENT DOCUMENTS 5,889,384 A * 3/1999 Hayes et al. .................. 320/108
8,069,100 B2 11/2011 Taylor et al.
(Continued)

*Primary Examiner* — Yalkew Fantu
(74) *Attorney, Agent, or Firm* — Louis Wu

(57) ABSTRACT

A system is descried for use in wireless charging or wireless powering. The system includes a base for wirelessly charging and/or wirelessly powering and a receiver capable of receiving electricity wirelessly from the base. The receiver is associated with a battery and/or device. The base and/or the receiver is capable of detecting and operating under a plurality of power protocols and/or a plurality of communicating protocols, thereby allowing the base to transfer electricity wirelessly to the battery and/or device in a manner consistent with a common communication and/or common power protocol shared between the base and the receiver.

20 Claims, 32 Drawing Sheets

Related U.S. Application Data

(60) Provisional application No. 61/433,883, filed on Jan. 18, 2011, provisional application No. 61/478,020, filed on Apr. 21, 2011, provisional application No. 61/546,316, filed on Oct. 12, 2011.

(51) Int. Cl.
*H02J 50/80* (2016.01)
*H02J 50/50* (2016.01)

(56) References Cited

U.S. PATENT DOCUMENTS

| | | |
|---|---|---|
| 8,234,189 B2 | 7/2012 | Taylor et al. |
| 2002/0089305 A1* | 7/2002 | Park et al. ................. 320/108 |
| 2004/0145342 A1* | 7/2004 | Lyon ...................... H02J 7/025 |
| | | 320/108 |
| 2007/0029965 A1* | 2/2007 | Hui .......................... 320/112 |
| 2007/0182367 A1* | 8/2007 | Partovi ..................... 320/108 |
| 2007/0279002 A1* | 12/2007 | Partovi ..................... 320/115 |
| 2009/0096413 A1* | 4/2009 | Partovi et al. ............ 320/108 |
| 2009/0174263 A1 | 7/2009 | Baarman et al. |
| 2009/0212637 A1 | 8/2009 | Baarman et al. |
| 2010/0171369 A1 | 7/2010 | Taylor et al. |
| 2010/0207771 A1* | 8/2010 | Trigiani ................... 340/636.1 |
| 2011/0187318 A1* | 8/2011 | Hui et al. .................. 320/108 |
| 2011/0221387 A1* | 9/2011 | Steigerwald et al. ..... 320/108 |
| 2011/0221391 A1* | 9/2011 | Won et al. ................. 320/108 |
| 2012/0041843 A1 | 2/2012 | Taylor et al. |
| 2012/0112552 A1 | 5/2012 | Baarman et al. |
| 2012/0119588 A1 | 5/2012 | Baarman et al. |
| 2012/0150670 A1 | 6/2012 | Taylor et al. |
| 2012/0259735 A1 | 10/2012 | Taylor et al. |
| 2014/0247004 A1* | 9/2014 | Kari ...................... H02J 5/005 |
| | | 320/106 |
| 2014/0339916 A1 | 11/2014 | Fells et al. |

\* cited by examiner

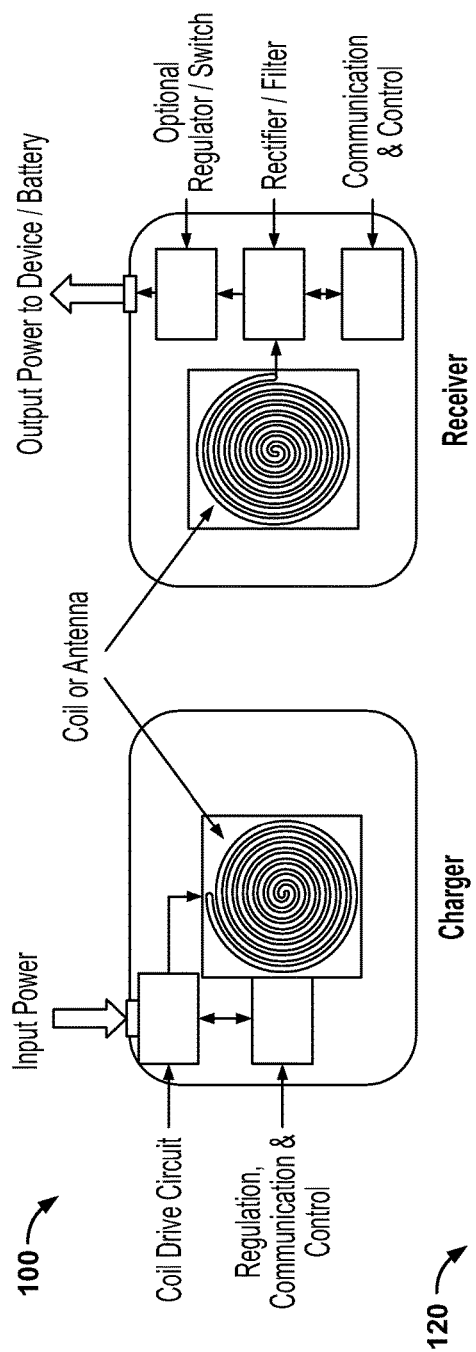
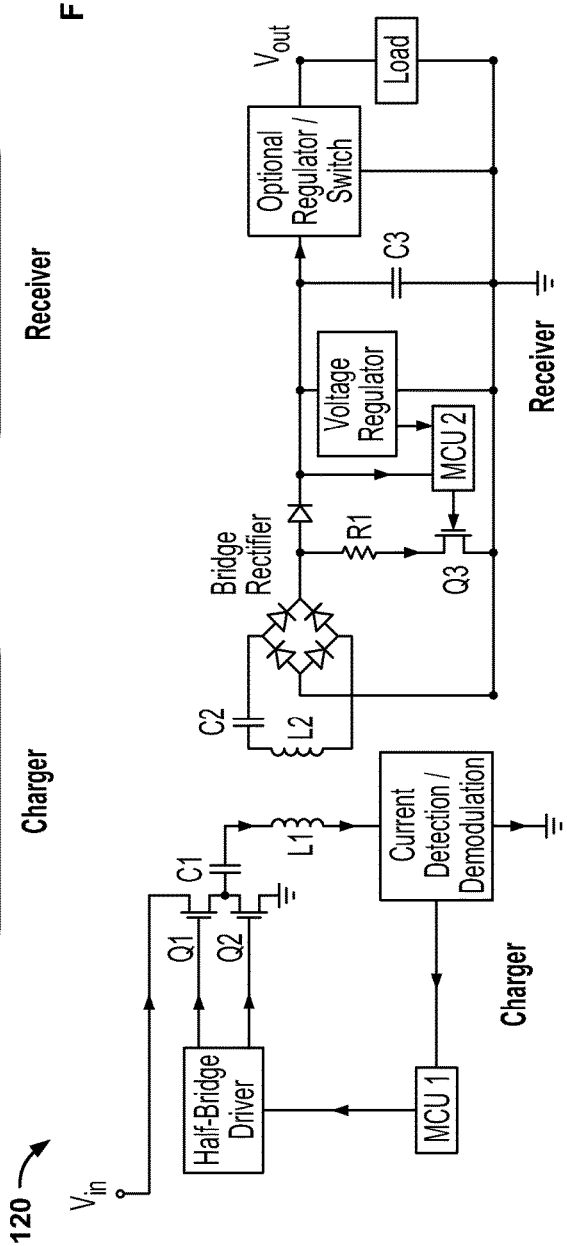
FIG. 1
FIG. 2

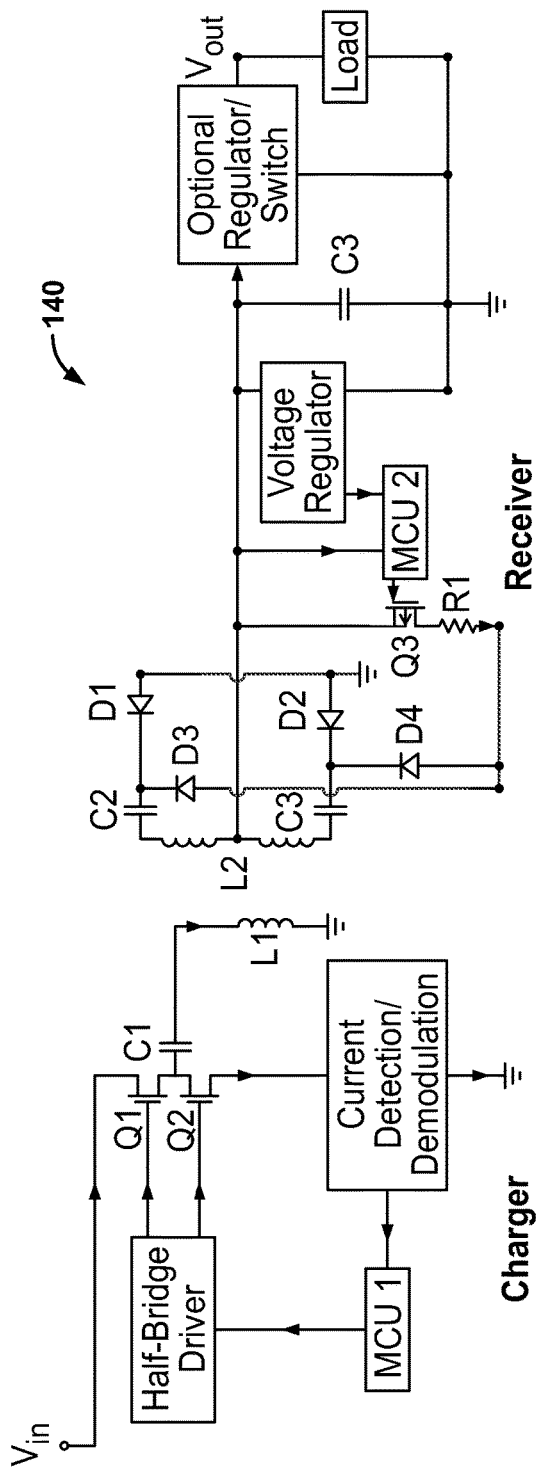
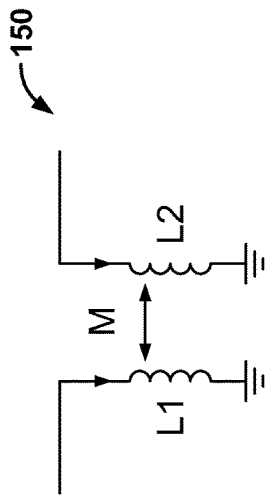
FIG. 4
FIG. 5

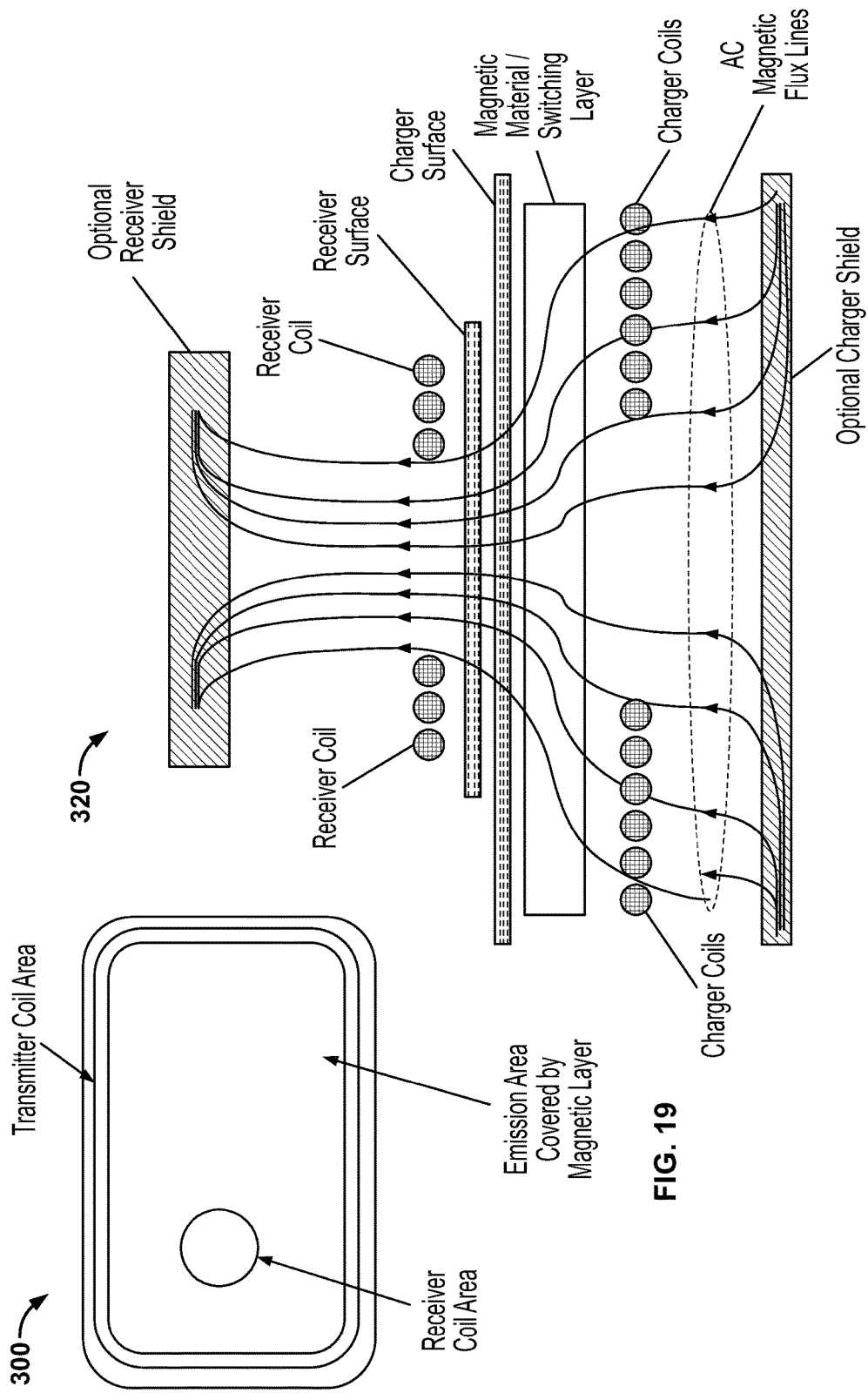

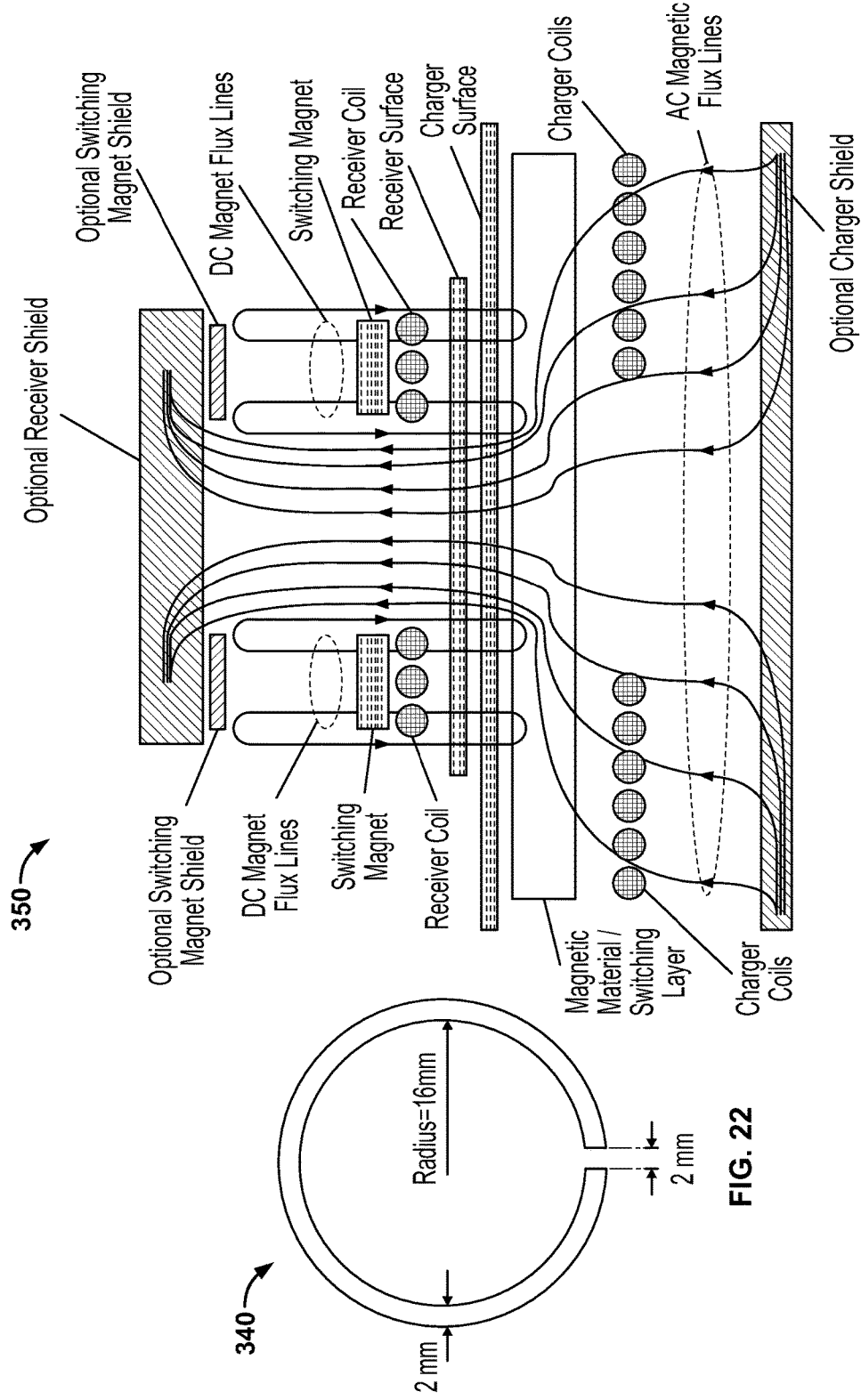

520

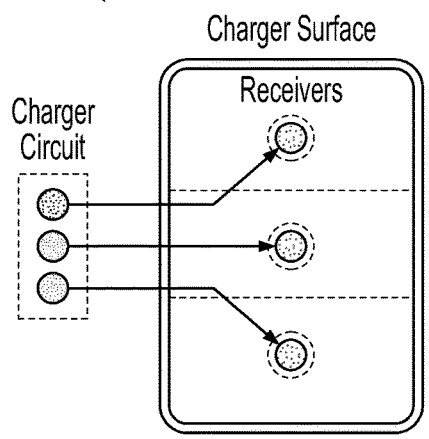

a-Single Protocol - Tightly Coupled:
One Charger Sub-unit per Single
Receiver in Fixed Position

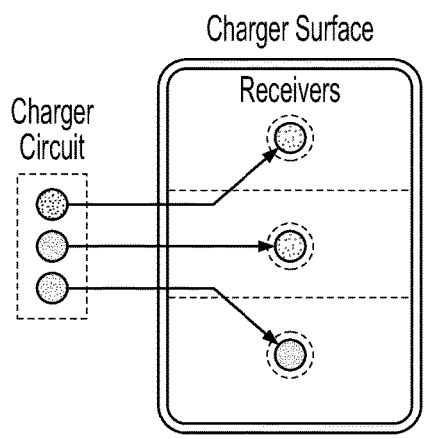

b-Multi-Protocol - Tightly Coupled:
One Charger Sub-unit per Single
Receiver in Fixed Position; Can be
Different Protocols, Voltages,
and / or Power Levels

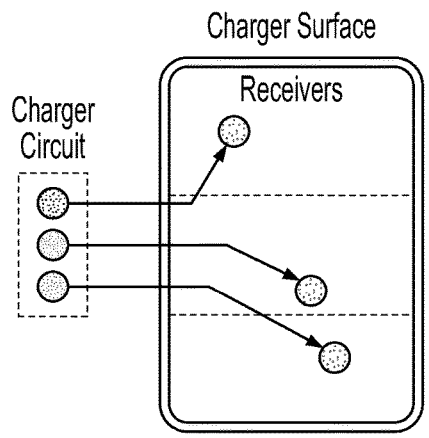

c-Single Protocol Geo-Cast:
One Charger Sub-unit per Pre-
Designated Section of Charger
Surface - Only Supports One
Protocol, Voltage,
and / or Power Level

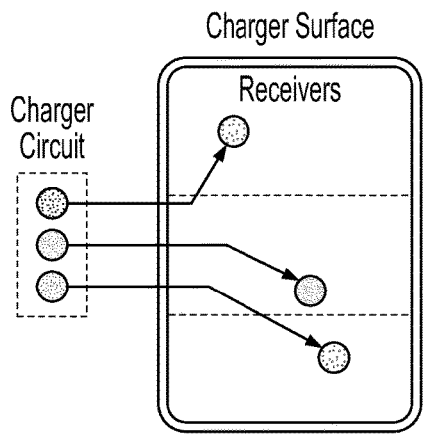

d-Multi-Protocol Geo-Cast:
One Charger Sub-unit per Pre-
Designated Section of Charger
Surface - Supports Multiple
Protocols, Voltages,
and / or Power Levels

FIG. 39

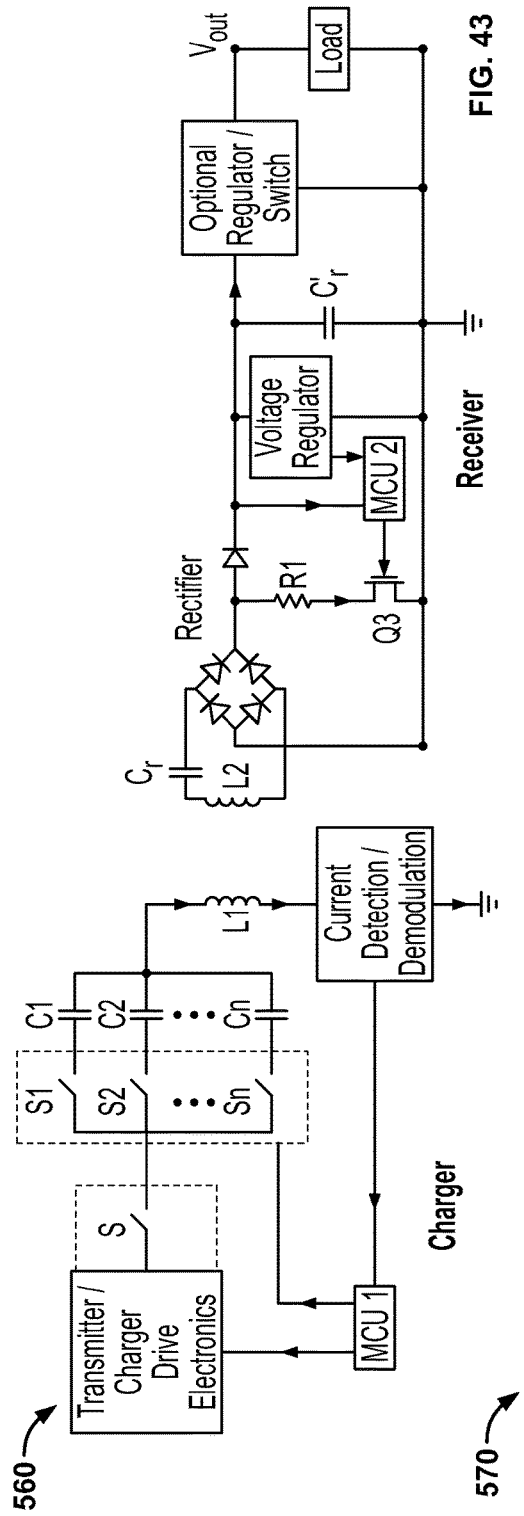
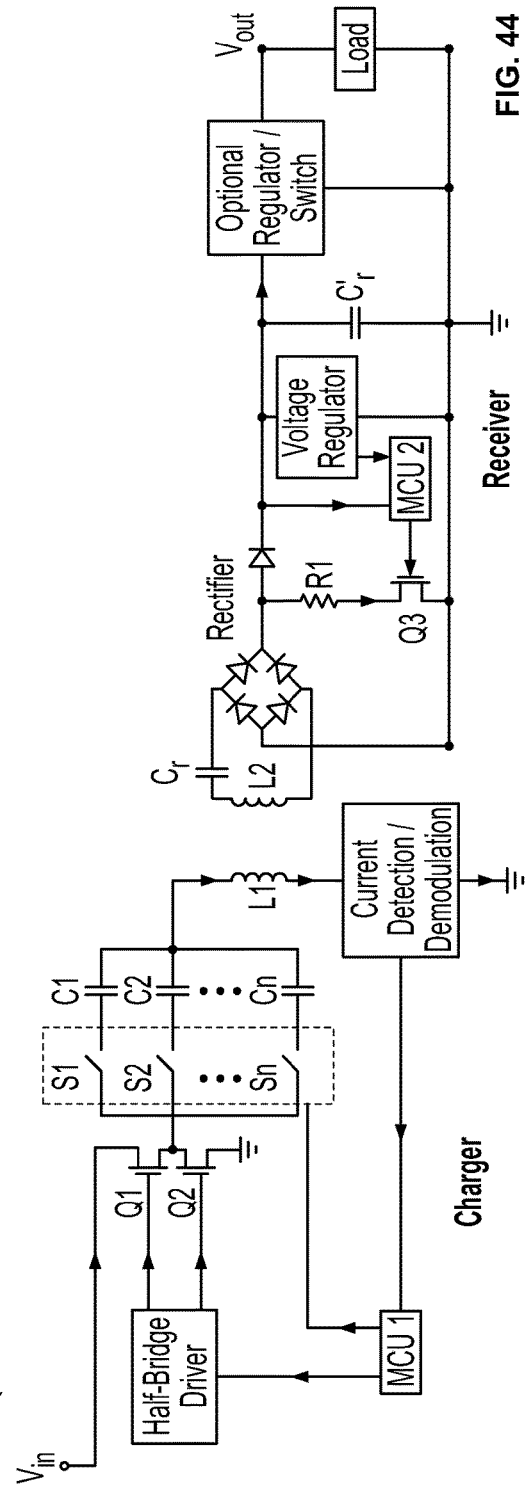

600
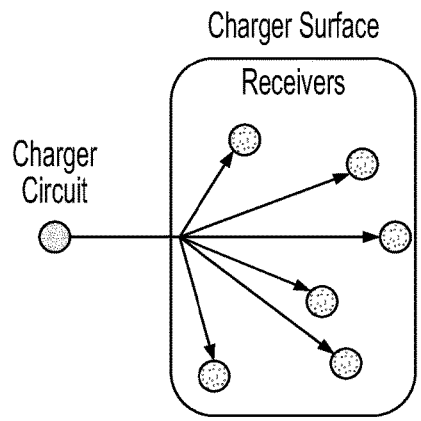
a- Homogeneous Broadcast:
Same Protocol and / or
Voltage and / or Power Level
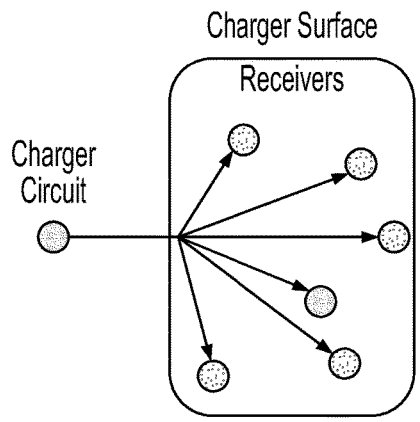
b- Inhomogeneous Broadcast:
Different Protocols and / or
Voltages and / or Power Levels
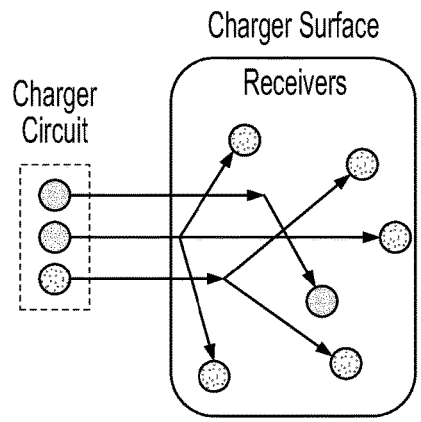
c- Multicast:
One Charger Sub-unit per
Protocol and / or
Voltage and / or Power Level
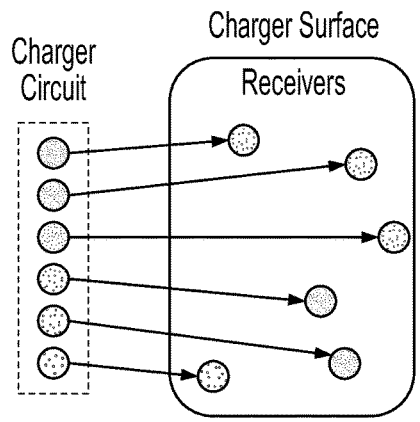
d- Unicast:
One Charger Sub-unit per
Each Receiver
FIG. 46

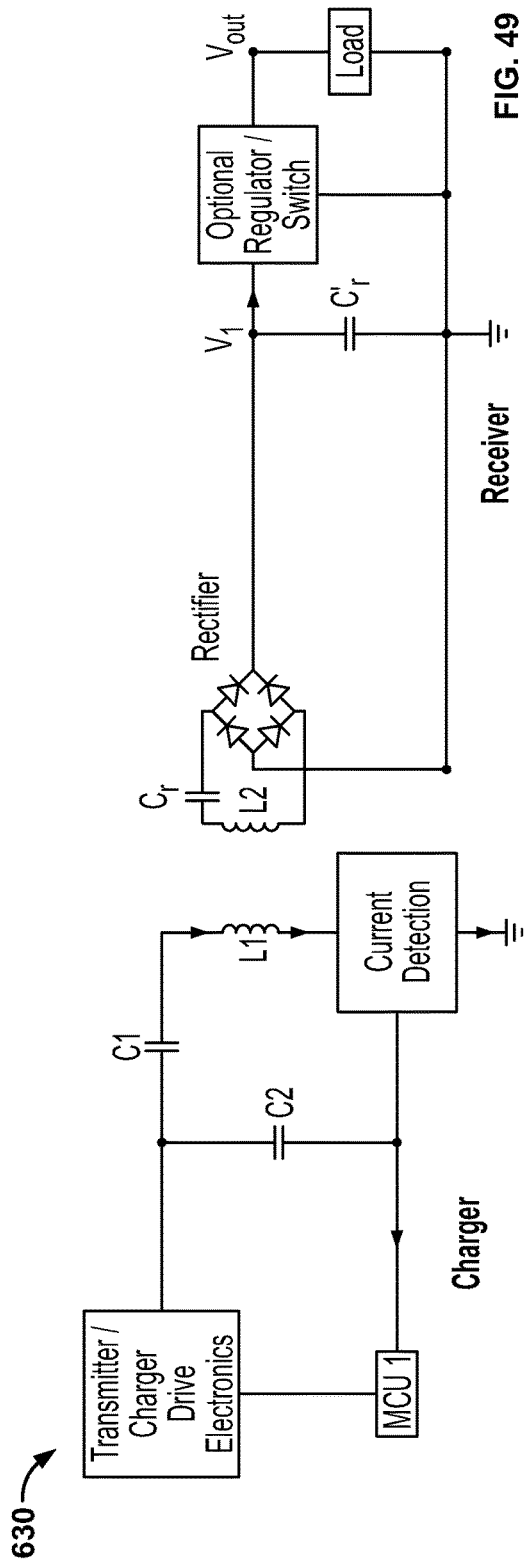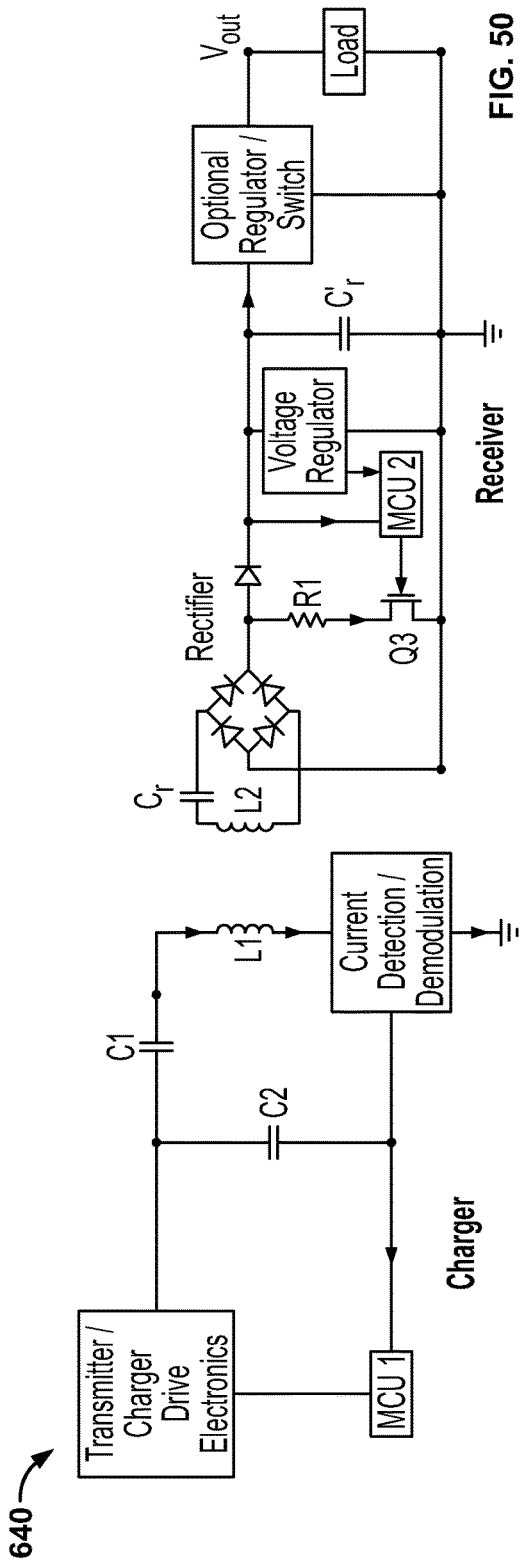

POWERING AND/OR CHARGING WITH A PLURALITY OF PROTOCOLS

CROSS-REFERENCE TO RELATED PATENT CASES

This application is a continuation-in-part of U.S. patent application Ser. No. 13/352,096, titled "SYSTEMS AND METHODS FOR PROVIDING POSITIONING FREEDOM, SUPPORT OF DIFFERENT VOLTAGES, PROTOCOLS, AND POWER LEVELS IN A WIRELESS POWER SYSTEM," filed Jan. 17, 2012, now allowed, which claims the benefit of priority to U.S. Provisional Patent Application No. 61/433,883, titled "SYSTEM AND METHOD FOR MODULATING THE PHASE AND AMPLITUDE OF AN ELECTROMAGNETIC WAVE IN MULTIPLE DIMENSIONS," filed Jan. 18, 2011; U.S. Provisional Patent Application No. 61/478,020, titled "SYSTEM AND METHOD FOR MODULATING THE PHASE AND AMPLITUDE OF AN ELECTROMAGNETIC WAVE IN MULTIPLE DIMENSIONS," filed Apr. 21, 2011; and U.S. Provisional Patent Application No. 61/546,316, titled "SYSTEMS AND METHODS FOR PROVIDING POSITIONING FREEDOM, AND SUPPORT OF DIFFERENT VOLTAGES, PROTOCOLS, AND POWER LEVELS IN A WIRELESS POWER SYSTEM," filed Oct. 12, 2011, each of which applications are incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Embodiments of the invention are generally related to systems and methods for modifying the magnitude and/or phase of an electromagnetic field in one or multiple dimensions to charge one or more batteries wirelessly or power devices or systems wirelessly. Applications for use in charging or powering multiple devices with a wireless power charger system are also described.

Wireless technologies for powering and charging mobile and other electronic or electric devices, batteries and vehicles have been developed. These systems may use a wireless charger or transmitter system, and a wireless receiver in combination, to provide a means for transfer of power across a distance. For safe and efficient operation of basic wireless charging systems, transmitter and receiver coil parts of the system may be aligned and of comparable or similar size. Such operation typically requires the user to place the device or battery to be charged in a specific location with respect to the charger. To enable ease of use, it is desirable to provide a system that allows a receiver be placed on a larger surface area charger without need for specific alignment of the position of the receiver. It is further desirable to be able to charge or power multiple devices of similar or different power and voltage requirements or operating with different wireless charging protocols on or near the same surface.

Typically, batteries associated with wireless charging are chemical, electrochemical and/or electronic in nature. Exemplary batteries of the invention may involve proton-based or ion-based electrochemistry (e.g., lead acid or li-iodine batteries), electron-based systems (e.g., supercapacitors employing quantum dot technology), and systems that involve an electrolyte that is essentially aprotic in nature (e.g., lithium-ion or rocking-chair systems involving electrodes comprising alkali insertion or intercalation compounds). Batteries may include one or more cells. Optionally, batteries may include energy management systems or be associated with devices that involve semiconductor-based and/or traditional electronic circuitry.

In any case, these are the general areas that embodiments of the invention are intended to address for all energy storages systems as discussed herein. Points of novelty and nonobviousness shall become apparent upon examination of the specification submitted herewith when viewed from the perspective of a person having ordinary skill in the art of electrical engineering.

SUMMARY

Described herein are systems and methods of modulating the phase and amplitude of an electromagnetic field in one or multiple (e.g. one, two or three) dimensions. Applications include beam shaping, beam forming, phase array radar, beam steering, etc. and inductive charging and power, and particularly usage in mobile, electronic, electric, lighting, or other devices, batteries, power tools, kitchen, industrial applications, vehicles, and other usages. Embodiments of the invention can also be applied generally to power supplies and other power sources and chargers, including systems and methods for improved ease of use and compatibility and transfer of wireless power to mobile, electronic, electric, lighting, or other devices, batteries, power tools, kitchen, military, industrial applications and/or vehicles.

For example, a system is provided for use in wireless charging or wireless powering. The system includes a base for wirelessly charging and/or wirelessly powering and a receiver capable of receiving electricity wirelessly from the base. The receiver is associated with a battery and/or or device. The base and/or the receiver is capable of detecting and operating under a plurality of power protocols and/or a plurality of communicating protocols, thereby allowing the base to transfer electricity wirelessly to the battery and/or or device in a manner consistent with a common communication and/or common power protocol shared between the base and the receiver. In some instances, the battery and/or the device may not be charged and/or powered by the base in a wired manner.

BRIEF DESCRIPTION OF THE DRAWINGS

FIG. 1 illustrates an exemplary charger and receiver, in accordance with an embodiment.

FIG. 2 illustrates an exemplary circuit, in accordance with an embodiment.

FIG. 4 illustrates another exemplary circuit, in accordance with an embodiment.

FIG. 5 illustrates another exemplary circuit, in accordance with an embodiment.

FIG. 19 illustrates a large area transmitter coil covered by a ferromagnetic, ferrite, or other magnetic material, in accordance with an embodiment.

FIG. 20 illustrates the use of a ferrite magnetic material or switching layer above the coil to guide and shield the flux, in accordance with an embodiment.

FIG. 22 illustrates examples of magnets that can be used, in accordance with an embodiment.

FIG. 23 illustrates a magnetic aperture by incorporating a permanent and/or electromagnet into the receiver, in accordance with an embodiment.

FIG. 39 illustrates architectures where the charger circuit comprises sub circuits or units whereby each sub-unit is responsible for powering or charging and/or communicating with one power receiver, in accordance with an embodiment.

FIG. 43 illustrates a circuit wherein the charger includes capacitors and switches, in accordance with an embodiment.

FIG. 44 illustrates a resonant converter architecture, in accordance with an embodiment.

FIG. 46 illustrates architectures for full positioning freedom, in accordance with an embodiment.

FIG. 49 illustrates a simplified system for wireless transmission of power with constant output voltage, in accordance with an embodiment.

FIG. 50 illustrates a system that includes a feedback channel, in accordance with an embodiment.

DETAILED DESCRIPTION

Overview and Definitions

Figure 3:
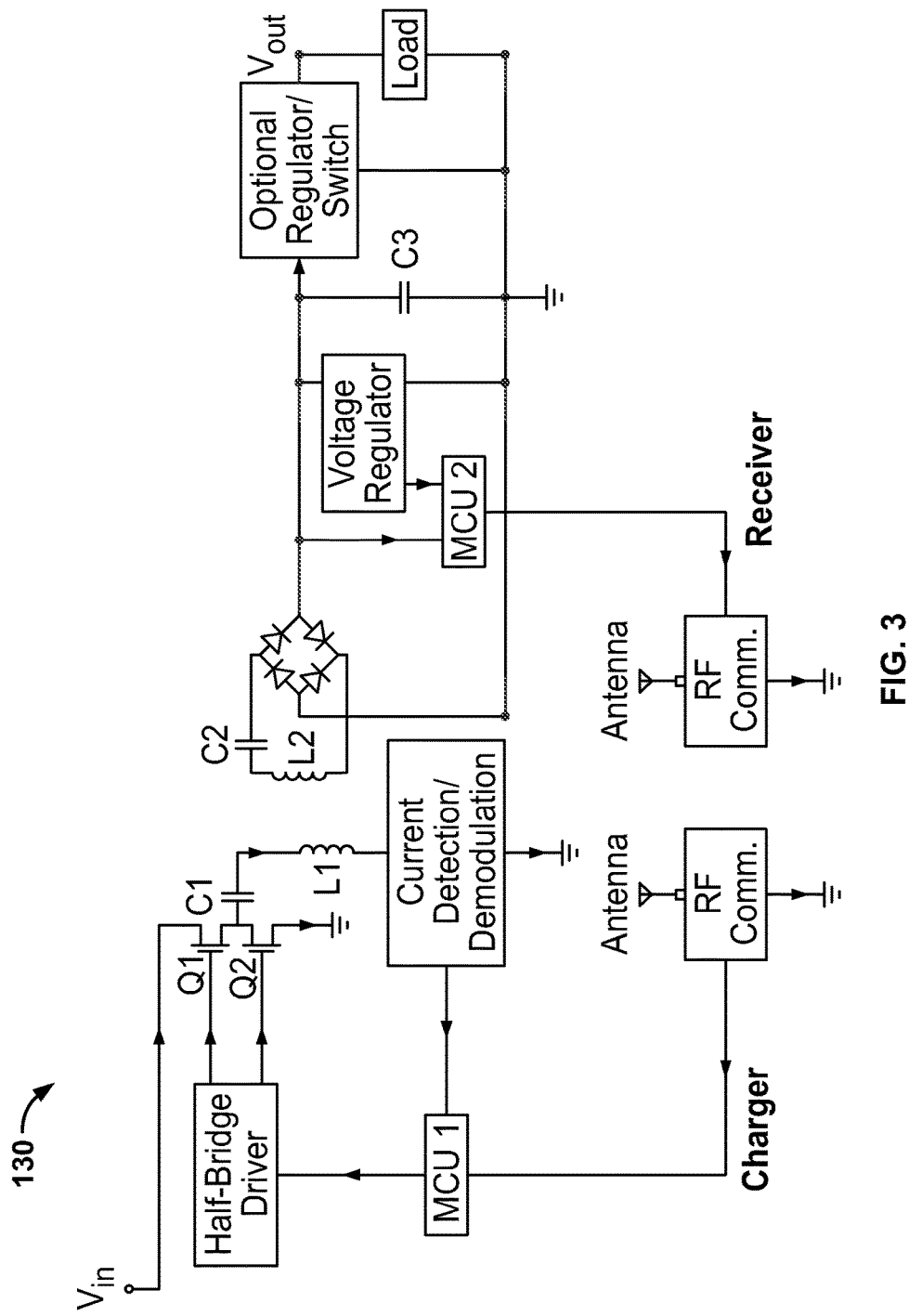
FIG. 3 illustrates another exemplary circuit, in accordance with an embodiment.

With the proliferation of electrical and electronic devices and vehicles (which are considered examples of devices herein), simple and universal methods of providing power and or charging of these devices is becoming increasingly important. However, there a numerous technical challenges before such universal methods can be carried out. For example, device manufacturers such as Apple, Inc. (Cupertino, Calif.) typically produce battery powered products that use protocols that are incompatible with charging and/or power protocols of other device manufacturers such as Samsung and the like. For example, certain protocols developed for Apple products specifically forbid Apple devices from being charged using chargers that do not comport with protocol standards for Apple devices. Similarly, manufacturers of so-called "universal" docking stations for laptop and notebook computers often have to contend with software and hardware protocol changes over time. Branded devices such as those sold under the Apple®, Samsung®, Microsoft®, Google®, Android®, iPhone®, HTC®, Tesla® marks and the like may use a plurality of charging and communications protocols. Furthermore, certain devices and chargers must have appropriate form factors, e.g., mating male and female forms when viewed from a horizontal perspective, to work effectively and efficiently together. Thus, the complexity of such compatibility problems lies at the heart of the present invention.

Before the invention is described in detail below, it is to be understood that this invention, unless specifically noted to the contrary, is not limited to any particular batteries, device, or the like, as such may vary. It is also to be understood that the terminology used herein is for the purpose of describing particular embodiments only, and is not intended to be limiting.

As used herein, the singular forms "a," "an," and "the" include both singular and plural referents unless the context clearly dictates otherwise. Thus, for example, reference to "a battery comprising a cell" includes one or more batteries that include plurality of cells as well as a single battery consisting of a single cell, reference to "a protocol" includes a combination of protocols as well as a single protocol, and the like.

In addition, the term "and/or" when used in a list of items, refers to the any of the items singly or in combination, unless the context clearly dictates otherwise. For example, "X, Y, and/or Z" refers to "X," "Y," "Z," "X and Y," "X and Z," "Y and Z," or "X, Y, and Z," or any permutation of the foregoing.

In this specification and in the claims that follow, reference is made to a number of terms that are defined to have the following meanings, unless the context in which they are employed clearly indicates otherwise:

The terms "AC" and "DC" are used in their ordinary sense and refer to "alternating current" and "direct current," respectively. Typically, batteries of the invention are charged and discharged via direct current. However, inverter and related technologies may be used to allow batteries of the invention to be charged or drained via alternating current.

The term "Apple" as used herein refers generally to products and services offered by Apple, Inc. (Cupertino, Calif.).

The term "battery" is used in its ordinary electrical sense and refers to one or more cells connected in series, parallel, or a combination thereof that can produce electric energy. For example, batteries of the invention may include rechargeable lithium or lithium ion batteries. In some cases, intercalation compounds may be used in positive and/or negative electrodes. In addition or in the alternative, insertion compound based electrodes may be used as well. Intercalation compounds include, but are not limited to, carbon having a layered microstructure, e.g., a graphitic or mesophase carbon, and lithiated oxides of a transition metal such as Co, Ni, or Fe, e.g., $LiCo_2O_4 LiNi_2O_4$, and $LiFe_2O_4$, respectively. Insertion compounds include lithiated iron nanophosphates and lithiated manganese oxides of a spinel structure. The choice of battery materials are critical to performance, safety and economic issues.

The terms "electronic," "electronically," and the like are used in their ordinary sense and relate to structures, e.g., semiconductor microstructures, that provide controlled conduction of electrons, holes, or other charge carriers.

The term "electrolyte" as in a solid-state or fluid-state "electrolyte" of a battery is used herein to refer a material through which ions may, under an electric potential gradient, migrate by means of vacancies or interstitials within the material. Typically, an electrolyte exhibits high ionic conductivity and low electronic conductivity.

The terms "efficient," "efficiency," and the like are used in their ordinary sense and refer to achieving maximum productivity with minimum wasted effort or expense. For example, when a battery is charged wirelessly by a base in an "efficient" manner, a loss of no more than about 15% of electrical energy may occur during charging. Preferably, the charging efficiency is at least about 90%. Optionally, the charging efficiency is at least about 95%.

The terms "optional" and "optionally" are used in their ordinary sense and refers to items may or may not be present and/or or events that may or may not occur.

The terms "substantial," "substantially" are used in their ordinary sense and mean "of considerable importance" or "to a great or significant extent," but that trivial or insignificant counterexamples may be found. For example, a "substantially aprotic" solvent is used to describe a solvent that does not contain unbound or does not easily release protons, but that absolute absence of free protons in the solvent is not necessary. Similarly, a "substantially solid-state" battery is to be interpreted to mean a battery comprising entirely or consisting essentially of solid components, but that the battery does not have to exclude components that are entirely devoid of fluids as long as the operation of the battery is not hindered. The term "essentially" is to be interpreted in a manner similar to how "substantially" is to be interpreted.

The term "solution" is used in its ordinary chemical sense and refers to one or more solutes in a solvent. A solution may be fluid or solid in nature.

The term "wireless" is used in its ordinary sense and is used to describe any of various devices, systems, and/or methods that involve operation or actuation by electromagnetic waves. Similarly, the term "wired" is used in its ordinary sense and is used generally as an antonym of the term "wireless." "Wired" does not necessarily mean a complete absence of wires. For example, a system of the invention may include both wired and wireless components.

More generally, the terms "device," "product," or "battery" are used herein to include any electrical, electronic, mobile, lighting, or other product, batteries, power tools, industrial, kitchen, military or medical products and vehicles or movable machines such as robots whereby the product, part, or component is powered by electricity or an internal or external battery and/or can be powered or charged externally or internally by a generator or solar cell, fuel cell, hand or other mechanical crank or alike. A product or device can also include an attachable or integral skin, case, battery door or attachable or add-on or dongle type of receiver component to enable the user to power or charge the product or device.

Description of Various Embodiment of the Invention

In accordance with various embodiments, an induction power transmitter employs a magnetic induction coil(s)

transmitting energy to a receiving coil(s) in a device or product, case, battery door, or attachable or add-on component including attachments such as a dongle or a battery inside or outside of device or attached to device through a connector and/or a wire, or stand-alone placed near the power transmitter platform. The receiver can be an otherwise incomplete device that receives power wirelessly and is intended for installation or attachment in or on the final product, battery or device to be powered or charged, or the receiver can be a complete device intended for connection to a device, product or battery directly by a wire or wirelessly.

As used herein, the term wireless power, charger, transmitter or inductive power and charger are used interchangeably. In accordance with an embodiment, the wireless charger may be a flat or curved surface or part that can provide energy wirelessly to a receiver. It can also be constructed of flexible materials and/or coils or even plastic electronics to enable mechanical flexibility and bending or folding to save space or for conformity to non-flat surfaces. The wireless charger may be directly powered by an AC power input, DC power, or other power source such as a car, motorcycle, truck or other vehicle or airplane or boat or ship power outlet, or vehicle, boat, ship or airplane itself, primary (non-rechargeable) or rechargeable battery, solar cell, fuel cell, mechanical (hand crank, wind source, etc.), nuclear source or other or another wireless charger or power supply or a combination thereof. In addition, the wireless charger may be powered by a part such as a rechargeable battery which is itself in turn recharged by another source such as an AC or DC power source, vehicle, boat or ship or airplane outlet or vehicle, boat or ship or airplane itself, solar cell, fuel cell, wind or mechanical (hand crank, wind, etc.) or nuclear source, etc. or a combination thereof. In addition, in cases where the wireless charger is powered by a rechargeable source such as a battery, the battery can also be itself in turn inductively charged by another wireless charger. The wireless charger may be a stand-alone part, device, or product, or may be incorporated into another electric or electronics device, table, desk chair, TV stand or mount or furniture or vehicle or airplane or marine vehicle or boat or objects such as a table, desk, chair, counter-top, shelving or check out or cashier counters, kiosk, car seat, car console, car door, netting, cup holder, dashboard, glovebox, etc., airplane tray, computer, laptop, netbook, tablet, display, TV, magnetic, optical or semiconductor storage or playback device such as hard drive, optical players, etc., cable or game console, computer pads, toys, clothing, bags or backpack, belt or holster, etc., industrial, military or kitchen counter, area, devices and appliances, phones, cameras, radios, stereo systems, etc. The wireless charger may also have other functions built in or be constructed such that it is modular and additional capabilities/functions can be added as needed.

Some of these capabilities/functions include an ability to provide higher power, charge more devices, exchange the top surface or exterior box or cosmetics, operate by internal power as described above through use of a battery and/or renewable source such as solar cells, communicate and/or store data from a device, provide communication between the device and other devices or the charger and/or a network, etc. An example is a basic wireless charger that has the ability to be extended to include a rechargeable battery pack to enable operation without external power. Another example may be a wireless charger containing or one or more speakers and/or microphone and Bluetooth, WiFi, etc. connectivity as a module that would enhance the basic charger to allow a mobile phone or music player being charged on the charger to play/stream music or sound or carry out a hands free conversation over the speakers and/or microphone wirelessly through a Bluetooth, WiFi, or other connection. Another example may be a charger product or computer or laptop, or display or TV etc. that also contains a disk drive, solid state memory or other storage device and when a device is placed on the charger, data connectivity through the charger, Bluetooth, NFC, Felica, WiFi, Zigbee, Wireless USB, etc. is also established for transfer, synchronizing or update of data or programs occurs to download/upload info, display or play music or video or synchronize data. One exemplary use may be a camera or phone charger whereby many other combinations of products and capabilities may be enabled in combination of charging and other functions. Examples of products or devices powered or charged by the induction transmitter and receiver include but are not limited to batteries, cell phones, smart phones, cordless phones, communication devices, personal data assistants, portable media players, global positioning (GPS) devices, Bluetooth headsets and other devices, shavers, watches, tooth brushes, calculators, cameras, optical scopes, infrared viewers, computers, laptops, tablets, netbooks, key boards, computer mice, book readers or email devices, pagers, computer monitors, televisions, music or movie players and recorders, storage devices, radios, clocks, speakers, gaming devices, game controllers, toys, remote controllers, power tools, construction tools, office equipment, robots including vacuum cleaning robots, floor washing robots, pool cleaning robots, gutter cleaning robots or robots used in hospital, clean room, military or industrial environments, industrial tools, mobile vacuum cleaners, medical or dental tools or equipment, military equipment or tools, kitchen appliances, mixers, cookers, can openers, food or beverage heaters or coolers such as electrically powered beverage mugs, massagers, adult toys, lights or light fixtures, or advertising applications, printers, fax machines, scanners, automobiles, bikes, buses, or other vehicles or mobile transportation machines, and other battery or electrically powered devices or products. The receiver or the charger could also be incorporated into a bag, carrier, skin, clothing, case, packaging, product packaging or box, crate, box, display case or rack, table, bottle or device etc. to enable some function inside the bag, carrier, skin, clothing, case, packaging, product packaging or box, crate, box, display case or rack, table, bottle (such as, e.g. causing a display case or packaging to display promotional information or instructions, or to illuminate) and/or to use the bag, carrier, skin, clothing, case, packaging, product packaging or box, crate, box, display case or rack, table, bottle, etc. to power or charge another device or component somewhere on or nearby. It is important to note that the product or device does not necessarily have to be portable and/or contain a battery to take advantage of induction or wireless power transfer. For example, a lighting fixture or a computer monitor that is typically powered by an AC outlet or a DC power supply may be placed on a table top and receive power wirelessly. The wireless receiver may be a flat or curved surface or part that can receive energy wirelessly from a charger. The receiver and/or the charger can also be constructed of flexible materials and/or coils or even plastic electronics to enable mechanical flexibility and bending or folding to save space or for conformity to non-flat surfaces.

In accordance with various embodiments, many of these devices contain internal batteries, and the device may or may not be operating during receipt of power. Depending on the degree of charge status of the battery or its presence and the system design, the applied power may provide power to the device, charge its battery or a combination of the above. The terms charging and/or power are used interchangeably herein to indicate that the received power can be used for either of these cases or a combination thereof. Unless specifically described, these terms are therefore used interchangeably. Also, unless specifically described herein, in accordance with various embodiments the terms charger power supply and transmitter are used interchangeably.

As shown in FIG. 1, in accordance with an embodiment, a wireless charger or power system 100 comprises a first charger or transmitter part, and a second receiver part. The charger or transmitter can generate a repetitive power signal pattern (such as a sinusoid or square wave from 10's of Hz to several MHz or even higher, but typically in the 100 kHz to several MHz range) with its coil drive circuit and a coil or antenna for transmission of the power. The charger or transmitter typically also includes a communication and regulation/control system that detects a receiver and/or turns the applied power on or off and/or modify the amount of applied power by mechanisms such as changing the amplitude, frequency or duty cycle, etc. or a change in the resonant condition by varying the impedance (capacitance or inductance) of the charger or a combination thereof of the applied power signal to the coil or antenna. In accordance with an embodiment, the charger can also be the whole or part of the electronics, coil, shield, or other part of the system required for transmitting power wirelessly. The electronics may comprise discrete components or microelectronics that when used together provide the wireless charger functionality, or comprise an Application Specific Integrated Circuit (ASIC) chip or chipset that is specifically designed to function as the whole or a substantial part of the electronics for wireless charger system.

The second part of the system is a receiver that includes a coil or antenna to receive power, a method for change of the received AC voltage to DC voltage, such as rectification and smoothing with one or more rectifiers or a bridge or synchronous rectifier, etc. and one or more capacitors. In cases where the voltage at the load does not need to be kept within a tight tolerance or can vary regardless of the load resistance or the resistance of the load is always constant, the rectified and smoothed output of the receiver can be directly connected to a load. Examples of this situation may be in lighting applications, applications where the load is a constant resistance such as a heater or resistor, etc. In these cases, the receiver system could be quite simple and inexpensive. In many other cases, the resistance or impedance of the load changes during operation. This includes cases where the receiver is connected to a device whose power needs may change during operation or when the receiver is used to charge a battery. In these cases, the output voltage may need to be regulated so that it stays within a range or tolerance during the variety of operating conditions. In these cases, the receiver may optionally include a regulator such as linear, buck, boost or buck boost, etc. regulator and/or switch for the output power. Additionally, the receiver may include a method for the receiver to communicate with the charger. The receiver may optionally include a reactive component (inductor or capacitor) to increase the resonance of the system and a switch to allow switching between a wired and wireless method of charging or powering the product or battery. The receiver may also include optional additional features such as including Near Field Communication, Bluetooth, WiFi, RFID or other communication and/or verification technology.

The charger or transmitter coil and the receiver coil can have any shape desired and may be constructed of PCB, wire, Litz wire, or a combination thereof. To reduce resistance, the coils can be constructed of multiple tracks or wires in the PCB and/or wire construction. For PCB construction, the multiple layers can be in different sides of a PCB and/or different layers and layered/designed appropriately to provide optimum field pattern, uniformity, inductance, and/or resistance or Quality factor (Q) for the coil. Various materials can be used for the coil conductor such as different metals and/or magnetic material or plastic conductors, etc. Typically, copper with low resistivity may be used. The design should also take into account the skin effect of the material used at the frequency of operation to preferably provide low resistance.

The receiver can be an integral part of a device or battery as described above, or can be an otherwise incomplete device that receives power wirelessly and is intended for installation or attachment in or on the final product, battery or device to be powered or charged, or the receiver can be a complete device intended for connection to a device, product or battery directly by a wire or wirelessly. Examples include replaceable covers, skins, cases, doors, jackets, surfaces, etc for devices or batteries that would incorporate the receiver or part of the receiver and the received power would be directed to the device through connectors in or on the device or battery or the normal wired connector (or power jack) of the device or battery. The receiver may also be a part or device similar to a dongle that can receive power on or near the vicinity of a charger and direct the power to a device or battery to be charged or powered through a wire and/or appropriate connector. Such a receiver may also have a form factor that would allow it to be attached in an inconspicuous manner to the device such as a part that is attached to the outer surface at the bottom, front, side, or back side of a laptop, netbook, tablet, phone, game player, or other electronic device and route the received power to the input power connector or jack of the device. The connector of such a receiver may be designed such that it has a pass through or a separate connector integrated into it so that a wire cable for providing wired charging/power or communication can be connected to the connector without removal of the connector thus allowing the receiver and its connector to be permanently or semi-permanently be attached to the device throughout its operation and use. Many other variations of the receiver implementation are possible and these examples are not meant to be exhaustive. In accordance with an embodiment, the receiver can also be the whole or part of the electronics, coil, shield, or other part of the system required for receiving power wirelessly. The electronics may comprise discrete components or microcontrollers that when used together provide the wireless receiver functionality, or comprise an Application Specific Integrate Circuit (ASIC) chip or chipset that is specifically designed to function as the whole or a substantial part of the electronics for wireless receiver system.

Optional methods of communication between the charger and receiver can be provided through the same coils as used for transfer of power, through a separate coil, through an RF or optical link, through RFID, Bluetooth, WiFi, Wireless USB, NFC, Felica, Zigbee, Wireless Gigabit (WiGig), etc. or through such protocols as defined by the Wireless Power Consortium (WPC) or other protocols or standards, developed for wireless power, or other communication protocol, or combination thereof.

In the case that communication is provided through the power transfer coil, one method for the communication is to modulate a load in the receiver to affect the voltage in the receiver coil and therefore create a modulation in the charger coil parameters that can be detected through monitoring of its voltage or current. Other methods can include frequency modulation by combining the received frequency with a local oscillator signal or inductive, capacitive, or resistive modulation of the output of the receiver coil.

The communicated information can be the output voltage, current, power, device or battery status, validation ID for receiver, end of charge or various charge status information, receiver battery, device, or coil temperature, and/or user data such as music, email, voice, photos or video, or other form of digital or analog data used in a device. It can also be a pattern or signal or change in the circuit conditions that is transmitted or occurs to simply notify the presence of the receiver nearby.

In accordance with an embodiment, the data communicated can be any one or more of the information detailed herein, or the difference between these values and the desired value or simple commands to increase or decrease power or simply one or more signals that would confirm presence of a receiver or a combination of the above. In addition, the receiver can include other elements such as a DC to DC converter or regulator such as a switching, buck, boost, buck/boost, or linear regulator. The receiver can also include a switch between the DC output of the receiver coil and the rectification and smoothing stage and its output or the output of the regulator stage to a device or battery or a device case or skin and in cases where the receiver is used to charge a battery or device, the receiver may also include a regulator, battery charger IC or circuitry and/or battery protection circuit and associated transistors, etc. The receiver may also include variable or switchable reactive components (capacitors and/or inductors) that would allow the receiver to change its resonant condition to affect the amount of power delivered to the device, load or battery. The receiver and/or charger and/or their coils can also include elements such as thermistors, magnetic shields or magnetic cores, magnetic sensors, and input voltage filters, etc. for safety and/or emission compliance reasons. The receiver may also be combined with other communication or storage functions such as NFC, WiFi, Bluetooth, etc. In addition, the charger and or receiver can include means to provide more precise alignment between the charger and receiver coils or antennas. These can include visual, physical, or magnetic means to assist the user in alignment of parts. To implement more positioning freedom of the receiver on the charger, the size of the coils can also be mismatched. For example, the charger can comprise a larger coil size and the receiver a smaller one or vice versa, so that the coils do not have to be precisely aligned for power transfer.

In simpler architectures, there may be minimal or no communication between the charger and receiver. For example, a charger can be designed to be in a standby power transmitting state, and any receiver in close proximity to it can receive power from the charger. The voltage, power, or current requirements of the device or battery connected to the receiver circuit can be unregulated, or regulated or controlled completely at the receiver or by the device attached to it. In this instance, no regulation or communication between the charger and receiver may be necessary. In a variation of this, the charger may be designed to be in a state where a receiver in close proximity would bring it into a state of power transmission. Examples of this would be a resonant system where inductive and/or capacitive components are used, so that when a receiver of appropriate design is in proximity to a charger, power is transmitted from the charger to a receiver; but without the presence of a receiver, minimal or no power is transmitted from the charger.

In a variation of the above, the charger can periodically be turned on to be driven with a periodic pattern (a ping process) and if a receiver in proximity begins to draw power from it, the charger can detect power being drawn from it and would stay in a transmitting state. If no power is drawn during the ping process, the charger can be turned off or placed in a stand-by or hibernation mode to conserve power and turned on and off again periodically to continue seeking a receiver.

In accordance with an embodiment, the power section (coil drive circuit and receiver power section) can be a resonant converter, resonant, full bridge, half bridge, E-class, zero voltage or current switching, flyback, or any other appropriate power supply topology. FIG. 2 shows a more detailed view of the wireless charger system 120 with a resonant converter geometry, wherein a pair of transistors Q1 and Q2 (such as FETs, MOSFETs, or other types of switch) are driven by a half-bridge driver IC and the voltage is applied to the coil L1 through one or more capacitors shown as C1. The receiver includes a coil and an optional capacitor (for added efficiency) shown as C2 that may be in series or in parallel with the receiver coil L2. The charger and/or receiver coils may also include impedance matching circuits and/or appropriate magnetic material layers behind (on the side opposite to the coil surfaces facing each other) them to increase their inductance and/or to shield the magnetic field leakage to surrounding area. The charger and/or receiver may also include impedance matching circuits to optimize/improve power transfer between the charger and receiver.

In many of the embodiments and figures described herein, the resonant capacitor C2 in the receiver is shown in a series architecture. This is intended only as a representative illustration, and this capacitor may be used in series or parallel with the receiver coil. Similarly, the charger is generally shown in an architecture where the resonant capacitor is in series with the coil. System architectures with the capacitor C1 is in parallel with the charger coil are also possible.

In accordance with an embodiment, the charger also includes a circuit that measures the current through and/or voltage across the charger coil (in this case a current sensor is shown in the figure as an example). Various demodulation methods for detection of the communication signal on the charger current or voltage are available. This demodulation mechanism can be, for example, an AM or FM receiver (depending on whether amplitude or frequency modulation is employed in the receiver modulator) similar to a radio receiver tuned to the frequency of the communication or a heterodyne detector, etc.

In accordance with an embodiment, the microcontroller unit (MCU) in the charger (MCU1) is responsible for understanding the communication signal from the detection/demodulation circuit and, depending on the algorithm used, making appropriate adjustments to the charger coil drive circuitry to achieve the desired output voltage, current or power from the receiver output. In addition, MCU1 is responsible for processes such as periodic start of the charger to seek a receiver at the start of charge, keeping the charger on when a receiver is found and accepted as a valid receiver, continuing to apply power and making necessary adjustments, and/or monitoring temperature or other environmental factors, providing audio or visual indications to the user on the status of charging or power process, etc. or terminating charging or application of power due to end of charge or customer preference or over temperature, over current, over voltage, or some other fault condition or to launch or start another program or process. For example, the charger can be built into a car, and when a valid receiver and/or an NFC, RFID or other ID mechanism integrated into or on a mobile device, its case or skin, dongle or battery is found, the charger may activate some other functions such as Bluetooth connectivity to the device, displaying the device identity or its status or state of charge on a display, etc. More advanced functions can also be activated or enabled by this action. Examples include using the device as an identification mechanism for the user and setting the temperature of the car or the driver or passenger side to the user's optimum pre-programmed temperature, setting the mirrors and seats to the preferred setting, starting a radio station or music preferred by user, etc., as described in U.S. Patent Publication No. 20110050164, incorporated by reference herein. The charger may also include an RF signal amplifier/repeater so that placement of a mobile device such as a mobile phone, tablet, etc. would provide close coupling and/or turning on of the amplifier and its antenna so that a better signal reception for communication such as cell phone calls can be obtained. Such Signal Boosters that include an antenna mounted on the outside of a car, a bi-directional signal amplifier and a repeater antenna inside a car are increasingly common. The actions launched or started by setting a device on a charger can also be different in different environments. Examples can include routing a mobile phone call or music or video from a smart phone to the speakers and microphones or video monitors or TV, computer, laptop, tablet, etc. in a car, home, office, etc. Other similar actions or different actions can be provided in other environments.

It may be useful in addition to the communication signal to detect the DC value of the current through the charger coil. For example, faults may be caused by insertion or presence of foreign objects such as metallic materials between the charger and receiver. These materials may be heated by the application of the power and can be detected through detection of the charger current or temperature or comparison of input voltage, current, or power to the charger and output voltage, current, or power from the receiver and concluding that the ratio is out of normal range and extra power loss due to unknown reasons is occurring. In these conditions or other situations such as abnormal charger and/or receiver heating, the charger may be programmed to declare a fault condition and shut down and/or alert the user or take other actions.

In accordance with an embodiment, once the charger MCU has received a signal and decoded it, it can take action to provide more or less power to the charger coil. This can be accomplished through known methods of adjusting the frequency, duty cycle or input voltage to the charger coil or a combination of these approaches. Depending on the system and the circuit used, the MCU can directly adjust the bridge driver or an additional circuit such as a frequency oscillator may be necessary to drive the bridge driver or the FETs.

A typical circuit for the receiver in accordance with an embodiment is also shown in FIG. 2. In accordance with an embodiment, the receiver circuit can include a capacitor C2 in parallel or series with the receiver coil to produce a tuned receiver circuit. This circuit is known to increase the efficiency of a wireless power system. The rectified and smoothed (through a bridge rectifier and capacitors) output of the receiver coil and optional capacitor is either directly or through a switch or regulator applied to the output. A microcontroller is used to measure various values such as output voltage, current, temperature, state of charge, battery full status, end of charge, etc. and to report back to the charger to provide a closed loop system with the charger as described above. In the circuit shown in FIG. 2, the receiver MCU communicates back to the charger by modulating the receiver load by rapidly closing and opening a switch in series with a modulation load at a pre-determined speed and coding pattern. This rapid load modulation technique at a frequency distinct from the power transfer frequency can be easily detected by the charger. A capacitor and/or inductor can also be placed in parallel or in series with this load.

As an example, if one assumes that the maximum current output of the receiver is 1000 mA and the output voltage is 5 V for a maximum output of 5 W; in this case, the minimum load resistance is 5 ohms. A modulation load resistor of several ohms (20, or 10 ohms or smaller) would be able to provide a large modulation depth signal on the receiver coil voltage. Choosing a 5 ohm resistor would modulate the output between a maximum current of 1 Amp or larger and a smaller value defined by the device load at the output. Such a large modulation can be easily detected at the charger coil current or voltage as described above. Other methods of communication through varying the reactive component of the impedance can also be used. The modulation scheme shown in FIG. 2 is shown only as a representative method and is not meant to be exhaustive. As an example, the modulation can be achieved capacitively, by replacing the resistor with a capacitor. In this instance, the modulation by the switch in the receiver provides the advantage that by choosing the modulation frequency appropriately, it is possible to achieve modulation and signal communication with the charger coil and circuitry, with minimal power loss (compared to the resistive load modulation).

The receiver in FIG. 2 also shows an optional DC regulator that is used to provide constant stable voltage to the receiver MCU. This voltage supply may be necessary to avoid drop out of the receiver MCU during startup conditions where the power is varying largely or during changes in output current and also to enable the MCU to have a stable voltage reference source so it can measure the output voltage accurately. Alternatively, a switch to connect or disconnect the load can be used or combined with the regulator. To avoid voltage overshoots during placement of a receiver on a charger or rapid changes in load condition, a voltage limiter circuit or elements like Zener diodes or regulators or other voltage limiters can also be included in the receiver.

In the above description, a uni-directional communication (from the receiver to the charger) is described. However, this communication can also be bi-directional, and data can be transferred from the charger to the receiver through modulation of the voltage or current in the charger coil and read back by the microcontroller in the receiver detecting a change in the voltage or current, etc.

In accordance with other embodiments, and other geometries where position independence on placement of the receiver on the charger surface is achieved by having multiple charger coils in an array or pattern, similar drive and communication circuits in the charger and receiver can be implemented. To detect the appropriate coil to activate in the charger to achieve optimum power transfer to a receiver placed on the charger, the charger coils can be activated in a raster or zigzag fashion or other geometry and current drawn from a charger coil, strength of voltage, current, power or signal from the receiver or other methods can be used to determine the closest match between position of one or more of the charger coils and a receiver coil and the appropriate charger coil or coils can be activated and modulated to provide optimum power transfer to the receiver.

While a system for communication between the charger and receiver through the power transfer coil or antenna is described above, in accordance with an embodiment the communication can also be implemented through a separate coil, a radio frequency link (am or fm or other communication method), an optical communication system or a combination of the above. The communication in any of these methods can also be bi-directional rather than uni-directional as described above. As an example, FIG. 3 shows a system 130 in accordance with an embodiment, wherein a dedicated RF channel for uni-directional or bi-directional communication between the charger and receiver is implemented for validation and/or regulation purposes. This system is similar to the system shown in FIG. 2, except rather than load modulation being the method of communication, the MCU in the receiver transmits the necessary information over an RF communication path. A similar system with LED or laser transceivers or detectors and light sources can be implemented. Advantages of such system include that the power received is not modulated and therefore not wasted during communication and/or that no noise due to the modulation is added to the system.

One of the disadvantages of the circuit shown in FIG. 2 is that, in the receiver circuit shown therein, the current path passes through 2 diodes and suffers 2 voltage drops resulting in large power dissipation and loss. For example, for Schottky diodes with forward voltage drop of 0.4 V, at a current output of 1 A, each diode would lose 0.4 W of power for a combined power loss of 0.8 W for the two in a bridge rectifier configuration. For a 5 V, 1 A output power (5 W), this 0.8 W of power loss presents a significant amount of loss (16%) just due to the rectification system.

In accordance with an embodiment, an alternative is to use a center-tapped receiver 140 as shown in FIG. 4, wherein during each cycle current passes only through one part of the coil and one diode in the receiver and therefore halves the rectification losses. Such a center tapped coil can be implemented in a wound-wire geometry with 2 sections of a wound wire or a printed circuit board coil or with a double or multi-sided sided PCB coil or a combination or even a stamped, etched or otherwise manufactured coil or winding.

In any of the systems described above, as shown in FIG. 5, the charger and receiver coils can be represented by their respective inductances 150 by themselves (L1 and L2) and the mutual inductance between them M which is dependent on the material between the two coils and their position with respect to each other in x, y, and z dimensions. The coupling coefficient between the coils k is given by:

$$k=M/(L1*L2)^{1/2}.$$

The coupling coefficient is a measure of how closely the 2 coils are coupled and may range from 0 (no coupling) to 1 (very tight coupling). In coils with small overlap, large gap between coils or dissimilar coils (in size, number of turns, coil winding or pattern overlap, etc.), this value can be smaller than 1.

Figure 6:
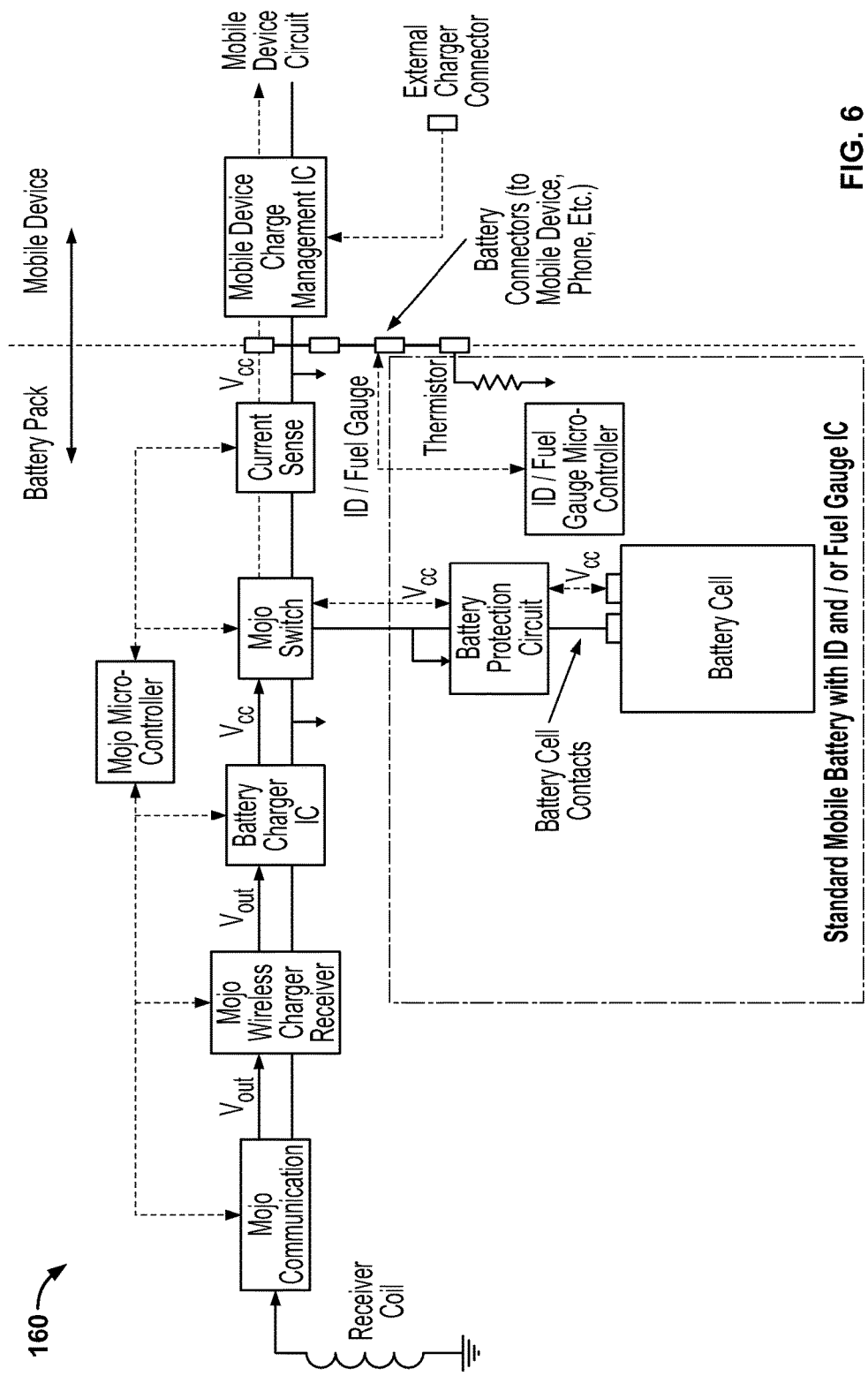
FIG. 6 illustrates another exemplary circuit, in accordance with an embodiment.
Figure 7:
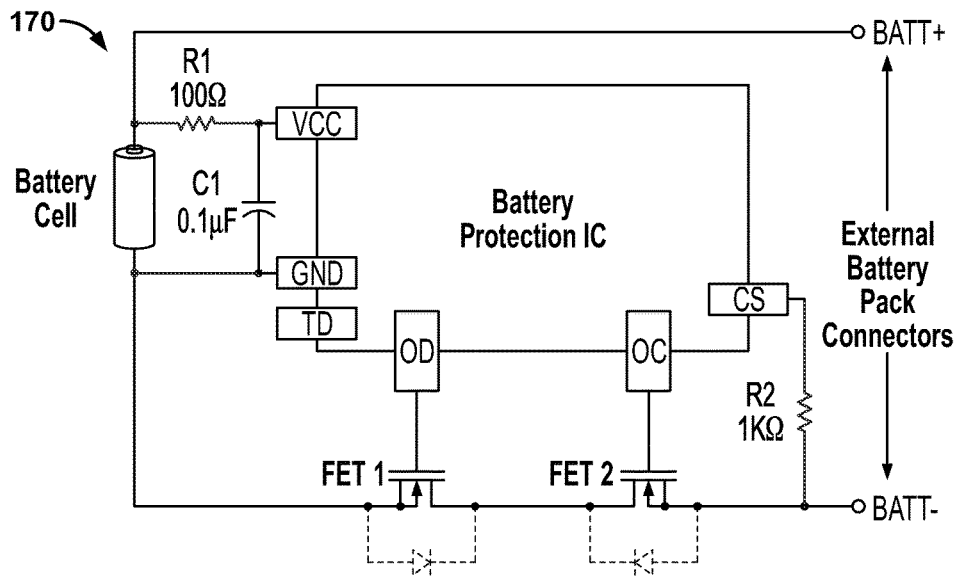
FIG. 7 illustrates another exemplary circuit, in accordance with an embodiment.

FIG. 6 shows a wirelessly powered battery pack and receiver 160 in accordance with an embodiment. The components of a typical common battery pack (battery cell and protection circuit, etc.) used in a battery device used in applications such as mobile phone, etc. are shown inside the dashed lines. The components outside the dashed lines are additional components that are included to enable safe wireless and wired charging of a battery pack. A battery pack may have four or more external connector points that interface with a mobile device pins in a battery housing or with an external typical wired charger. In accordance with an embodiment 170, the battery cell is connected as shown in FIG. 7 to two of these connectors (shown in the figure as BATT+ and BATT−) through a protection circuit comprising a battery protection IC that protects a battery from over-current and under or over voltage. A typical IC can be Seiko 8241.degree. C. that uses 2 external Field Effect Transistors (FETs) as shown in FIG. 7 to prevent current going from or to the battery cell (on the left) from the external battery pack connectors if a fault condition based on over current, or battery cell over or under voltage is detected. This provides safety during charging or discharging of the battery. In addition, a battery pack can include a PTC conductive polymer passive fuse. These devices can sense and shut off current by heating a layer inside the PTC if the amount of current passing exceeds a threshold. The PTC device is reset once this current falls and the device cools.

In addition, in accordance with an embodiment, the battery pack can contain a thermistor, which the mobile device checks through one other connector on the battery pack to monitor the health of the pack, and in some embodiments an ID chip or microcontroller that the mobile device interrogates through another connector to confirm an original battery manufacturer or other information about the battery. Other connectors and functions can be included in a battery pack to provide accurate battery status and/or charging information to a device being powered by a battery pack or a charger charging the battery pack.

Figure 8:
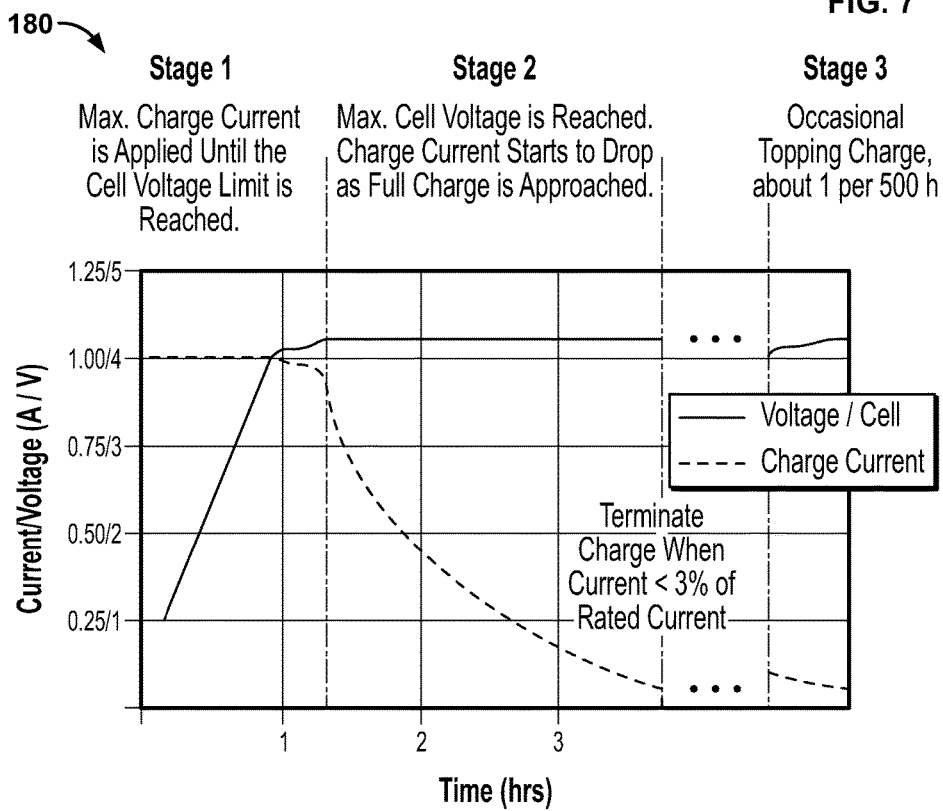
FIG. 8 illustrates a typical battery charge cycle, in accordance with an embodiment.

In addition to the components described above, in accordance with an embodiment, the receiver circuit comprises a receiver coil that can be a wound wire and/or PCB coil as described above, optional electromagnetic shielding between the coil and the metal body of the battery, optional alignment assisting parts such as magnets, etc., a receiver communication circuit (such as the resistor and FET for load modulation shown in FIGS. 2 and 4), a wireless power receiver (such as rectifiers and capacitors as described above), and an optional Battery charger IC that has a pre-programmed battery charging algorithm. Each type of battery and chemistry requires a pre-determined optimized profile for charging of that battery type. A typical charge cycle 180 for a Lithium Ion (Li-Ion) is shown in FIG. 8. Such a battery can be charged up to a value of 4.2 V at full capacity. The battery should be charged according to the guidelines of the manufacturer. For a battery of capacity C, the cell can typically be charged at the rate 1C. In Stage 1, the maximum available current is applied and the cell voltage increases until the cell voltage reaches the final value (4.2 V). In that case, the charger IC switches to Stage 2 where the charger IC switches to Constant Voltage charging where the cell voltage does not change but current is drawn from the source to further fill up the battery. This second Stage may take 1 or more hours and is necessary to fully charge the battery. Eventually, the battery will draw little (below a threshold) or no current. At this stage, the battery is full and the charger may discontinue charging. The charger IC can periodically seek the condition of the battery and top it off further if the battery has drained due to stand-by, etc.

In accordance with an embodiment, such multiple stages of battery charging can be implemented in firmware with the wireless power charger and receiver microcontrollers monitoring the battery cell voltage, current, etc. and working in tandem and to provide appropriate voltage, current, etc. for safe charging for any type of battery. In another approach as shown in FIG. 6, a battery charger IC chip that has specialized battery charging circuitry and algorithm for a particular type of battery can be employed. These charger ICs (with or without fuel gauge capability to accurately measure battery status, etc.) are available for different battery chemistries and are included in most mobile devices with mobile batteries such as mobile phones. They can include such safety features as a temperature sensor, open circuit shut off, etc. and can provide other circuits or microcontrollers such useful information as end of charge signal, signaling for being in constant current or voltage (stage 1 or 2 above, etc.). In addition, some of these ICs allow the user to program and set the maximum output current to the battery cell with an external resistor across 2 pins of the IC.

In accordance with an embodiment, the wirelessly charged battery pack in addition includes a micro-controller that coordinates and monitors various points and may also include thermal sensors on the wireless power coil, battery cell and/or other points in the battery pack. The microcontroller also may communicate to the charger and can also monitor communication from the charger (in case of bi-directional communication). Typical communication through load modulation is described above.

In accordance with an embodiment, another aspect of a wirelessly charged battery pack can be an optional external/internal switch. A battery pack can receive power and be charged wirelessly or through the connectors of a battery pack. For example, when such a battery pack is used in a mobile phone, the user may wish to place the phone on a wireless charger or plug the device in to a wired charger for charging or charge the device as well as synchronize or upload and/or download data or other information. In the second case, it may be important for the battery pack to recognize current incoming to the battery pack and to take some sort of action. This action can include, e.g. notifying the user, shutting off the wired charger by a switch or simply shutting down the charger IC and sending a signal back through the microcontroller and modulating the current back to the charger that a wired charger is present (in case priority is to be given to the wired charger) or conversely to provide priority to the wireless charger and shut off wired charger access to battery when the wireless charger is charging the battery. At either case, a protocol for dealing with presence of two chargers simultaneously should be pre-established and implemented in hardware and firmware.

As shown in FIG. 6, the wireless charging of battery occurs with current flowing into the battery through the battery contacts from the mobile device. Typically, such current is provided by an external DC supply to the mobile device (such as an AC/DC adaptor for a mobile phone) and the actual charging is handled by a charger IC chip or power management IC inside the mobile device that in addition to charging the battery, measures the battery's state of charge, health, verifies battery authenticity, and displays charge status through LEDs, display, etc. to a user. It may be therefore be advantageous to include a current sense circuit at one of the battery pack contacts to measure and sense the direction of current flow into or out of the battery. In situations where the current is flowing inwards (i.e. the battery is being externally charged through a wired charging connection, and/or through a mobile device), the microcontroller can take the actions described above and shut off wireless charging or conversely, provide priority to wireless charging and if it is present, allow or disallow wired charging as the implementation requires.

In many applications, it is important to include a feature that can inform a mobile device user about the state of charge of a battery pack in the device. To enable an accurate measurement of the remaining battery charge, several gas gauging techniques can be implemented, in general by incorporating a remaining charge IC or circuitry in the battery or in the device. In accordance with an embodiment, the mobile device can also include a Power Management Integrated Circuit (PMIC) or a fuel or battery gauge that communicates with the wirelessly chargeable battery and measures its degree of charge and display this status on the mobile device display or inform the user in other ways. In another embodiment, this information is transmitted to the charger and also displayed on the charger. In typical circumstances, a typical fuel gauge or PMIC may use battery voltage/impedance, etc. as well as measurement of the current and time for the current entering the mobile device (coulomb counting) to determine the status of the battery charge. However in a wirelessly charged system, this coulomb counting may have to be carried out in the battery rather than in the mobile device, and then communicated to the mobile device or the charger, since the charge is entering the battery directly through the onboard wireless power receiver and circuitry. The communication between the mobile device and the battery is through the connectors of the battery and may involve communication with an on-board microcontroller in the battery pack. In accordance with an embodiment, the wirelessly chargeable battery pack can include appropriate microcontroller and/or circuitry to communicate with the mobile device or wireless charger circuitry and update its state of charge, even though no current may be externally applied (through a wired power supply or charger) to the mobile device and the battery is charged wirelessly. In simpler fuel gauge techniques, the battery voltage, impedance, etc. can be used to determine battery charge status, and that in turn can be accomplished by performing appropriate measurements by the mobile device circuitry through battery connector points or by appropriate circuitry that may be incorporated in the wirelessly chargeable battery pack and/or in the mobile device or its PMIC or circuitry. FIG. 6 shows an embodiment where a microcontroller or circuit inside the battery pack is included to accomplish the fuel gauge task and report the state of charge to the device. This circuitry can be the same, or different, from an ID chip used to identify the battery and can communicate through a common battery connector or a separate one.

In accordance with an embodiment, the firmware in the receiver micro-controller plays a key role in the operation of this battery pack. The micro-controller can measure voltages and currents, flags, and temperatures at appropriate locations for proper operation. In accordance with one embodiment, by way of example, the micro-controller can measure the value of $V_{out}$ from the rectifier circuit and attempt to keep this constant throughout the charging cycle thereby providing a stable regulated DC supply to the charger IC chip. The microcontroller can report the value of this voltage or error from a desired voltage (for example 5V) or simply a code for more or less power back to the charger in a binary or multi-level coding scheme through a load modulation or other scheme (for example RF communication, NFC, Bluetooth, etc. as described earlier) back to the charger. The charger can then take action through adjustment of input voltage to the charger coil, adjustment of the frequency or duty cycle of the AC voltage applied to the charger coil to bring the $V_{out}$ to within required voltage range or a combination of these actions or similar methods. The microcontroller throughout the charging process, in addition, may monitor the end of charge and/or other signals from charger and/or protection circuit and the current sense circuit (used to sense battery pack current direction and value) to take appropriate action. Li-Ion batteries for example need to be charged below a certain temperature for safety reasons. In accordance with an embodiment, it is therefore desirable to monitor the cell, wireless power receiver coil or other temperature and to take appropriate action, such as to terminate charging or lower charging current, etc. if a certain maximum temperature is exceeded.

It will be noted that during charging, as shown in FIG. 8, the battery cell voltage increases from 3 V or lower, to 4.2 V, as it is charged. The $V_{out}$ of the wireless power receiver is input to a charger IC and if this $V_{out}$ is kept constant (for example 5V), a large voltage drop (up to 2 V or more) can occur across this IC especially during Stage 1 where maximum current is applied. With charging currents of up to 1 A, this may translate to up to 2 Watts of wasted power/heat across this IC that may contribute to battery heating. In accordance with an embodiment, it is therefore desirable to implement a strategy whereby the $V_{out}$ into the charger IC tracks the battery voltage thereby creating a smaller voltage drop and therefore loss across the charger IC. This can provide a significant improvement in performance, since thermal performance of the battery pack is very important.

In accordance with an embodiment, the communication between the receiver and charger needs to follow a pre-determined protocol, baud rate, modulation depth, etc. and a pre-determined method for hand-shake, establishment of communication, and signaling, etc. as well as optionally methods for providing closed loop control and regulation of power, voltage, etc. in the receiver.

Figure 9:
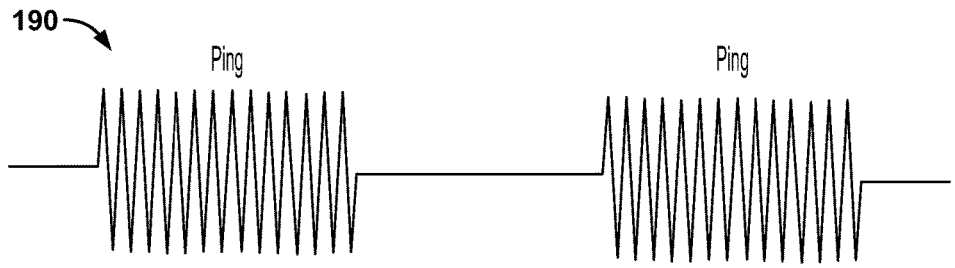
FIG. 9 illustrates a typical wireless power system operation, in accordance with an embodiment.

In accordance with an embodiment, a typical wireless power system operation 190 as further shown in FIG. 9 can be as follows: the charger periodically activates the charger coil driver and powers the charger coil with a drive signal of appropriate frequency. During this 'ping' process, if a receiver coil is placed on top or close to the charger coil, power is received through the receiver coil and the receiver circuit is energized. The receiver microcontroller is activated by the received power and begins to perform an initiation process whereby the receiver ID, its presence, power or voltage requirements, receiver or battery temperature or state of charge and/or other information is sent back to the charger. If this information is verified and found to be valid, then the charger proceeds to provide continuous power to the receiver. The receiver can alternately send an end of charge, over-temperature, battery full, or other messages that will be handled appropriately by the charger and actions performed. The length of the ping process should be configured to be of sufficient length for the receiver to power up its microcontroller and to respond back and for the response to be received and understood. The length of time between the pings can be determined by the implementation designer. If the ping process is performed often, the stand-by power use of the charger is higher. Alternately, if the ping is performed infrequently, the system will have a delay before the charger discovers a receiver nearby. So in practice, a balance must be achieved.

Alternately, the ping operation can be initiated upon discovery of a nearby receiver by other means. This provides a very low stand-by power use by the charger and may be performed by including a magnet in the receiver and a magnet sensor in the charger or through optical, capacitive, weight, NFC or Bluetooth, RFID or other RF communication or other methods for detection. Alternatively, the system can be designed or implemented to be always ON (i.e. the charger coil is powered at an appropriate drive frequency) or pinged periodically and presence of the receiver coil brings the coil to resonance with the receiver coil and power transfer occurs. The receiver in this case may not even contain a microcontroller and act autonomously and may simply have a regulator in the receiver to provide regulated output power to a device, its skin, case, or battery. In those embodiments in which periodic pinging is performed, the presence of a receiver can be detected by measuring a higher degree of current flow or power transfer or other means and the charger can simply be kept on to continue transfer of power until either the power drawn falls below a certain level or an end of charge and/or no device present is detected. In another embodiment, the charger may be in an off or standby, or low or no power condition, until a receiver is detected by means of its presence through a magnetic, RF, optical, capacitive or other methods. For example, in accordance with an embodiment the receiver can contain an RFID chip and once it is present on or nearby the charge, the charger would turn on or begin pinging to detect a receiver.

Figure 10:
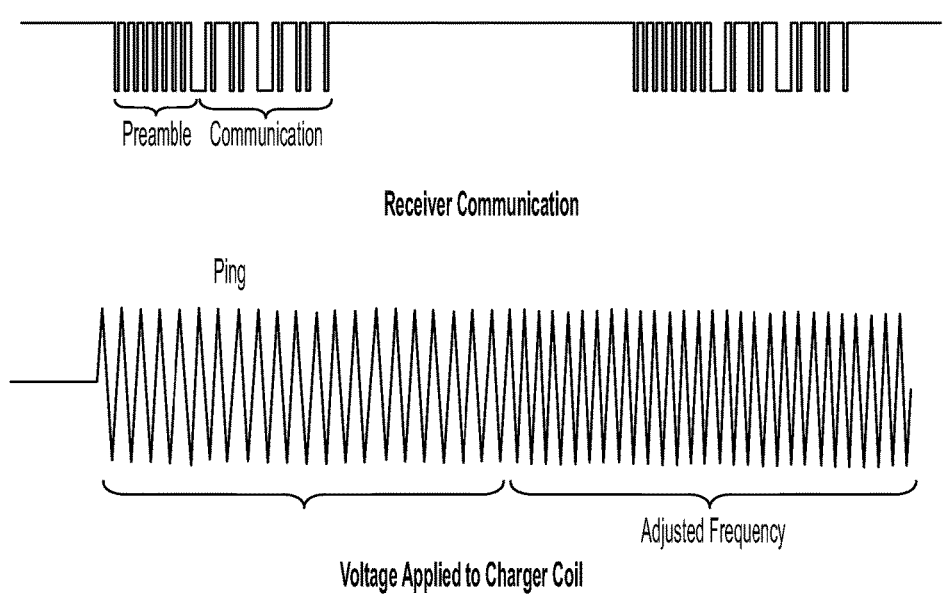
FIG. 10 illustrates a communication process and regulation of power and/or other functions, in accordance with an embodiment.

In accordance with an embodiment, the protocol used for communication can be any of, e.g. common RZ, NRZ, Manchester code, etc. used for communication. An example of the communication process and regulation of power and/or other functions is shown in FIG. 10. As described above, the charger can periodically start and apply a ping voltage 200 of pre-determined frequency and length to the charger coil (as shown in the lower illustration in FIG. 10). The receiver is then activated, and may begin to send back communication signals as shown in top of FIG. 10. The communication signal can include an optional preamble that is used to synchronize the detection circuit in the charger and prepare it for detection of communication. A communication containing a data packet may then follow, optionally followed by checksum and parity bits, etc. Similar processes are used in communication systems and similar techniques can be followed. In accordance with an embodiment, the actual data packet can include information such as an ID code for the receiver, received voltage, power, or current values, status of the battery, amount of power in the battery, battery or circuit temperature, end of charge or battery full signals, presence of external wired charger, or a number of the above. Also this packet may include the actual voltage, power, current, etc. value or the difference between the actual value and the desired value or some encoded value that will be useful for the charger to determine how best to regulate the output.

Alternatively, the communication signal can be a pre-determined pattern that is repetitive and simply lets the charger know that a receiver is present and/or that the receiver is a valid device within the power range of the charger, etc. Any combination of systems can be designed to provide the required performance.

In response to the receiver providing information regarding output power or voltage, etc. the charger can modify voltage, frequency, duty cycle of the charger coil signal or a combination of the above. The charger can also use other techniques to modify the power out of the charger coil and to adjust the received power. Alternatively the charger can simply continue to provide power to the receiver if an approved receiver is detected and continues to be present. The charger may also monitor the current into the charger coil and/or its temperature to ensure that no extra-ordinary fault conditions exist. One example of this type of fault may be if instead of a receiver, a metal object is placed on the charger.

In accordance with an embodiment, the charger can adjust one or more parameters to increase or decrease the power or voltage in the receiver, and then wait for the receiver to provide further information before changing a parameter again, or it can use more sophisticated Proportional Integral Derivative (PID) or other control mechanism for closing the loop with the receiver and achieving output power control. Alternatively, as described above, the charger can provide a constant output power, and the receiver can regulate the power through a regulator or a charger IC or a combination of these to provide the required power to a device or battery.

Various manufacturers may use different encodings, and also bit rates and protocols. The control process used by different manufacturers may also differ, further causing interoperability problems between various chargers and receivers. A source of interoperability differences may be the size, shape, and number of turns used for the power transfer coils. Furthermore, depending on the input voltage used, the design of a wireless power system may step up or down the voltage in the receiver depending on the voltage required by a device by having appropriate number of turns in the charger and receiver coils. However, a receiver from one manufacturer may then not be able to operate on another manufacturer charger due to these differences in designs employed. It is therefore beneficial to provide a system that can operate with different receivers or chargers and can be universal.

The resonant frequency, F of any LC circuit is given by:

$$F = 1/2\pi C$$

where L is the Inductance of the circuit or coil in Henries and C is the Capacitance in Farads. For the system shown in FIG. 2, one may use the values of C1 and L1 in the above calculation for a free running charger and as a Receiver is brought close to this circuit, this value is changed by the mutual coupling of the coils involved. It must be noted that in case a ferrite shield layer is used behind a coil in the charger and/or receiver, the inductance of the coil is affected by the permeability of the shield and this modified permeability should be used in the above calculation. In accordance with an embodiment, to be able to detect and power/charge various receivers, the charger can be designed such that the initial ping signal is at such a frequency range to initially be able to power and activate the receiver circuitry in any receiver during the ping process. After this initial power up of the receiver, the charger communication circuit should be able to detect and understand the communication signal from the receiver. Many microcontrollers are able to communicate in multiple formats and may have different input pins that can be configured differently to simultaneously receive the communication signal and synchronize and understand the communication at different baud rates and protocols. In accordance with an embodiment, the charger firmware can then decide on which type of receiver is present and proceed to regulate or implement what is required (end of charge, shut-off, fault condition, etc.). Depending on the message received, the charger can then decide to change the charger driver voltage amplitude, frequency, or duty cycle, or a combination of these or other parameters to provide the appropriate regulated output.

In accordance with an embodiment, the charger's behavior can also take into account the difference in the coil geometry, turns ratio, etc. For example, a charger and receiver pair from one or more manufacturers may require operation of the charger drive voltage at 150 kHz. However, if the same receiver is placed on a charger from another manufacturer or driven with different coil/input voltage combination, to achieve the same output power, the charger frequency may need to be 200 kHz. The charger program may detect the type of receiver placed on it and shift the frequency appropriately to achieve a baseline output power and continue regulating from there. In accordance with an embodiment, the charger can be implemented so that it is able to decode and implement multiple communication and regulation protocols and respond to them appropriately. This enables the charger to be provided as part of a multi-protocol system, and to operate with different types of receivers, technologies and manufacturers.

For receivers that contain an onboard regulator for the output power, stability of the input voltage to the regulator is not as critical since the regulator performs a smoothing function and keeps the output voltage at the desired level with any load changes. It is however, important not to exceed the maximum rated input voltage of the regulator or to drop below a level required so that the output voltage could no longer be maintained at the required value. However, in general, inclusion of a regulator and/or a charger IC chip (for batteries) reduces the power/voltage regulation requirements of the wireless power receiver portion of the circuit at the expense of the additional size and cost of this component. In accordance with some embodiments, simpler voltage limiting output stages such as Zener diodes or other voltage limiting or clamping ICs or circuits, can be used.

While the system above describes a system wherein the communication is primarily through the coil, as described earlier, communication can also be implemented through a separate coil, RF, optical system or a combination of the above. In such circumstances, a multi-protocol system can also be used to interoperate between systems with different communication and/or control protocols or even means of communication.

Electromagnetic Interference (EMI) is an important aspect of performance of any electronic device. Any device to be sold commercially requires adherence to regulation in different countries or regions in terms of radiated power from it. Any power supply (wired or wireless) that includes high frequency switching can produce both conducted and radiated electromagnetic interference (EMI) at levels that exceed the acceptable limits so extreme care must be taken to keep such emissions to a minimum.

For an inductive charger comprising a number of coils and electronics switches and control circuitry, the main sources of emission include:

Any potential radiated noise from switching FETS, drivers, etc. or sense and control circuitry. This noise can be at higher frequency than the fundamental drive frequency of the coils and can be emitted away from the charger because of the frequency. This noise can be minimized by optimizing the drive circuit to avoid sharp edges in the drive waveform and associated noise.

Noise from copper traces with AC signals. This noise can also be at higher frequency and emit away from the charger. The length of these paths must be minimized.

EM emission from the switched coil. For coils described here and driven in the 100's of kHz up to several MHz, the wavelength of the Electromagnetic (EM) field generated can be in the hundreds of meters. Given the small length of the coils windings (often 1 m or less), the coils used are not efficient far-field transmitters of the EM field and the generated EM field is in general highly contained near the coil surface. The magnetic flux pattern from a PCB coil is highly contained in the area of a coil and does not emit efficiently away from the coil.

Care must be taken when designing the current paths, and in some embodiments shielding of the FETs or other ICs or electronics components may be necessary. In addition, switching the coils with waveforms that have higher frequency components, gives rise to noise at higher frequencies. In any of the above geometries described, incorporation of conductive layers and/or ferromagnetic layers in the system can shield the outside environment from any potential radiative fields. The conductive layers may be incorporated in the PCB to eliminate the need for additional separate shielding layers.

In any of the configurations described here, care must be taken when designing the current paths, and in some embodiments shielding of the FETs or other ICs or electronics components may be necessary. The shielding may be implemented by incorporation of ferrite or metal sheets or components or a combination thereof. Use of thin layers (typically several micrometers of less in thickness) of metal or other conductive paint, polymer, nano material, dielectric or alike that take advantage of frequency dependence of the skin effect to provide a frequency dependent shielding or attenuation have been described in other patent applications (for example, U.S. Patent Publication No. 2009/0096413, herein incorporated by reference) where a process for incorporating a thin layer of metal in the top layer or other areas of the charger have been described. Since the layer does not absorb incident EM fields at the frequency of operation of the device, they would pass through even on the top surface of the charger (facing the charger coil) but higher frequency components would be absorbed reducing or eliminating the harmful effect of higher frequency components radiation to nearby devices, interference, or effects on living organisms or humans and meeting regulatory conditions for operation. It is therefore possible to incorporate the charger or receiver into parts or products where the charger and/or receiver coil is covered by a thin layer of conductive or conductive containing material or layer. Such conductive material may include metallic, magnetic, plastic electronic or other material or layers.

In many situations the frequency content of any EMI emissions from the wireless charger and receiver is important, and care must be taken that the fundamental frequency and its harmonics do not exceed required values and do not cause unnecessary interference with other electronic devices, vehicles or components nearby. In accordance with an embodiment, one method that can be used to reduce the peak value of such emissions is to intentionally introduce a controlled dither (variation) to the frequency of the operation of the charger. Such a dither would reduce the peak and spread the frequency content of the fundamental emission and its harmonic over a range of frequencies determined by the amount of the dither or shift introduced. Appropriate implementation of dither can reduce undesired interference issues at a given frequency to acceptable levels. However, the overall emitted power may not be reduced. To introduce a dither in any of the systems described here, the charger driver can be appropriately driven by the MCU to dither its operating frequency or this can be hard wired into the design. Introduction of dither would typically introduce a slow ripple to the output voltage from the receiver. However, this slow ripple can be kept to a minimum or a regulator or circuit can be incorporated into the receiver to reduce this ripple to an acceptable level or to eliminate it.

In accordance with an embodiment, the multi-protocol approaches described here are important for development of a universal system that can operate amongst multiple systems and provide user convenience.

In accordance with an embodiment, the systems described here may use discreet electronics components or some or all of the functions described above may be integrated into an Application Specific Integrated Circuit (ASIC) to achieve smaller footprint, better performance/noise, etc. and/or cost advantages. Such integration is common in the Electronics industry and can provide additional advantages here.

In many cases, for the systems described above, the transmitter and receiver coils may be of similar, although not necessarily same sizes and are generally aligned laterally to be able to transfer power efficiently. For coils of similar size, this would typically require the user to place the device and/or receiver close to alignment with respect to the transmitter coil. For example, for a transmitter/receiver coil of 30 mm diameter, this would require lateral (x,y) positioning within 30 mm so there is some degree of overlap between the coils. In practice, a considerable degree of overlap is necessary to achieve high output powers and efficiencies. This may be achieved by providing mechanical or other mechanisms such as indentations, protrusions, walls, holders, fasteners, etc. to align the parts.

However for a universal charger/power supply to be useful for charging or powering a range of devices, a design able to accept any device and receiver is desirable. For this reason, in accordance with an embodiment, a flat or somewhat curved charger/power supply surface that can be used with any type of receiver may be used. To achieve alignment in this case, markings, small protrusions or indentations and/or audio and/or visual aids or similar methods can be used. Another method includes using magnets, or magnet(s) and magnetic or ferrite magnetic attractor material(s) that can be attracted to a magnet in the transmitter/charger and receiver. In these methods, typically a single charger/transmitter and receiver are in close proximity and aligned to each other.

However, for even greater ease of use, it may be desirable to be able to place the device to be charged/powered over a larger area, without requiring precise alignment of coils. There are several methods that have been previously used for this.

Several other methods that address the topic of position independence have been described previously. For example, as described in U.S. Patent Publication No. 20070182367 and U.S. Patent Publication No. 20090096413, both of which applications are herein incorporated by reference, an embodiment comprising multiple transmitter coils arranged in a two-dimensional array to cover and fill the transmitter surface is described. When a receiver is placed on the surface of such a coil array, the transmitter coil with the largest degree of overlap with the receiver is detected and activated to allow optimum power transmission and position independent operation. The detection mechanism can be through, e.g. detection of weight, capacitive, optical, mechanical, magnetic RFID, RF, or electrical sensing of the receiver. In accordance with an embodiment, the coils in the charger/power supply are sequentially powered (pinged) and the charger/power supply waits for any possibly receivers to be powered up and reply to the ping. If no reply is detected back within a time window, the next coil is activated, etc. until a reply is detected in which case the charger/power supply initiates power up of the appropriate transmitter coil(s) and proceeds to charge/power the receiver.

In another geometry, each transmitter (or charger) coil center includes a sensor inductor (for example, E. Waffenschmidt, and Toine Staring, 13th European Conference on Power Electronics and Applications, Barcelona, 2009. EPE '09. pp. 1-10). The receiver coil includes a soft magnetic shield material that shifts the resonance frequency response of the system and can be sensed by a sensor in the transmitter to switch the appropriate coil on. The drawback of this system is that 3 layers of overlapping coils with a sensor and detection circuit at the center of each is required adding to the complexity and cost of the system. Other variations of the above or a combination of techniques can be used to detect the appropriate transmitter coil.

In accordance with other embodiments, described in U.S. Patent Publication No. 2007/0182367 and U.S. Patent Publication No. 2009/0096413, the charger/power supply may contain one or more transmitter coils that are suspended and free to move laterally in the x-y plane behind the top surface of the charger/power supply. When a receiver coil is placed on the charger/power supply, the closest transmitter coil would move laterally to position itself to be under and aligned with the receiver coil. One passive method of achieving this may be to use magnets or a combination of magnet(s) and attractor(s) (one or more attached to the transmitter coil or the movable charging component and one or more to the receiver coil or receiver) that would attract and passively align the two coils appropriately. In another embodiment, a system that detects the position of the receiver coil on the charger/power supply surface and uses this information to move the transmitter coil to the appropriate location actively using motors, piezo or other actuators, etc. is possible.

In general the systems above describe use coils that are of similar size/shape and in relatively close proximity to create a wireless power system.

As described above, the coupling coefficient k is an important factor in design of the wireless power system. In general, wireless power systems can be categorized into two types. One category which is called tightly coupled operates in a parameter space where the k value is typically 0.5 or larger. This type of system is characterized by coils that are typically similar in size and/or spatially close together in distance (z axis) and with good lateral (x,y) overlap. This so called tightly coupled system is typically associated with high power transfer efficiencies defined here as the ratio of output power from the receiver coil to input power to transmitter coil. The methods described above for position independent operation (array of transmitter coils and moving coils), typically may use tightly coupled coils.

In contrast, for coils of dissimilar size or design or larger transmitter to receiver distance or smaller lateral coil overlap, the system coupling coefficient is lower. Another important parameter, the quality factors of a transmitter (tx) and receiver (rx) coil are defined as:

$Q_{tx}=2\pi f L_{tx}/R_{tx}$ and $Q_{rx}=2\pi f L_{rx}/R_{rx}$, respectively, where f is the frequency of operation, $L_{tx}$ and $L_{rx}$ the inductances of the transmitter and receiver coils and $R_{tx}$ and $R_{rx}$ their respective resistances. The system quality factor can be calculated as follows:

$Q=(Q_{tx}Q_{rx})^{1/2}$.

In general, the loosely coupled systems may have smaller power transfer efficiencies. However, it can be shown (see for example, E. Waffenschmidt, and Toine Staring, 13th European Conference on Power Electronics and Applications, Barcelona, 2009. EPE '09. pp. 1-10) that an increase of Q can compensate for smaller k values, and reasonable or similar power transfer efficiencies can be obtained. Such systems with dissimilar coil sizes and higher Q values are sometimes referred to as Resonant Coupled or Resonant systems. However, resonance is also often used in the case of similar-size coil systems. Others, (such as Andre Kurs, Aristeidis Karalis, Robert Moffatt, J. D. Joannopoulos, Peter Fisher, and Marin Soljac, Science, 317, P. 83-86, 2007; and http://newsroom.intel.com/docs/DOC-1119) have shown that with systems with k of <0.2 due to large distance between coils (up to 225 cm), sizeable reported power transfer efficiencies of 40%-70% can be obtained. Other types of loosely coupled system appear to use mis-matched coils where the transmitter coil is much larger than the receiver coil (see for example, J. J. Casanova, Z. N. Low, J. Lin, and Ryan Tseng, in Proceedings of Radio Wireless Symposium, 2009, pp. 530-533 and J. J. Casanova, Z. N. Low, and J. Lin, IEEE Transactions on Circuits and Systems—II: Express Briefs, Vol. 56, No. 11, November 2009, pp. 830-834 and a Fujitsu System described at http://www.fujitsu.com/global/news/pr/archives/month/2010/20100913-02.htm-1).

Previous references (e.g., U.S. Pat. Nos. 6,906,495, 7,239,110, 7,248,017, and 7,042,196) describe a loosely coupled system for charging multiple devices whereby a magnetic field parallel to the plane of the charger is used. In this case, the receiver contains a coil that is typically wrapped around a magnetic material such as a rectangular thin sheet and has an axis parallel to the plane of the charger. To allow the charger to operate with the receiver rotated to any angle, two sets of coils creating magnetic fields parallel to the plane of the charger at 90 degrees to each other and driven out of phase are used.

Such systems may have a larger transmitter coil and a smaller receiver coil and operate with a small k value (possibly between 0 and 0.5 depending on coil size mismatch and gap between coils/offset of coils). Of course the opposite case of a small transmitter coil and larger receiver coil is also possible.

Figure 11:
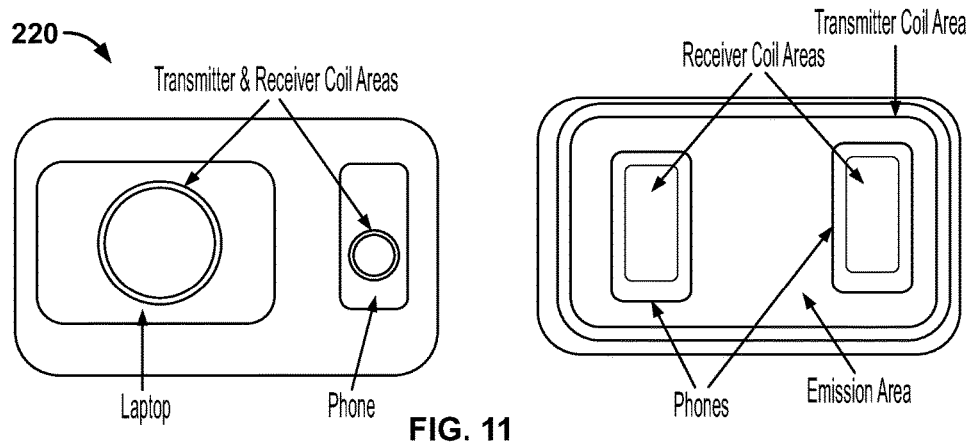
FIG. 11 illustrates configurations for a tightly coupled power transfer system with individual transmitter coils of different size, in accordance with an embodiment.

FIG. 11 shows configurations 220 for a tightly coupled power transfer system with 2 individual transmitter coils of different size powering a laptop and a phone (left) and a loosely coupled wireless power system with a large transmitter coil powering 2 smaller receiver coils in mobile phones (right).

An ideal system with largely mis-matched (i.e. dissimilar in size/shape) coils can potentially have several advantages. Power can be transferred to the receiver coil placed anywhere on the transmitter coil. Several receivers can be placed and powered on one transmitter allowing for simpler and lower cost of transmitter. The system with higher Q can be designed so the gap between the transmitter and receiver coil can be larger than a tightly coupled system leading to design of systems with more design freedom. In practice, power transfer in distances of several cm or even higher have been demonstrated. Power can be transferred to multiple receivers simultaneously. In addition, the receivers can potentially be of differing power rating or be in different stages of charging or require different power levels and/or voltages.

In order to achieve the above characteristics and to achieve high power transfer efficiency, the lower k value is compensated by using a higher Q through design of lower resistance coils, etc. The power transfer characteristics of these systems may differ from tightly coupled systems and other power drive geometries such as class E amplifier or Zero Voltage Switching (ZVS) or Zero Current Switching (ZCS) or other power transfer systems may operate more efficiently in these situations. In additions, impedance matching circuits at the charger/transmitter and/or receiver may be required to enable these systems to provide power over a range of load values and output current conditions. General operation of the systems can, however be quite similar to the tightly coupled systems and one or more capacitors in series or parallel with the transmitter and/or receiver coil is used to create a tuned circuit that may have a resonance for power transfer. Operating near this resonance point, efficient power transfer across from the transmitter to the receiver coil can be achieved. Depending on the size difference between the coils and operating points, efficiencies of over 40% or 50% up to near 80% have been reported.

Figure 12:
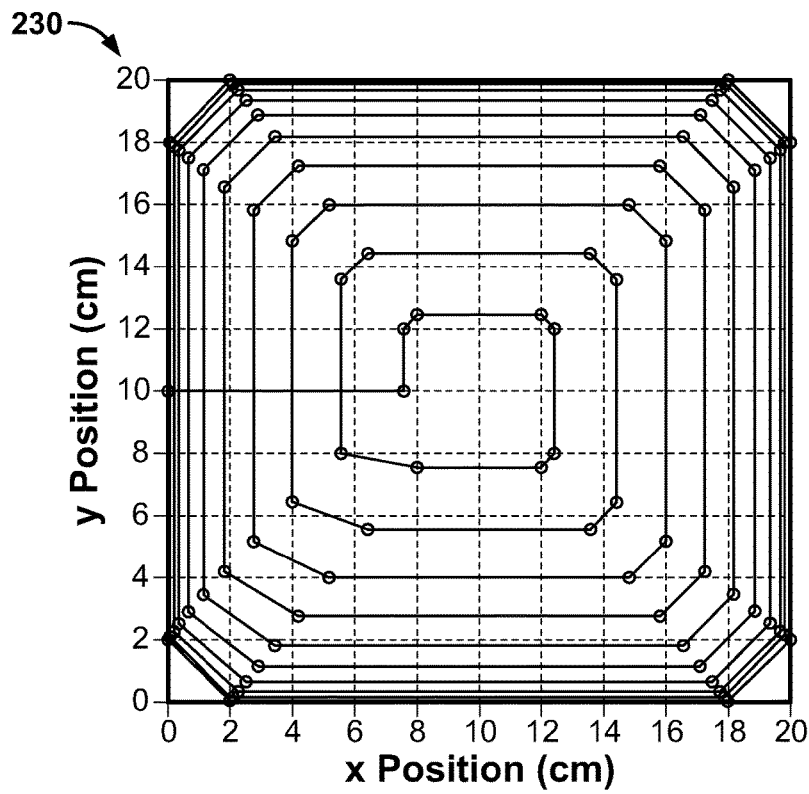
FIG. 12 illustrates a coil, in accordance with an embodiment.
Figure 13:
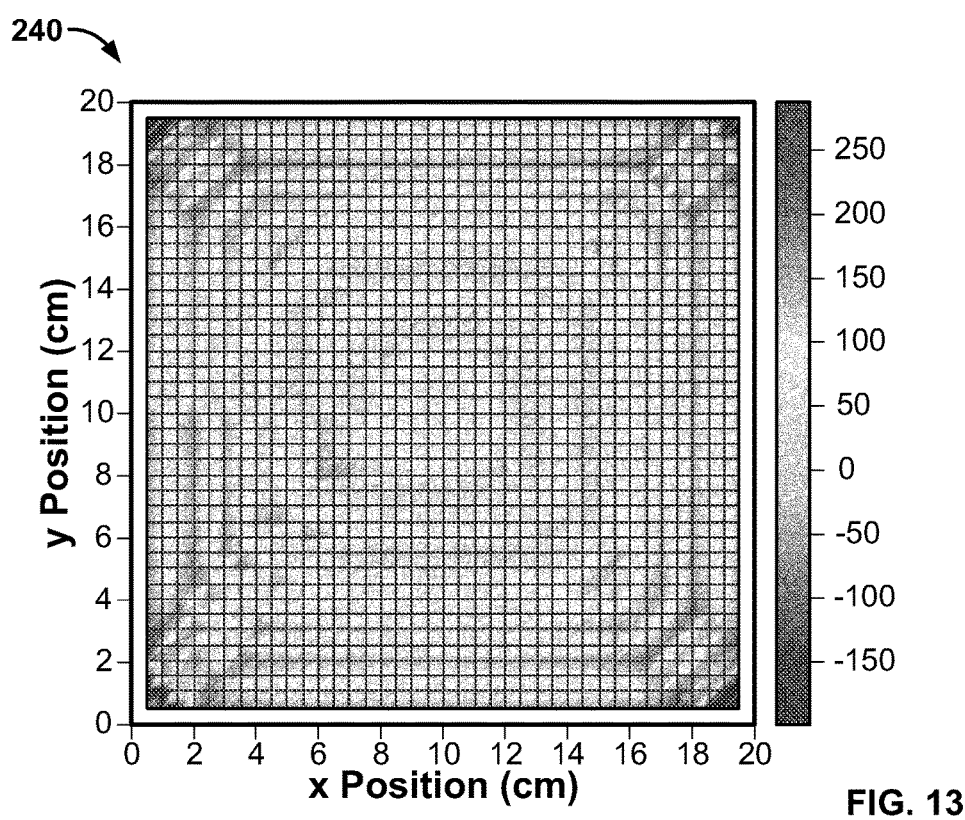
FIG. 13 illustrates a resulting calculated magnetic field, in accordance with an embodiment.

To provide more uniform power transfer across a coil, methods to provide a more uniform magnetic field across a coil can be used. One method for achieving this uses a hybrid coil comprising a combination of a wire and PCB coils (see, for example, X. Liu and S. Y. R. Hui, "Optimal design of a hybrid winding structure for planar contactless battery charging platform," IEEE Transactions on Power Electronics, vol. 23, no. 1, pp. 455-463, 2008). In another method, the transmitter coil is constructed of Litz wire and has a pattern that is very wide between successive turns at the center and is more tightly wound as one gets closer to the edges (see, for example, J. J. Casanova, Z. N. Low, J. Lin, and R. Tseng, "Transmitting coil achieving uniform magnetic field distribution for planar wireless power transfer system," in Proceedings of the IEEE Radio and Wireless Symposium, pp. 530-533, January 2009). FIG. 12 shows a coil 230 demonstrated therein, while FIG. 13 shows the resulting calculated magnetic field 240. In a geometry described in U.S. Patent Publication No. 2008/0067874, also incorporated herein by reference, a planar spiral inductor coil is demonstrated, wherein the width of the inductor's trace becomes wider as the trace spirals toward the center of the coil to achieve a more uniform magnetic field allowing more positioning flexibility for a receiver across a transmitter surface. In yet other embodiments (F. Sato, et al., IEEE Digest of Intermag 1999, PP. GR09, 1999), the coil can be a meandering type of coil wherein the wire is stretched along X direction and then folds back and makes a back and forth pattern to cover the surface.

In accordance with an embodiment, the charger can operate continuously, and any receiver placed on or near its surface will bring it to resonance and will begin receiving power. The regulation of power to the output can be performed through a regulation stage at the receiver. Advantages of such a system include that multiple receivers with different power needs can be simultaneously powered in this way. The receivers may also have different output voltage characteristics. To achieve this, the number of turns on the receiver coil can be changed to achieve different receiver output voltages. Without any receivers nearby, such a charger would not be in resonance and would draw minimal power. At end of charge, the receiver can include a switch that will detect the minimal current draw by a device connected to the receiver, and disconnect the output altogether and/or disconnect the receiver coil so that the receiver is no longer drawing power. This will bring the charger out of resonance and minimal input current is drawn at this stage.

In accordance with another embodiment, the charger can periodically ping for receivers, and initiate and maintain power transfer if sufficient current draw from a receiver is detected. Otherwise, the charger can return to standby and continue pinging. Such a system would have even lower stand-by power usage.

In a more complex system, similar communication and control and/or receiver detection as described for the tightly coupled situation earlier can be applied for such loosely coupled systems. However, a wireless power system designed to power multiple receivers placed on a single transmitter (see, for example, "Qualcomm Universal Charging" available at http://www.qualcomm.com/common/documents/articles/eZone.sub.--052609.pdf) may need to regulate the power transfer and the voltage at each receiver differently depending on the status of the load/device that the power is being delivered to. In cases where multiple receivers are placed on one transmitter coil and it is desired to power/charge all devices, all receivers may try to communicate with the transmitter and the transmitter will need to distinguish between receivers and operate differently (e.g. at different power level, or switching frequency, etc.) with each one. Since the transmitter coil emits power to all the receivers, it may be difficult to regulate power delivered to each receiver differently. Therefore in a practical system, some degree of regulation of power to be delivered to a load or device may be performed in the receiver circuitry.

In another method of regulation, each receiver may time-share the transmitter power. Each receiver placed on a transmitter may synchronize and communicate with the transmitter and/or with other receivers through wireless RF communication or RFID or Near Field Communication, Bluetooth, WiFi, or communication through power transfer and/or separate coils or through optical or other methods. The transmitter may then power each receiver sequentially and deliver the appropriate power level through adjustment of the transmitter frequency, pulse width modulation, or adjustment of input voltage, or a combination of above methods. In order for this system to operate, it may be necessary for all or some of the receivers to disconnect from receipt of power during the time period when one receiver is receiving power. This can be accomplished by implementing and opening a switch in the path of the receiver coil circuit or disabling the receiver's output or its associated optional regulator or alike. In this way, only one receiver coil (or more depending on design and architecture) is at any given time magnetically coupled to the transmitter and receives power. After some period of time, that receiver may be disconnected by opening its appropriate switch and the next receiver powered, etc. Alternatively, one or more receivers may be powered at the same time. In this case, the receivers may need to share the available power so for example, while with one receiver 5 W of output power may be available, with 2 receivers, each can only output only 2.5 W, etc. This may be acceptable in many charging and/or power applications.

In any practical system, in addition to the power transfer and communication system, appropriate electromagnetic shielding of the transmitter and receiver is necessary and may be similar or different to the tightly coupled systems.

The ratio of the size of the transmitter coil to the receiver coil may be decided depending on design considerations such as the desired number of receivers to be powered/charged at any given time, the degree of positioning freedom needed, the physical size of device being charged/powered, etc. In the case that the transmitter coil is designed to be of a size to accommodate one receiver at a time, the transmitter and receiver coils may be of similar size thereby bringing the loosely coupled system to the tightly coupled limit in this case.

While the loosely coupled system may have distinct advantages and in some ways may overcome the complexities of the multiple coil/moving coil systems employed in tightly coupled systems to achieve position independence, traditional systems suffer from several issues:

Since a large area transmitter coil and smaller receiver coil may be used, Electromagnetic emission in areas of the transmitter coil not covered by the receiver coil is present.

This emission is in the near field and drops rapidly away from the coil. Nevertheless, it can have adverse effects on devices and/or people in the vicinity of the transmitter.

The receiver may be incorporated or attached to Electronic and electrical devices or batteries that often contain metallic components and/or circuits and/or parts/shells, etc. Such metallic sections that are not shielded may absorb the emitted EM field from the transmitter and create destructive and undesirable eddy currents and/or heating in these parts.

The Electromagnetic field emitted may also affect the operation of the device being powered or charged or even nearby devices that are not on the transmitter/charger. Such interference with device operation/reception or a drop in sensitivity of a radio transmitter/receiver (desense) is quite important in design of mobile or electronic devices such as mobile phones or communication devices. To avoid this effect, the portions of the device being charged or powered that may be exposed to the Electromagnetic (EM) field with the exception of the receiver coil area may need to be shielded causing severe restrictions on the device design and affecting operation of other antennas or wireless components in the device.

In many situations, an after-market or optional receiver such as a case, skin, carrier, battery or attachment with a receiver built in is desired to enable a mobile or electronic/electric device to be powered or charged wirelessly. To shield the entire device from EM radiation at locations beside the receiver coil, such an after-market or optional receiver will require shielding in all other locations of the device thereby severely limiting the design and choices in after-market products possible. For example, a battery with a built in receiver circuit and shielding may not be sufficient to protect a mobile device to be charged wirelessly. For example, in the case of a mobile phone, such a battery would cover only a small area of a mobile phone's back's surface area leaving the rest of the phone exposed to EM radiation which could have serious effects on its performance and operation. Furthermore, the shielding may affect the performance of the device and its multiple wireless components.

Metallic objects such as keys or coins or electronic devices or cameras that contain metal backs or circuits containing metals or other metal that are placed on a charger/transmitter may affect the operation of the transmitter and draw power from it due to eddy currents. This may result in excessive heating of such objects that is highly undesirable.

The EM field emitted from the transmitter further may be sufficiently physically close to a user as to be affecting and incident on the user. Such exposure to EM radiation may result in unwanted or unacceptable levels of exposure.

Many regulatory guidelines regarding the safe exposure limits for human and electrical/electronic device operation exists and awareness and concern regarding this issue is increasing. Any unnecessary exposure from an uncovered and operating area of a transmitter is highly undesirable.

A substantial amount of power from the transmitter may be lost from the area that is not physically covered by the receiver leading to lower efficiencies and wastage of power.

To capture the most amount of power and to achieve higher efficiencies, the receiver coil area must be maximized. This often leads to a larger receiver coil area than tightly coupled implementations.

It is therefore desired to benefit from the advantages of a loosely coupled system while minimizing or avoiding problems related to it.

In accordance with various embodiments described herein, through appropriate design of the system, and use of two novel techniques referred to herein as Magnetic Aperture (MA) and Magnetic Coupling (MC) respectively, the benefits of the use of a mismatched (in size) coil system can be retained, while overcoming the problems and issues raised above, leading to ideal systems for wireless power transfer.

Figure 14:
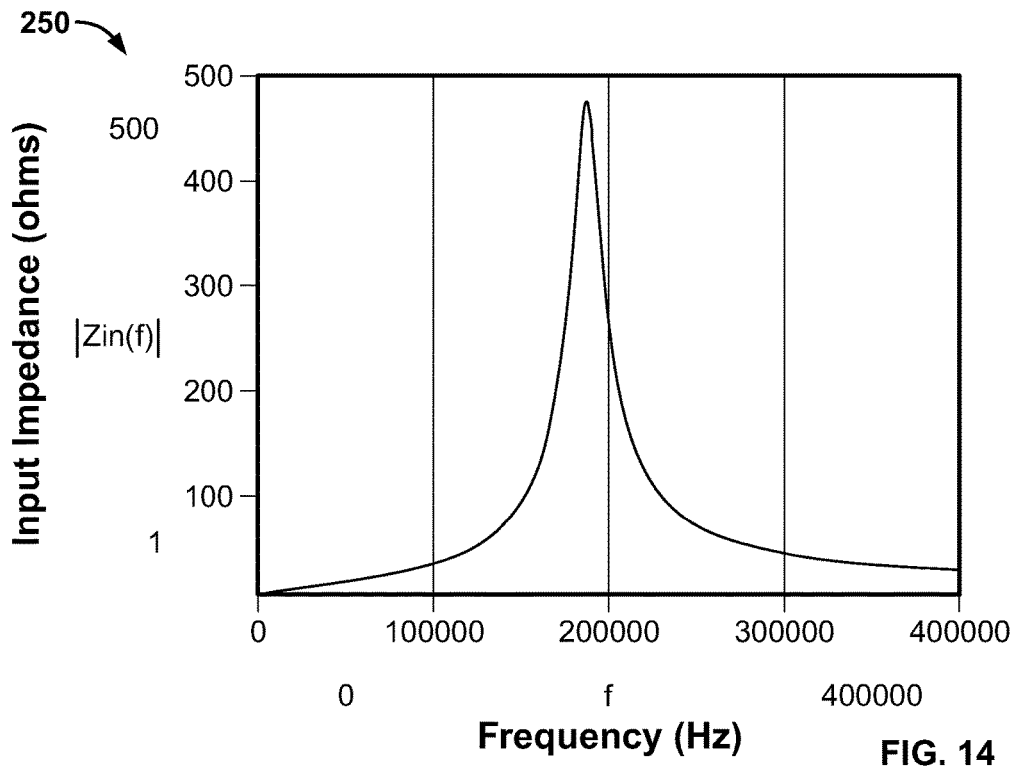
FIG. 14 illustrates the resonance in power transfer, in accordance with an embodiment.

As described above, a position independent system may be implemented by use of a large area transmitter coil upon which a smaller receiver coil may be placed on a variety or any location and receive power. Typically, a system such as shown in FIG. 2 includes capacitors in series and/or parallel with the transmitter and/or receiver coils to provide a resonant circuit that shows strong power transfer characteristics at particular frequencies. (See for example S. Y. Hui, H. S. H Chung, and S. C. Tang, IEEE Transactions on Power Electronics, Vol. 14, pp. 422-430 (1999), which shows an analysis method for such a system). Using values of $L1=46$ pH for the transmitter coil and $L2=4$ pH for the receiver (based on a 16 cm.times.18 cm 13-turn transmitter coil and a 4 cm.times.5 cm, 6-turn receiver coil (J. Casanova, Z. N. Low, and J. Lin, IEEE Trans. On Circuits and Systems—II, Express Briefs, Vol. 56, pp. 830-834 (2009)), and using 12 nF for the receiver capacitance, the impedance to the input supply of the transmitter can be calculated as shown in FIG. 14, clearly showing the resonance in power transfer 250.

In practice, a transmitter operating on or near resonance frequency does not draw much power until a receiver of appropriate inductance and capacitance is nearby thereby shifting its operating point and bringing it into resonance at which point, significant power can be drawn from the transmitter supply and enabling large power transfer and high power transfer efficiencies. However, as described above, a large area transmitter typically would also then emit power into areas not covered by the receiver coil, which could cause EMI and accompanying health issues.

In accordance with various embodiments, the techniques described herein allow operation of a position-independent power transfer system, while reducing or eliminating undesirable radiation from other areas of the transmitter coil. To achieve this, it is necessary to achieve the seemingly mutually exclusive conditions of low-to-no emission from a transmitter coil, with high-efficiency and position-independence operation at positions with the presence of the receiver coil. Ideally, this system is passive in that no complicated detection of receiver location and switching and control of the power transfer is necessary.

In accordance with an embodiment, a large transmitter coil and smaller receiver coil or coils similar to a loosely coupled system are used. However, to reduce or eliminate radiation from the transmitter coil, the transmitter coil is covered with a thin soft magnetic layer.

Figure 15:
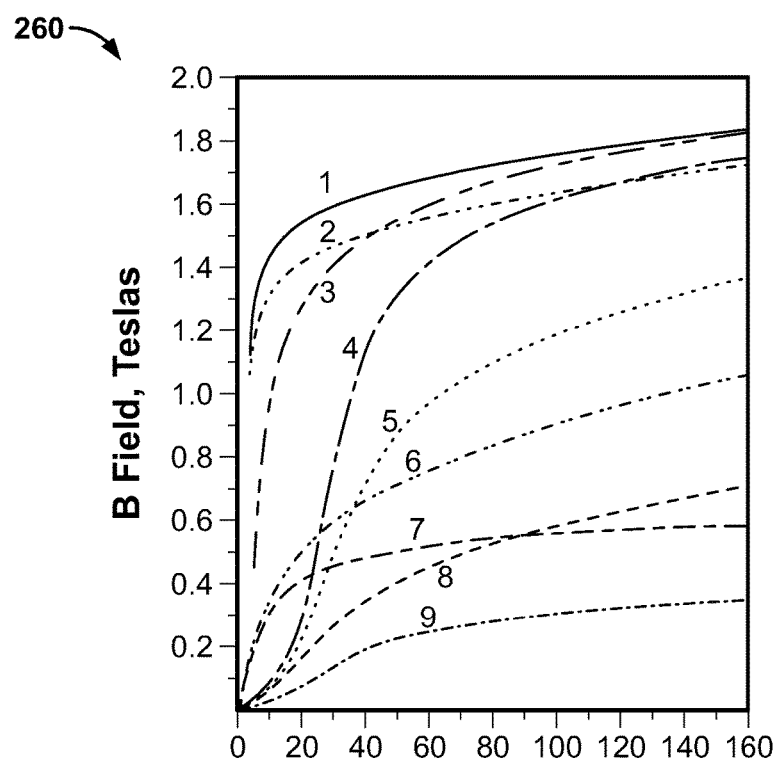
FIG. 15 illustrates the magnetization curves of a number of Ferromagnetic materials, in accordance with an embodiment.

FIG. 15 shows the magnetization curves 260 of a number of Ferromagnetic materials. They include sheet steel, silicon steel, cast steel, tungsten steel, magnet steel, cast iron, nickel, cobalt, and magnetite. In the linear regime of operation, the magnetic field strength H is related to the magnetic flux density B through the permeability of the material $\mu$:

$$B=\mu H+M$$

where M is the magnetization of a material. It must be noted that B, H, and M are vectors and $\mu$ is a scalar in isotropic materials and a tensor in anisotropic ones. In anisotropic materials, it is therefore possible to affect the magnetic flux in one direction with a magnetic field applied in another direction. The permeability of Ferromagnetic materials is the slope of the curves shown in FIG. 15 and is not constant, but depends on H. In Ferromagnetic or Ferrite materials as shown in FIG. 15, the permeability increases with H to a maximum, then as it approaches saturation it decreases by orders of magnitude toward one, the value of permeability in vacuum or air. Briefly, the mechanism for this nonlinearity or saturation is as follows: for a magnetic material consisting of domains, with increasing external magnetic field, the domains align with the direction of the field (for an isotropic material) and create a large magnetic flux density proportional to the permeability times the external magnetic field. As these domains continue to align, beyond a certain value of magnetic field, the domains are all practically aligned and no further increase in alignment is possible reducing the permeability of the material by orders of magnitude closer to values in vacuum or air.

Different materials have different saturation levels. For example, high permeability iron alloys used in transformers reach magnetic saturation at 1.6-2.2 Tesla (T), whereas ferromagnets saturate at 0.2-0.5 T. One of the Metglass amorphous alloys saturates at 1.25 T. The magnetic field (H) required to reach saturation can vary from 100 A/m or lower to 1000's of A/m. Many materials that are typically used in transformer cores include materials described above, soft iron, Silicon steel, laminated materials (to reduce eddy currents), Silicon alloyed materials, Carbonyl iron, Ferrites, Vitreous metals, alloys of Ni, Mn, Zn, Fe, Co, Gd, and Dy, nano materials, and many other materials in solid or flexible polymer or other matrix that are used in transformers, shielding, or power transfer applications. Some of these materials may be appropriate for applications in various embodiments described herein.

Figure 16:
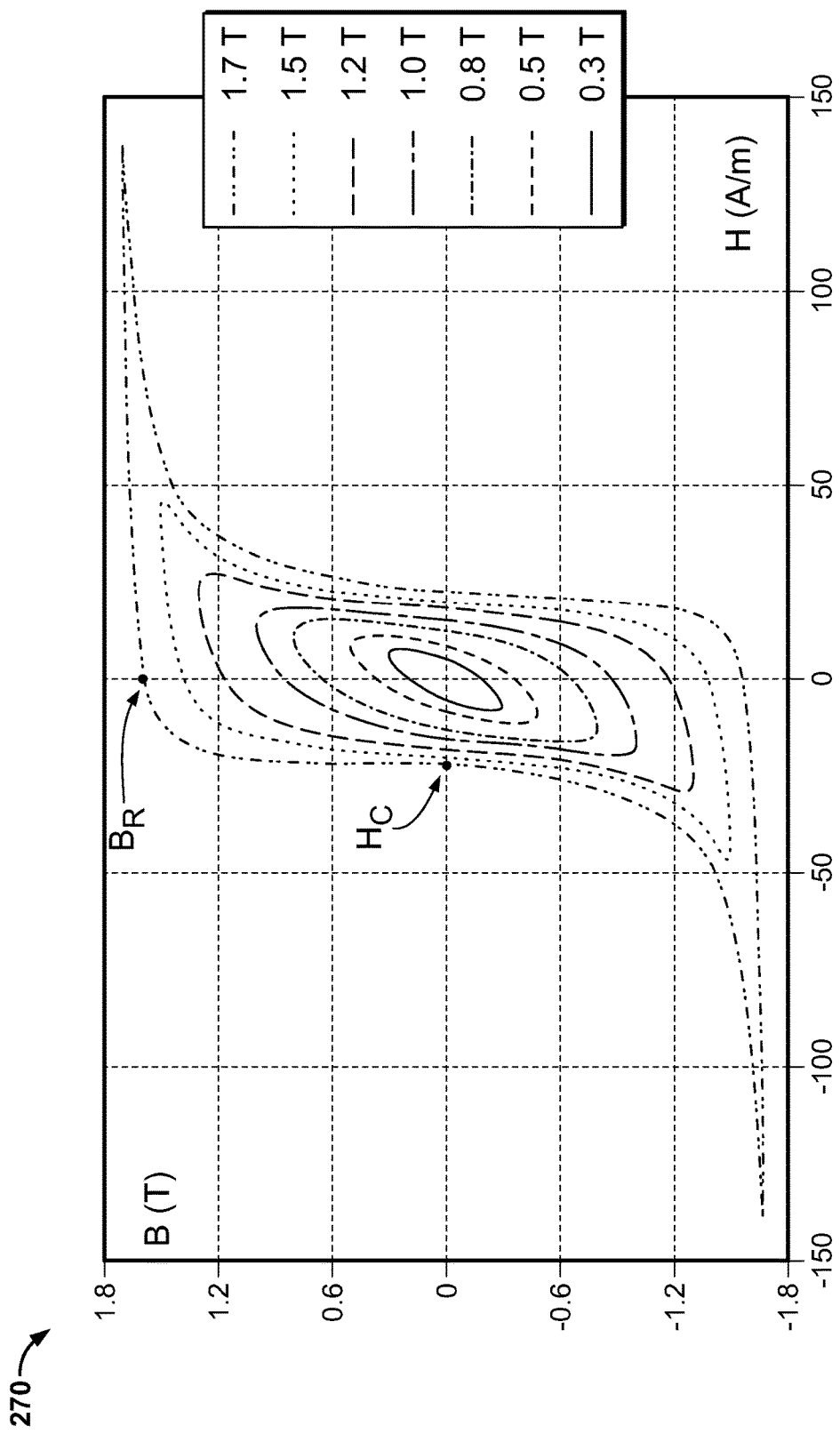
FIG. 16 illustrates the hysteresis curve for a hard ferromagnetic material such as steel, in accordance with an embodiment.

FIG. 16 shows the hysteresis curve 270 for a hard ferromagnetic material such as steel. As the magnetic field is increased, the magnetic flux saturates at some point, therefore no longer following the linear relation above. If the field is then reduced and removed, in some media, some value of B called the remanence (Br) remains, giving rise to a magnetized behavior. By applying an opposite field, the curve can be followed to a region where B is reduced to zero. The level of H at this point is called the coercivity of the material.

Figure 17:
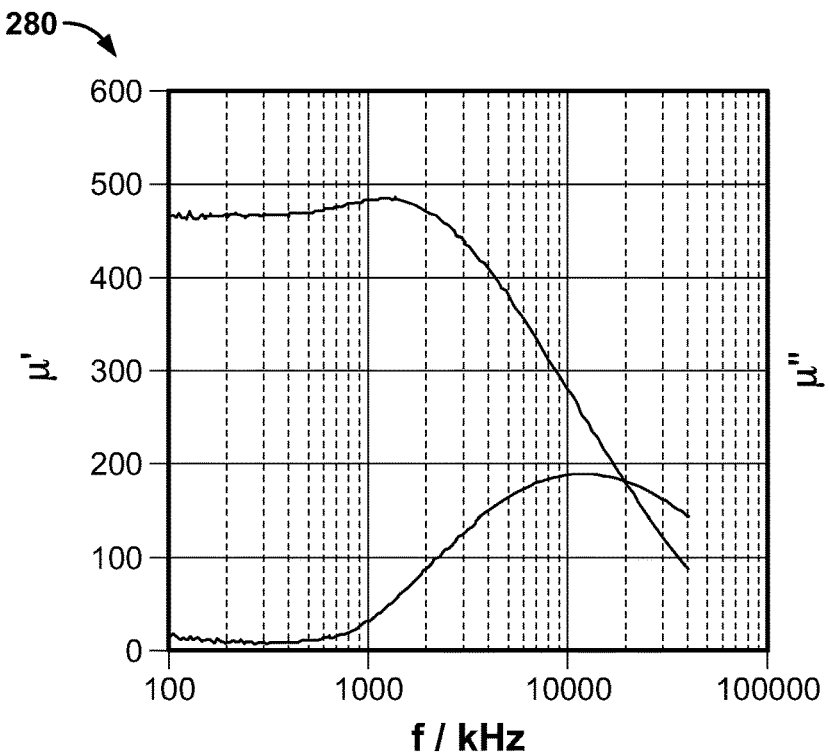
FIG. 17 illustrates the real and imaginary part of the permeability of a ferromagnetic material layer, in accordance with an embodiment.

Many magnetic shield layers comprise a soft magnetic material made of high permeability ferromagnets or metal alloys such as large crystalline grain structure Permalloy and Mu-metal, or with nanocrystalline grain structure Ferromagnetic metal coatings. These materials do not block the magnetic field, as with electric shielding, but instead draw the field into themselves, providing a path for the magnetic field lines around the shielded volume. The effectiveness of this type of shielding decreases with the decrease of material's permeability, which generally drops off at both very low magnetic field strengths, and also at high field strengths where the material becomes saturated as described above. The permeability of a material is in general a complex number:

$$M=\mu'+j\mu''$$

where $\mu'$ and $\mu''$ are the real and imaginary parts of the permeability providing the storage and loss component of the permeability respectively. FIG. 17 shows the real and imaginary part of the permeability of a ferromagnetic material layer 280.

Figure 18:
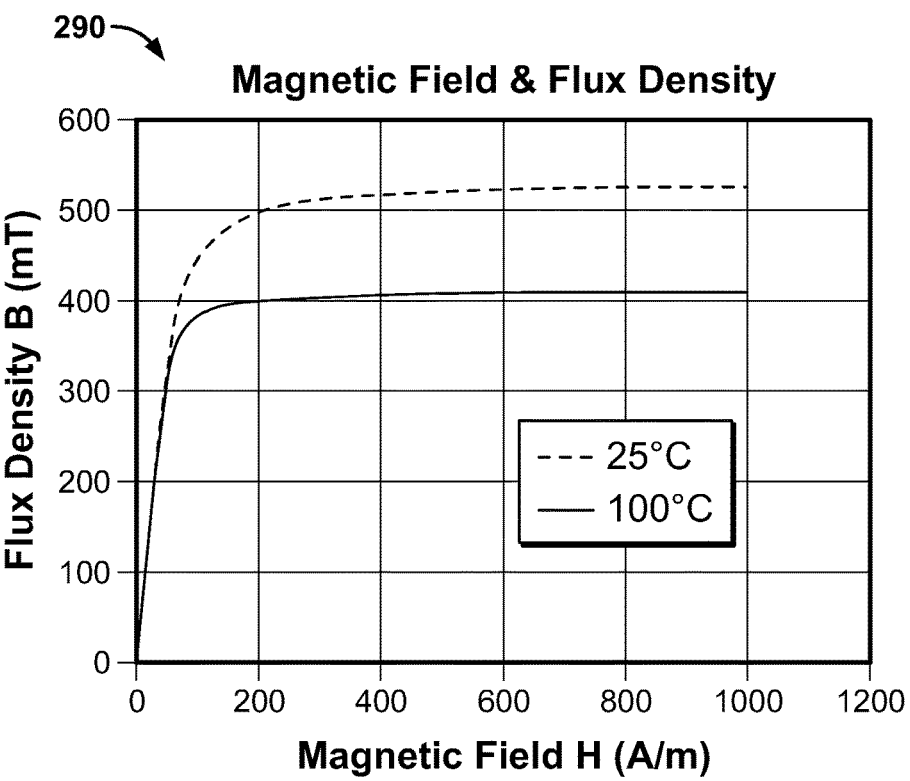
FIG. 18 illustrates the magnetization curves of a high permeability proprietary soft magnetic ferrite material, in accordance with an embodiment.

FIG. 18 shows the Magnetization curves 290 of a high permeability (real permeability .about.3300) proprietary soft magnetic ferrite material at 25° C. and 100° C. Increase of temperature results in a reduction in the Saturation Flux density. But at either temperature, saturation of the flux density B with increasing H is clearly observed. A distinct reduction in the slope of B-H curve (i.e. material permeability) is observed at around 100 A/m and the reduction of the permeability increases with H increase until the material permeability approaches 1 at several hundred A/m. This particular material is MnZn based and retains high permeability at up to 1 MHz of applied field frequency but loses its permeability at higher frequencies. Materials for operation at other frequency ranges also exist. In general, MnZn based materials may be used at lower frequency range while NiZn material is used more at higher frequencies up to several hundred MHz. It is possible with appropriate material engineering and composition to optimize material parameters to obtain the desired real and imaginary permeabilities at any operating frequency and to also achieve the saturation magnetic field and behavior desired.

Magnetic Coupling (MC) Geometry

In accordance with various embodiments, a method can be provided for shielding/reducing the EM field emitted from the transmitter coil, while at the same time providing a path for transfer of power from this field to a receiver coil placed arbitrarily on the surface of the transmitter. To achieve this, in accordance with an embodiment 300 shown in FIG. 19, a large area transmitter coil (of wire, Litz wire, or PCB type, or a combination thereof) is covered by a ferromagnetic, ferrite, or other magnetic material or layer that acts to guide, confine, and shield any field, due to its high permeability. Choosing the thickness of the material and its permeability and saturation properties, the magnetic material can reduce or shield the field in the area above the charger/transmitter coil so that it is reduced by 2 orders of magnitude or less compared to an otherwise similar geometry without the magnetic layer. Bringing a receiver coil with appropriate resonant capacitor in series or parallel to the receiver coil, the field penetrating the magnetic layer can be collected, and localized power transfer wherever the receiver coil is placed can be achieved.

To test this geometry, a charger coil similar to shown in FIG. 12 with a size of 18 cm×18 cm consisting of Litz wire was created and covered with a 0.5 mm thick sheet of material with properties shown in FIG. 17. A circular receiver coil of 7 turns with radius 2 cm was placed on top of the charger surface/magnetic layer. This Magnetic Coupling (MC) geometry 320 is shown in FIG. 20. The receiver circuit comprises a parallel resonant capacitor, followed by a bridge rectifier and smoothing capacitor. Significant power transfer was achieved with receiver coil at distances of several mm to 2-3 cm from the charger surface. The power transfer and efficiency increased with introduction of a 0.5 mm thick ferrite magnetic material or layer above the coil to guide and shield the flux as shown in FIG. 20. The resonance of the charger/receiver circuit in this case is important for operation of the MC configuration. The leakage field from the surface of the charger can be reduced by using thicker or higher permeability magnetic layer. Choosing the appropriate magnetic layer and receiver shield/guide layer permeabilities and thicknesses is important to provide a low reluctance path for the magnetic flux to allow higher power transfer and efficiencies while achieving sufficient field shielding at other locations of the charger. The inventors have found that power transfer of over 10 W at the output and DC-out to DC-in power transfer efficiencies of over 50% can be achieved in this MC configuration with several mm to 2-3 cm of charger/receiver coil distance. Moving the MA receiver coil (with switching magnet) laterally across the surface of the transmitter coil confirms that high power transfer and high efficiencies can be obtained across the transmitter surface. The amount and efficiency of the power transfer showed very good uniformity. The emission from other locations of the charger, where the receiver was not present, were monitored by a probe and shown to be lower by 2 orders of magnitude or more compared to similar locations in a magnetic resonant charger with no magnetic layer. Due to the high permeability of the ferrite layer, this fringing (leaking) field dies away rapidly from the top surface and should not cause significant EMI issues away from the charger. No interference effect with magnetic or non-magnetic metal sheets or ferrites placed on the charger surface were observed, showing that the magnitude of the leakage field from the surface is small and only couples well to the receiver due to the resonant conditions produced by the receiver LC circuit. Also as expected, multiple receivers could be charged/powered simultaneously in this MC geometry.

In accordance with an embodiment in the MC geometry, the reluctance of the flux path in the receiver can be lowered by including high permeability material in the core of the receiver ring coil (similar to a solenoid) or a T-shape core or alike. Many geometries are possible and these are only given here as examples. Additionally, while Litz wire receiver coil was used, PCB coils and/or a combination of Litz wire and PCB coil can be used.

Figure 21:
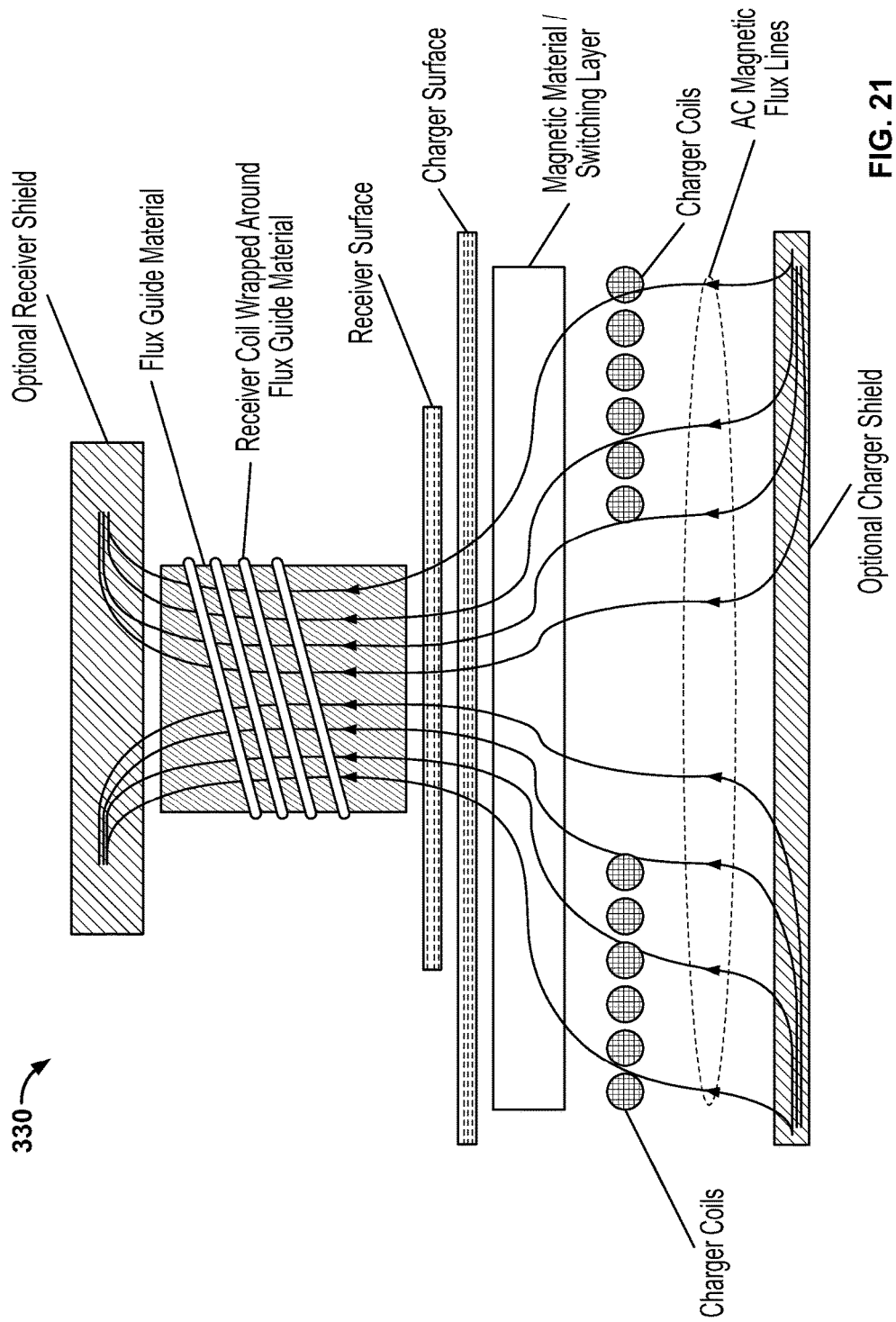
FIG. 21 illustrates the use of Litz wire wrapped around the core to create a solenoid type receiver, in accordance with an embodiment.

In accordance with an embodiment, to reduce the reluctance of the path, the receiver coil can be created by using a flux guide material (such as ferrite with permeability greater than 1) with an axis perpendicular (or an angle sufficient to catch the substantially perpendicular flux from the charger) to the surface of the charger. As shown 330 in FIG. 21, Litz wire can be wrapped around the core to create a solenoid type receiver with a relatively small cross section (2 mm.times.10 or 20 mm) substantially parallel to the surface of the charger. In one example, the length of the solenoid height (along the direction perpendicular to the surface of the charger) was varied from 10 to 20 mm but could be shorter. Typical number of turns on the receiver coil was 7 turns. Substantial power transfer (over 20 W) was received at resonance with the receiver coil bottom on or within several cm of the surface of the charger. Rotating the angle of the solenoid with respect to the perpendicular direction to the surface to the charger produced large power transfers confirming that as long as some component of the charger flux is along the axis of the coil, efficient power transfer can be obtained. Minimal leakage power from other areas of the charger surface was observed and position free and multiple receiver operation could be obtained as expected. As shown in FIG. 21, optionally, an additional shield/guide layer on the top of the receiver and on the bottom of the charger can also be added. Such a solenoid with a magnetic flux guide can be constructed to also have a larger area parallel to the surface of the charger approximating the embodiment in FIG. 20 but with a flux guide layer in the middle of the coil. In this case, the height (along the length perpendicular to the surface of the charger) can be quite short (1-2 mm or less). Use of the flux guide and a smaller cross section parallel to the surface of the charger as shown in FIG. 21 may also be important for applications where small areas for the sections of receiver in the plane of the charger are available. Examples may be devices such as phones, etc. or batteries that are longer in 1 or 2 dimensions and would be stood substantially on their ends or sides to receiver power wirelessly.

In accordance with another embodiment, the charger/transmitter also includes magnetic flux guide layer/shield at the bottom of the charger as shown in FIGS. 20 and 21 so that emissions from the bottom of the charger/transmitter are reduced. In yet another embodiment, metal layers are also included on the top of the receiver shield and/or the bottom of the charger/transmitter shield to provide further shielding from the magnetic field.

It must be noted that for a transmitter coil of geometry in FIG. 12 with several A of current in the coil (currents used here), the incident magnetic field is estimated to be in the 100 A/m$^2$ to several 100 A/m$^2$ range (see FIG. 13). Care must be taken so that the magnetic material is chosen such that magnetic saturation does not occur. However, in the region of power transfer between the charger and the transmitter coil the magnetic field is enhanced by the resonance and the Quality Factor (Q) of the system and a much larger magnetic field may be present. In these tests, the Q of the system was about 30. Thus it may be possible that in the power transfer location under the receiver coil, the magnetic layer can experience saturation and reduction of permeability to provide a more efficient path for the flux from the charger coil to transmit to the receiver coil above and increased power transfer and efficiencies. By choosing magnetic layers with appropriate saturation field values, this effect can be used to benefit as described above.

Magnetic Aperture (MA) Geometry

In accordance with another embodiment and geometry, one can create a Magnetic Aperture (MA) in a magnetic shield or ferromagnetic layer at any desired location, so that the magnetic field confined in such a layer at that location is efficiently coupled to a receiver coil and can provide power transfer to such a receiver. At any other location on the transmitter coil, the confinement of the field prevents or reduces unnecessary radiation, thereby providing low EMI and adverse health and interference effects.

Several methods to enable local change (switching) of the characteristics of the ferromagnetic material in the MA geometry are described herein. In accordance with an embodiment, the local characteristics of the ferromagnetic, ferrite, or other magnetic material or layer are altered by saturating the layer through application of a DC and/or AC magnetic field such as through a permanent magnet or electromagnet, etc. For example, a magnet or electromagnet can be incorporated behind, in front, around or at the center of the receiver coil or a combination thereof such that it has sufficient magnetic field to saturate or alter the magnetization curve of the ferromagnet layer locally on or near where the receiver coil is placed.

Examples of magnets that can be used include, e.g. one or more disc, square, rectangular, oval, curved, ring (340 in FIG. 22), or any other shape of magnet and combination thereof and with appropriate magnetization orientation and strength that can provide sufficient DC or AC magnetic field to shift the operating position of the magnetization curve (as shown in FIG. 15 or 18), so that the combination of the transmitter coil, the affected ferromagnet layer and the receiver coil move to a resonance condition at a given frequency for power transfer.

As shown in FIG. 23, in accordance with an embodiment 350 of MA, by incorporating a permanent (and/or electromagnet) into the receiver in front, and/or behind and/or at the level of the receiver coil (on the outside and/or inside of the coil), and bringing the receiver close to the charger surface, at this point, a local 'magnetic aperture' is opened up in the ferromagnetic, ferrite, or other magnetic material or layer, allowing the transmitter coil's electromagnetic field to be transmitted through this local aperture without affecting any areas nearby. In this manner, by reducing the permeability of the ferromagnet layer locally through saturation or reduction with the DC and/or AC field or other means, one can establish at what location the power and energy coupling occurs while keeping the field confined in other areas. The magnetic or ferrite material layer is here therefore also alternatively called a switching layer. This layer acts as both a reservoir and/or guide layer of AC magnetic flux (for power transfer) and a switching layer. This embodiment can be used to meet the goal of simultaneously transferring power efficiently to a receiver at any desired location while keeping the field from emitting at other locations and causing problems. At the same time, since the magnetic field created from the entire surface of the charger coil is directed or guided towards the magnetic aperture created, this provides an effect analogous to funneling the power to this magnetic aperture area and an efficient method for transfer of power to an arbitrarily positioned receiver is achieved. In FIG. 23, typically, the receiver may also include an outer surface or case. Such a surface or case would be typically located between the receiver coil and the charger surface parts as shown in FIG. 24.

Figure 24:
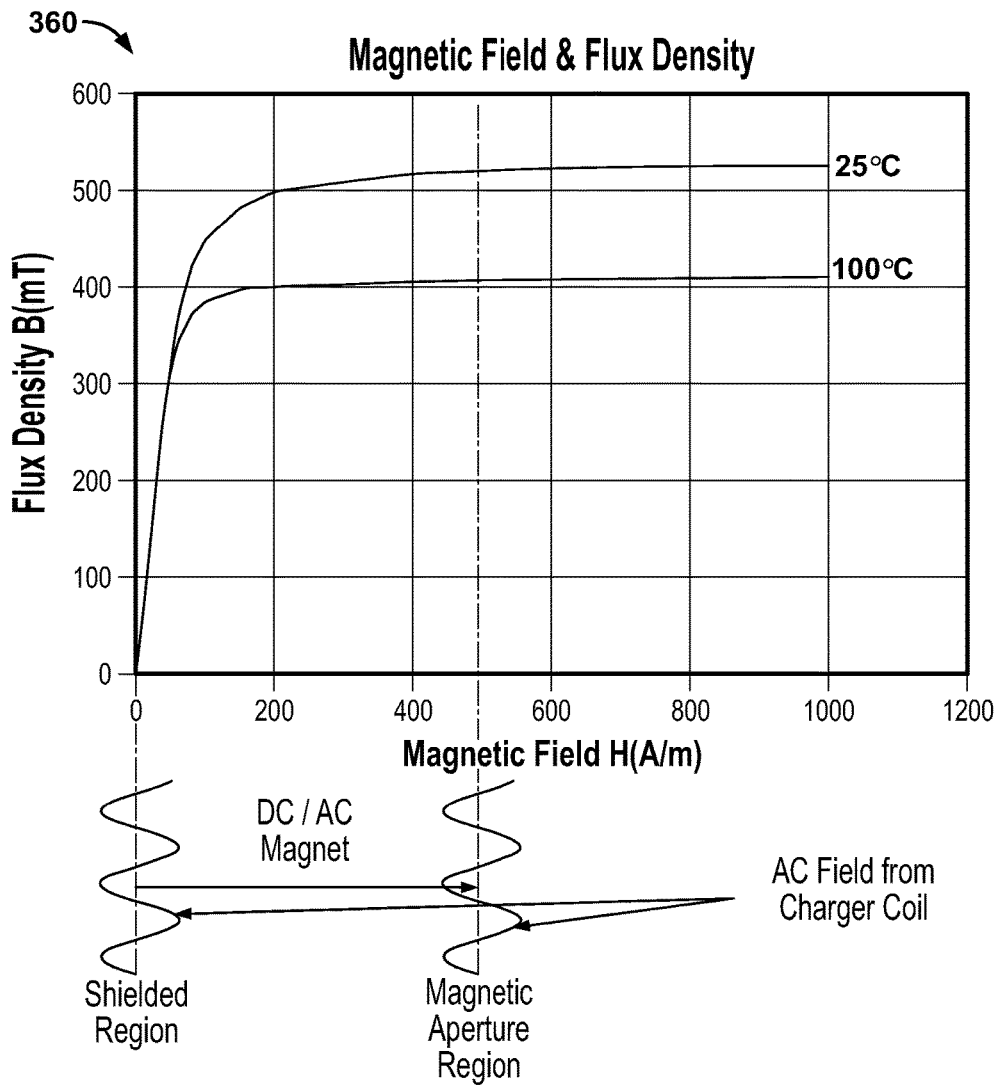
FIG. 24 illustrates magnetization curves of a soft ferrite material are shown at different operating temperatures, in accordance with an embodiment.

FIG. 24 provides an illustrative method of understanding the behavior 360 of the system. Magnetization curves of a soft ferrite material are shown at different operating temperatures. The AC magnetic field generated by the wireless charger/power supply coil is also shown in two regions of operation (shielded region and the magnetic aperture region). Most of the surface area of the ferrite layer has no receiver on it and operates in the shielded region with high permeability guiding and shielding the AC magnetic field generated by the charger/power supply coil in the transmitter from the outside. In the magnetic aperture region (where the receiver and the switching magnet is), the DC (and/or AC) magnet acts as a bias to move the operating point from around the vertical axis where the material has high permeability and confines and guides the magnetic field to a region where the material is saturated and has a low permeability creating a magnetic aperture for coupling to a receiver coil nearby causing efficient power transfer. The magnetic field required for saturating the switching material (the magnetic switching field) can be easily created by many types of commonly available magnets that can generate up to several 100's of A/m or more of magnetic field easily saturating many ferrite materials.

As can be seen above, this approach utilizes the physics underlying the nonlinear behavior of ferrite material to act as an active switch to provide power transfer only in desired locations. Permeability is an inherent material property of a magnetic material and the response time of the material is only limited by domain movements and can be in nano seconds or faster depending on the material. It is therefore one of the advantages of this system that the device responds almost instantaneously, and, if a receiver is moved on the surface, a new aperture is created and shielding is restored at all other locations almost instantaneously. In comparison, any other wireless charger system such as coil arrays, moving coils, etc. has a slow response to such movement due to time lag related to mechanical movement of coil and/or electronic detection and reconfiguration of an electronic system. Furthermore, multiple receivers (with switching magnets) can be placed on or near the charger surface to create multiple magnetic apertures for coupling of power to multiple receivers while maintaining shielding and low electromagnetic emission at all other locations providing a simple to use, efficient multi-charger system.

In accordance with an embodiment, to provide shielding from the magnetic field at locations below the transmitter coil (the side opposite to the charging/power side of the transmitter) and above the receiver coil (on the side of the coil that may be in close contact with a device, battery, or electrical part being powered or charged wirelessly), further shielding layers such as ferromagnet and/or metallic layers can also optionally be added below the transmitter coil and/or above the receiver coil as necessary. Furthermore, these layers can be integrated into the coil design (such as metal shield layers integrated into a PCB multi-layer design that includes a PCB coil). The choice of material and thickness, etc. can be chosen such that even though a magnet in the receiver may be used to saturate (switch) the top layer of the transmitter (the switching layer), the permeability of the shield layers would not be affected. For example, the switchable layer in the charger can comprise material with low saturation field values while the other shield layers in the charger and/or receiver have higher saturation field values. Examples of materials to use for these shields may be sheets or other shapes of material such as ferrites, nano materials, powder iron (Hydrogen Reduced Iron), Carbonyl Iron, Vitreous Metal (amorphous), soft Iron, laminated Silicon Steel, Steel, etc. or other material used in transformer core applications where high permeability and saturation flux densities as well as low eddy current heating due to conductivity at frequency of operation is required. Lamination has also been used in many applications of transformers to reduce eddy current heating. It must be noted that to avoid saturating the ferrite shield from the switching magnet in the receiver, the shield can also be multi-layer or other structures can be used. For example in an embodiment, a thin high saturation flux density layer (of for example powdered Iron or steel) can be placed behind the switching magnet (as shown in FIG. 23) to shield from the switching magnet field with another optional ferrite layer of other characteristics such as higher permeability or operation at the AC magnetic field frequency above that. Thus the high saturation flux density layer will shield the high permeability layer from the saturating effects of the magnet and allow it to guide and shield the AC magnetic field effectively.

In another embodiment, the high saturation shield layer is formed or manufactured to have a shape and dimensions to fit the magnet's switching magnetic field pattern to shield the field from it and allow the AC power magnetic field from the charger that is coming through the created magnetic aperture to extend upwards (in FIG. 23) to another shield or ferrite layer with different characteristics. For example in the geometry of FIG. 23, if a ring type of switching magnet is used, the high saturation shield material may be ring shaped with appropriate dimensions and placed behind (atop in FIG. 23) of the magnet to shunt or reduce the field from the magnet and a sheet of ferrite is placed on top of the high saturation shield layer to guide and shield the AC magnetic power transfer flux coming through the center of the coil as shown in FIG. 23. Many combinations of the above techniques and materials can be combined in the receiver and charger to best optimize performance and these embodiments are only given as examples.

To test the above embodiment, a transmitter coil with Litz wire with dimensions of 10 cm.times.10 cm was constructed. The coil was constructed similar to earlier work (J. J. Casanova, Z. N. Low, J. Lin, and Ryan Tseng, in Proceedings of Radio Wireless Symposium, 2009, pp. 530-533 and J. J. Casanova, Z. N. Low, and J. Lin, IEEE Transactions on Circuits and Systems—II: Express Briefs, Vol. 56, No. 11, November 2009, pp. 830-834). The receiver comprised a Litz wire coil of 35 mm radius and 10 turns and the received power was connected to a rectifier and capacitor circuit to provide a DC output. The transmitter coil was then driven with a resonant converter circuit similar to FIG. 2 and the frequency of the system was adjusted for test purposes. It is important to realize that different power delivery mechanisms and receiver systems as well as different shape, geometry, winding, and construction of coils such as wire, Litz wire, or a combination can be used, and this setup is used only as an example.

To test the transmission capability of the loosely coupled system itself first, a resonant converter wireless charger drive circuit was powered from a DC supply at 20 V input voltage and the receiver coil was placed on the transmitter with a coil to coil vertical (z-direction) gap of 5 mm. Power level in excess of 20 W with a DC output to DC input power overall system efficiency of over 70% could be achieved. When moving the receiver coil power laterally, power transfer was observed across the surface of the charger. However the amount and efficiency of the power transfer at a fixed drive frequency was not uniform. Placing a metal object, such as a metal disk, on the transmitter surface at a location laterally away from the receiver coil confirms that strong magnetic field emissions exist on the entire surface of the transmitter coil as expected since the coin heats up within seconds to very high temperatures confirming heating by eddy currents. Placement of larger metal sheets would shift the resonance frequency significantly and if brought back to resonance would heat up the sheet through eddy Currents. Similarly, a receiver circuit connected to some Light Emitting Diodes (LEDs) shows significant power being emitted from all areas of the transmitter coil as expected.

Next, a sheet of Hitachi material MS-F comprising 18 μm of FineMET® FT-3M material on an adhesive tape substrate was used as a ferromagnet/ferrite material (switchable layer) and placed on the entire top of the transmitter coil surface. This material has a saturation flux density of 1.23 T. Placing a receiver coil 5 mm away from the transmitter coil and the switchable layer and adjusting the transmitter frequency, no power was transferred to the receiver at any frequency. Next, a Nd rare-earth ring magnet (of material N45H) of inner diameter of 32 mm and outer diameter of 36 mm and 2.5 mm thickness and magnetized along its axis (with North and South pole on top and bottom of the ring) was placed behind in the center of the receiver coil. The ring magnet as shown in FIG. 22 includes a cut or gap in its circumference. This cut or gap is optional and can be manufactured during casting of the magnet to avoid or reduce generation of any eddy currents from stray magnetic fields in the receiver in magnetic material that is electrically conductive (such as Nd rare-earth magnets) during operation in the wireless power system. By breaking the circular pattern of the ring, any potentially generated currents would not be able to circulate and heat the magnet.

Figure 25:
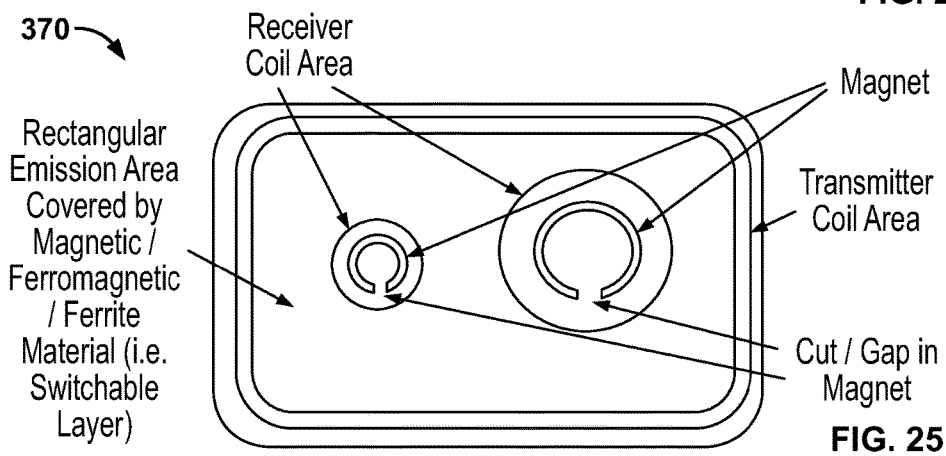
FIG. 25 illustrates a magnetic aperture geometry for receivers of dissimilar size, in accordance with an embodiment.

The overall geometry 370 of the MA for operation with the switchable layer and the receiver and magnet is shown in FIG. 25 for two receivers of dissimilar size and possibly power ratings and/or voltage outputs. FIG. 25 shows a simplified side view of a wireless power system in accordance with an embodiment, showing a charger (transmitter) and receiver coil, switching layer, and switching magnet. In this instance, a ring switching magnet is shown and the coils are described as circular ring coils for simplicity. However, in accordance with other embodiments, other geometries and designs can be used to achieve similar results. For example, as described above, the coil can be configured to achieve a more uniform field pattern and/or the magnet can be of a different shape and magnetization orientation. In addition, the magnet can be placed in front of, behind, or on the same plane as the coil and/or the coils can be made of wires, PCB, free standing metal parts or a combination thereof or other geometries and materials.

The magnetic flux densities and the magnetic field orientation are also shown in FIG. 23. The magnetic flux flows or is guided in the switching layer and is funneled or directed to the receiver location by the presence of the receiver magnet. The arrows for the AC magnetic flux density lines are shown to guide the reader in the direction of the energy flow rather than show the vector direction since this field is AC and changes direction in every half cycle.

In an isotropic material, the switching magnetic field (from the switching or permanent magnet or electromagnet shown here) should have a component in an orientation along the direction of the AC (wireless power transfer) magnetic field to saturate the permeability in that orientation and affect its behavior. However in an anisotropic material, different orientations of switching magnetic field can affect the permeability along the plane of the ferrite layer affecting the AC magnetic power transfer field, giving rise to interesting combinations of switching layer materials and magnet designs to achieve enhanced performance.

In the embodiment shown in FIG. 23, and using a ring magnet as the switching magnet, due to overlap of the radial orientation of the magnetic field from the ring magnet magnetized axially (North and South poles along its axis which is perpendicular to the plane of the charger surface), the DC switching magnetic field is parallel to the x-y plane under the ring magnet and more vertical in the center of the ring magnet so it is oriented to efficiently direct the AC wireless power magnetic field in the region towards the created aperture for power transfer. However, alternate geometries such as an arc, radially magnetized ring, cylinder, or multi-pole magnets can be used to provide optimal power coupling. A multi-pole magnet can provide a tighter external magnetic field pattern and may reduce any potential unwanted effect of magnet on nearby devices/materials while providing sufficient magnetic field to saturate the switching layer. In addition, use of appropriately designed magnets and/or anisotropic or multi-layer switching layers can result in enhanced switching performance and coupling of power with minimal switching magnet strength.

Figure 26:
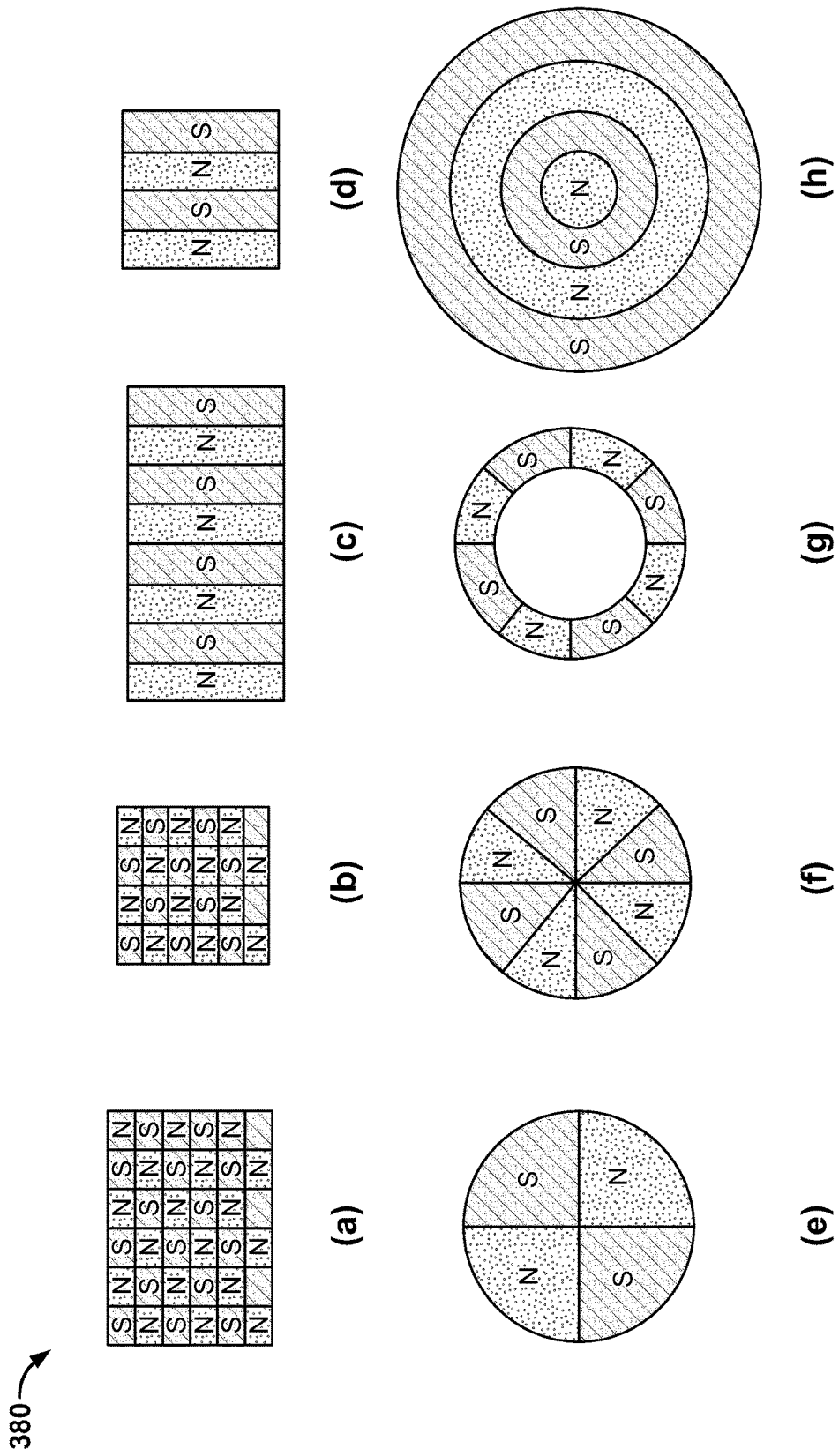
FIG. 26 illustrates various multi-pole magnets, in accordance with an embodiment.

In accordance with another embodiment, multi-pole magnets that have strong magnetic field strengths near the surface of the magnet with rapidly decreasing magnetic field strength away from the surface can be used. Some examples of multi-pole magnets are shown 380 in FIG. 26. Such magnets can provide magnetic aperture switching nearby, while maintaining weak magnetic field strengths farther away, thereby minimizing the effect on other materials, devices, etc. This feature may be especially important for use with devices such as GPS or compasses that use the weak magnetic field of the earth to detect the device orientation.

Figure 27:
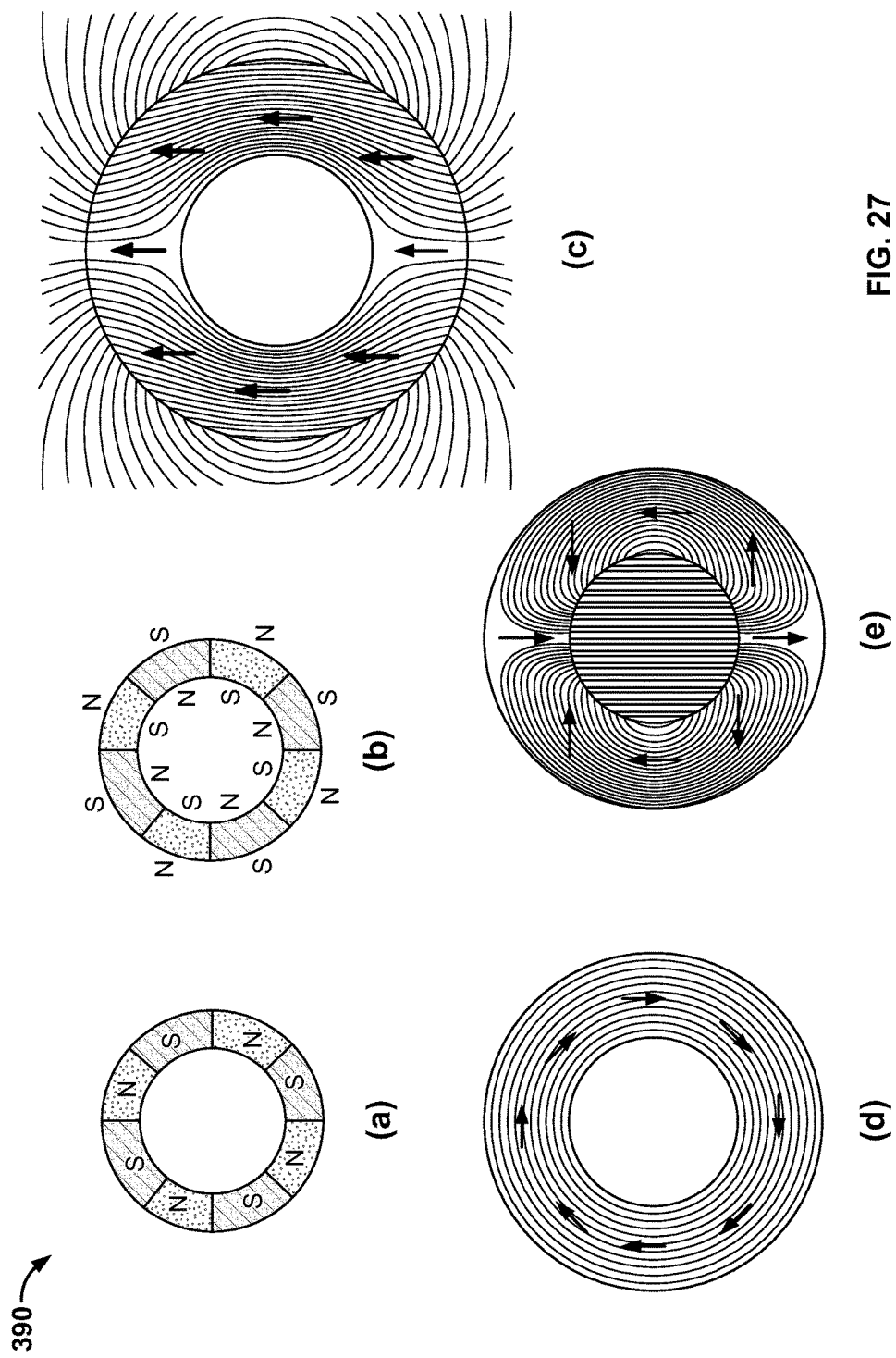
FIG. 27 illustrates various ring magnets, in accordance with an embodiment.

In accordance with one embodiment that uses a ring magnet as shown 390 in FIG. 27, the magnet can be magnetized radially or along its axis, but can comprise multiple alternating poles. Some examples of ring multi-pole magnets magnetized axially (perpendicular to the plane here) (a) and radially in the plane (b) and along directions shown by arrows in (c), (d), and (e). Different magnetic flux lines can be obtained (shown in (c), (d), and (e)) can be obtained depending on the orientation and number of poles and can be optimized to provide an ideal magnetic aperture and coupling between the flux lines of the charger coil and receiver coil providing optimum efficiency. As an example, the magnet shown in FIG. 27(*e*) which consists of multiple sections poled in a particular geometry as shown provides uniform in plane magnetic flux lines in the center of the magnet to create a uniform magnetic aperture in the FIG. 23 geometry while producing minimal fields outside the magnet. The geometries shown here are not meant to be exhaustive but show that many possibilities for design and optimization of the magnets exist and can provide optimum coupling in the smallest possible area.

Figure 28:
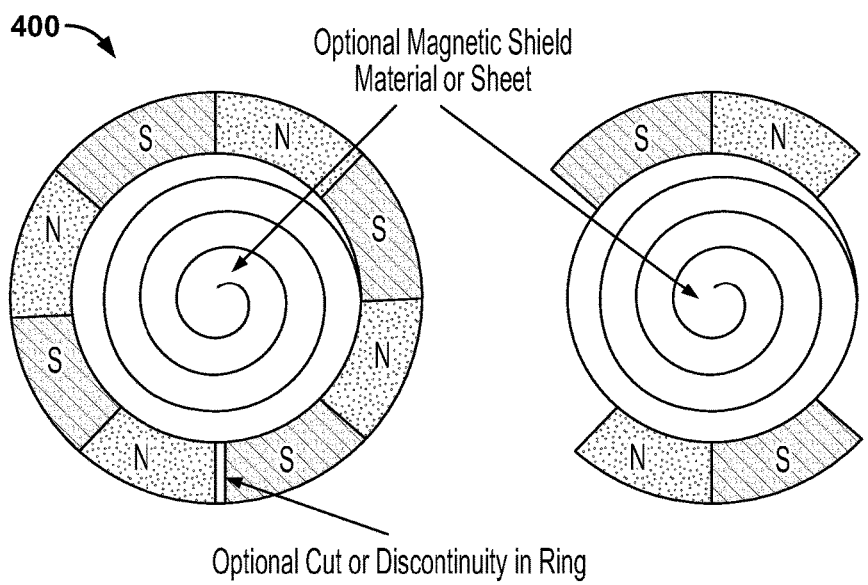
FIG. 28 illustrates examples of multi-pole ring or arc magnets with cuts or gaps in the circular pattern, in accordance with various embodiments, in accordance with an embodiment.

In accordance with an embodiment, in addition to reduce or eliminate eddy currents, a cut or gap in the circumference of a ring, square, or other type of magnet can be introduced to prevent circular current from flowing due to the alternating magnetic field. FIG. 28 shows two examples 400 of multi-pole ring or arc magnets with cuts or gaps in the circular pattern, in accordance with various embodiments.

While the magnetic field necessary to saturate the switching layer can be engineered to be switched with low magnetic strength magnets that in general would not pose any problems to the device or any objects nearby, in accordance with another embodiment, to reduce or eliminate any potential effect of the switching magnet's magnetic field on the device's performance, its compass or GPS or on nearby devices or objects, magnetic shielding material such as shown on the top and bottom in FIG. 23 can be incorporated in the receiver behind the magnet (top of FIG. 23).

In addition, the device, case, skin, battery door or battery incorporating the receiver and the switching magnet may incorporate a component that would shunt the switching magnet's magnetic flux and shield it from penetrating out from the surface of the device, skin, battery door, or battery. An example would be a cover manufactured from sheet of ferrite, magnetic material, magnetic steel, Alnico, Permalloy, etc. or a combination thereof that would be normally placed or attached, slid on or held on the outside area of the magnet (lower part of the receiver in FIG. 23) while the device is being used normally. This cover could be slid open, removed or detached to expose the magnet before placement of the device, case, skin, battery door or battery, etc. on or near the charger surface to commence charging. The cover can also simultaneously have a shielding layer sheet that normally would shield the switching magnet from the interior of the device and would also be slid aside to allow normal operation of the receiver without these high permeability magnetic flux shunt layers. Alternatively, the switching magnetic field can be generated by an electromagnet in the receiver by passing a DC or AC or a combination of currents through an electromagnet. This may be activated mechanically by the user or through a detection mechanism that detects approach of a wireless charger through various RFID, NFC, Bluetooth, Felica, WiFi, optical, or other RF or wireless detection, and applies the appropriate power to the electromagnet in preparation for receiver to be placed on the wireless charger. Alternatively, the switching magnetic field may also be created by a combination of a permanent and electromagnet fields. Alternatively the cover layer described above for a permanent magnet can be automatically slid open, removed, opened, etc. when a charger is detected nearby through RFID, NFC, Bluetooth, Felica, WiFi, or other RF, wireless, or optical or magnetic detection mechanisms.

In accordance with an embodiment, to bring the system to resonance, the frequency of the applied power to the charger coil can be adjusted to observe power transfer through the switchable MA layer. Experimentally, with a single magnet for switching no power transfer was observed. Doubling the magnet strength by double stacking the magnets provided sufficient magnetic field strength to saturate the switchable layer and adjusting the frequency, large amounts of power were transmitted through the opened aperture. Over 10 W of power and efficiencies in excess of up to 50% were achieved. To achieve optimum power transfer, it is necessary to move the magnets some distance (e.g. about 25 mm vertically in the z-direction) away from the transmitter surface. This may be due to the magnet size (diameter) being much smaller than the receiver coil and to saturate the switchable layer with sufficient size to optimally couple power to the receiver coil, it was necessary to move the magnets away to allow their fringing fields to be larger in area than the size of the magnets itself and thereby open an optimally sized aperture for power transfer. In accordance with other embodiments, a larger diameter magnet that is matched with the receiver coil size can be used and can be at the same plane as the receiver coil (inside, outside or behind the receiver coil).

In accordance with an embodiment, the magnetic flux density of each magnet was estimated to be around 1.3 T by the manufacturer. In practice, it was observed that doubling up the magnets by stacking on top of each other and moving the magnets away to optimally match the aperture size to the receiver coil was optimal for power transfer. This is understandable in view of the fact that while the single magnet should have sufficient magnetic field to saturate the layer close to its surface, the resulting aperture when the magnet is on the plane of the receiver coil and close to the transmitter coil and switchable layer (5 mm distance between magnet and the switchable layer) is comparable in size to the magnet and smaller than the 40.times.50 mm size of the receiver coil. To achieve the best coupling, the magnet had to be further away (25 mm between magnet and transmitter switchable layer) in this example and therefore 2 magnets were required to provide sufficient flux density in this example. Even with the magnet co-planar with the receiver coil, doubling the magnets was necessary to provide sufficient fringing fields to open a sufficiently dimensionally large aperture for efficient power transfer.

In accordance with an embodiment, changing the receiver coil size so that it is comparable to the switching magnet diameter provides more efficient coupling, with output to input power efficiencies of 50% to over 70%, and output power levels of over 25 W achieved with even a single magnet due to better switching magnet field overlap with the receiver coil.

In accordance with an embodiment, due to the circular symmetry of the geometry used, the receiver can be rotated in the plane without any change in the received power or system efficiency. Rotation of the receiver out of the plane also demonstrated sizeable power transfer.

To test emission levels from other areas of the transmitter, the test with metallic object was repeated by placing a metallic object at a location close to the receiver coil on top of the transmitter surface. No change in power coupled to the receiver and no appreciable heating was detected. Similarly, when the magnets were removed from the center of the receiver coil, the power transfer stopped and the transmitter only drew very minimal current (less than 100 mA). While with the magnets at the center of the receiver coil, the transmitter drew 1 ampere or more of current. This is a very dramatic and large confirmation of the principle described here.

As a further test, the magnet and receiver were placed on a location on the transmitter coil (covered with a switching layer on top of it). Large current draw from the transmitter power supply can be observed at an adjusted resonant frequency. This is due to the power being emitted through the generated magnetic aperture (MA) into the receiver. Next, another receiver coil without a magnet was placed on the transmitter at a location near the first receiver and magnet. No discernible power transfer was detected in this MC geometry. This is presumably due to the fact that the 2 locations have different inductance values and resonate at different frequencies. However, it may be possible to have both types of receivers operate on a single type of charger if the resonant conditions of the 2 different receivers are moved to be at the same frequency. This may be achieved by adjusting the resonant conditions of the 2 receivers by adjusting their LC circuit with adjusting the resonant cap (or a parallel or in series adjustable inductor) in the receiver. Moving the MA receiver coil (with switching magnet) laterally across the surface of the transmitter coil confirms that high power transfer and high efficiencies can be obtained across the transmitter surface. The amount and efficiency of the power transfer showed very good uniformity.

To confirm that the effect observed is due to the magnetic field and not the presence of the ferrite material in the magnets, the ring magnets were replaced with a ring constructed of the same material as the ring but not magnetized. No power transfer was observed with such a set up.

As a further confirmation, the receiver coil was placed on the transmitter coil and switchable layer but the magnet was removed. Next the magnets were brought close to the transmitter coil from below (the side opposite to the receiver coil). At about 25 mm distance to the switchable layer, with the magnets aligned with the lateral location of the receiver coil, strong power transfer and high power transfer efficiency was observed. Moving the magnets laterally away from lateral alignment with the receiver coil, the aperture closed and no power was transferred further confirming the effect as being due to the field.

As a final confirmation, with the receiver coil and the ring magnets placed on the transmitter coil and transmitter frequency optimized for high power transfer, a single ring magnet was brought to lateral alignment from below the transmitter coil with the top magnets. With the magnetic poles oriented so that the fields from the below magnet was opposing the magnetic field from the magnet above, lower amounts of power transfer were achieved. Demonstrating that the net magnetic field value was reduced by half and therefore the aperture was partially closed. Doubling the magnet below the transmitter coil, with the 2 magnetic fields from the magnets above and below the transmitter coil and the switchable layer cancelling each other out, the aperture could be closed and no power transfer was observed. Flipping the polarity of the magnets below the transmitter coil so that the fields from magnets above and below would add up on the plane of the ferromagnetic layer, the power transfer would resume.

The multiple tests above appear to confirm that the principle of operation is the saturation of the ferromagnetic switchable layer, and this combination of materials and geometry performs as planned. Namely, safe (low or no EM emission from the surface of the charger/transmitter) and efficient power transmission to a receiver placed at any location on the transmitter coil can be achieved with minimal side effect and residual emission.

The embodiments for MC and MA configuration discussed above are not meant to be exhaustive and many variations and/or combinations of the configurations are possible. Overall, the transferred powers and the efficiencies observed from the MA configuration were larger than the MC configuration. However, by modeling and judicious design of geometry and materials, similar performances may be possible. The communication and control of these system can be similar to the tightly coupled systems described earlier providing regulation and control between transmitter and receiver. Alternately, the system can be designed with no regulation at the charger, and all the regulation instead at the receiver, or any combination of architectures as described earlier for loosely-coupled or tightly-coupled wireless power transfer systems above. The wireless power transmission systems and methods described herein have ideal characteristics for this application. By using the magnetic coupling (MC) or magnetic aperture (MA) technique, all the advantages of a loosely coupled system can be retained while achieving high efficiency, high power transfer efficiency, low EMI, and low or no interaction with nearby metallic objects of a tightly coupled system providing an ideal solution.

In practice, with the thin layer of the Hitachi switchable material used, some heating of the switchable layer was observed. This can be due to the material being lossy (high imaginary permeability) and/or being extremely thin. Use of ferrites with minimal or no loss at the frequency of interest would improve this effect. Also, as noted above and shown in FIG. 15, ferrite material would have significantly lower saturation flux densities (0.2-0.5 T) compared to the thin sheet of the FineMET® material used. Thus, smaller magnetic flux densities (smaller or weaker magnets) can be used for switching.

Next to test MA configuration further, an 18.times.18 cm transmitter coil of the shape similar to FIG. 12 was constructed and 60×60×0.5 mm plates of a MnZn Ferrite material were placed side by side in a tile manner to cover the transmitter coil surface as the switchable material while the same tests above were performed. This material has a low loss up to about 100 kHz and a real permeability of about 2000 up to 100 kHz. Similar switching results were obtained with a receiver of about 35 mm diameter and a single ring switching magnet magnetized along axis as described earlier (FIG. 22). However, with such thicker and lower loss material, no switching layer heating was observed. Adding a resonant capacitor in parallel to the coil in the receiver of appropriate value, power transfer of up to 30 W into one coil and DC-out to DC-in total power transfer efficiencies of over 70% were observed. Many ferrite materials with differing magnetic properties exist and optimizing the various fundamental properties and dimensions of the switchable layer or layers can be performed with more detailed modeling. In general, Furthermore, it is found that with appropriate design and selection of coils, switching magnet size, shape and strength and switching layer, the receiver coil can be placed several mm to several cm over the charger surface and receive power efficiently through a locally opened magnetic aperture. So the operation is not limited to the receiver being in direct or close contact with the charger surface.

Figure 29:
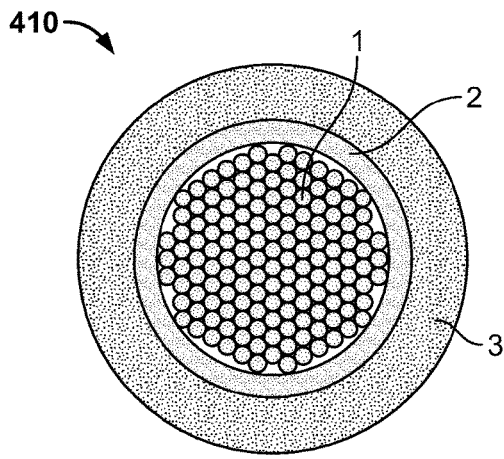
FIG. 29 illustrates a wire or cable available in a variety of gauges, in accordance with an embodiment.

In accordance with an embodiment, it may be advantageous to construct the charger/transmitter coil from ferromagnetic material with appropriate property so that the coil acts as both the magnetic field generator and the magnetic shield for MA and MC geometry. This may eliminate the need to have an additional magnetic or ferrite layer on the top surface of the charger/transmitter. Alternately, to retain desirable high conductivity and Q of the transmitter and/or receiver coils and to achieve the switching effect, a metallic coil of PCB and/or wire may be coated or covered with a switching magnet material such as ferromagnet. FIG. 29 shows a commercially available wire or cable 410 available in a variety of gauges with these characteristics. Section 1 in FIG. 29 consists of multiple strands of copper or other conductor wire which may also be individually coated or insulated to avoid conduction between the strands (similar to Litz wire) to avoid skin effects. Section 2 is an overcoat or layer of ferrite or other magnetic material. Section 3 is an optional outer coating or insulation. The ferrite layer or coating can be achieved by dipping into a slurry, sputtering, e-beam, etc. as appropriate.

Similarly, a magnetic or ferrite layer made of material with low saturation magnetic field values can be used above the transmitter coil (for example as switching layer in MA or even MC geometry) while a material with higher saturation magnetic field value can be used below the transmitter coil and above the receiver coil for shielding purposes. For example, Nickel, cobalt, Mn, Zn, Fe, etc. or alloys of such material (see FIG. 15 or 17) with low saturation magnetic field values may be used as the top layer of the charger/transmitter while Sheet Steel or FineMET® or other shield material with high saturation magnetic field values would be used for shielding. For either material, care must be taken to use material that reduces or eliminates eddy currents through geometry or doping of the material to provide high resistivity. By using a low saturation magnetic field material, a smaller and/or weaker switching permanent magnet and/or electromagnet induced field may be used for switching the switchable layer in the MA geometry. Thus, the shields would not be saturated by the magnet used for switching and would remain effective in shielding unwanted stray magnetic fields from affecting nearby devices, materials, or living tissue. In such a case, the total system would be completely shielded and safe. Power would at the same time transferred efficiently between the transmitter and receiver from the created magnetic aperture at one or more locations desired by user where receivers are placed.

Another type of material that responds strongly to an applied magnetic field is a class of material known as ferrofluids which are colloidal suspensions of ferromagnetic particles or nano materials in a carrier fluid. In an embodiment the magnetic layer covering the charger coil in the systems described here may be a layer of ferrofluid material sandwiched between two barrier layers. With the application of an appropriate switching magnet of the receiver or a local increase in the AC magnetic field, the ferrofluid would be attracted and aligned appropriately to provide a local magnetic variation in the magnetic layer covering the charger coil and allow better coupling between the charger and receiver coil. Thus a similar behavior to using Ferrites for magnetic layer may be obtained.

The tests above with magnets placed above and below the switching layer in the MA configuration also show that novel methods of switching the layer can be employed. Since the layer responds to the net total magnetic field, a bias magnetic field can be designed to be incident on the layer and by including a weak additional magnet into the receiver, the total magnetic field with the receiver present can then be designed to exceed the saturation level to switch the layer locally. For example, a bias magnet material or electromagnet in the charger/transmitter can provide a uniform or local magnetic field to bring the DC or average AC level close to saturation and a smaller magnet material or electromagnet in the receiver can be used to exceed the required saturation level locally to open an aperture for power transfer. The bias magnet material can be a sheet of permanent magnet (perhaps even flexible plastic magnets readily available) and/or an electromagnet that would provide the DC bias.

In accordance with any of the embodiments described here, many types of magnets may be used to create the switching field in the MA configuration. They include metallic, alloy, rare earth, ceramic, ferrite, nano material, Alnico, composite or other material used to manufacture magnets.

In addition, it must be noted that when power is being transferred through the magnetic aperture, an AC magnetic field due to the inductive field is present. This field may be quite large in a resonant geometry with a high Q where the power resonating between the coils is larger than the transferred power by a factor of Q (quality factor).

In accordance with an embodiment, it may be possible to open a magnetic aperture with a DC or AC magnetic field from a permanent magnet or electromagnet from the receiver or a bias DC or AC magnetic field plus a magnet and/or electromagnet from the transmitter/charger and start the power transfer through an aperture. Once power transfer is achieved through such an aperture, the saturating magnetic field may be removed or reduced and if the average value of the AC magnetic field is sufficiently high to saturate the layer, power transfer will continue. It must be noted that once an aperture is opened, due to resonance and local change of the permeability, the magnetic field at this location is much higher than neighboring areas and with proper design and choice of materials and fields, Q, etc, this aperture may be designed to remain open while the rest of the ferromagnetic layer would remain in a high permeability state and continue to provide shielding at other locations and limit radiation from these locations as desired. Such a latching behavior was observed experimentally with another type of thin layer ferromagnetic material with lower saturation flux density. In addition, the possibility of opening the magnetic aperture through power AC magnetic field alone without the need for any DC or AC switching magnetic field was discussed in the MC section earlier.

In yet another embodiment, the transmitter periodically or continually applies a DC or AC magnetic field generated by a coil (the same or different from the power transmitter coil) and sufficient magnetic field to bias the switching layer near or above its saturation value. The presence of the receiver coil with or without additional magnetic field from a permanent magnet or electromagnetic near the transmitter at a location on the surface may then be sufficient to bring the system to resonance, open the aperture and start power transfer as described above. Once power transfer starts, then the bias field may be removed or lowered to save energy. The locations on the switchable layer of transmitter away from the receiver will remain at high permeability and therefore confine the magnetic field and would not emit power.

Such an application of a magnetic field to bring the total magnetic field close to or above the saturation level can be achieved by pulsing a magnetic field from an electromagnet such as the transmitter coil and/or a separate electromagnet or coil and may be at the same time that the ping process described earlier occurs. Basically, through application of a magnetic field created by this bias electromagnet (can be the same as power transmitter coil or separate), the switchable layer is brought close to or over the saturation level. Then the power transmitter coil provides an additional AC magnetic field that may be detected through an opened magnetic aperture by any receiver coil present to start communication. Once this response is detected by the charger/transmitter, then continuous power is transmitted from the charger/transmitter and the regulation/control loop is established and power is transmitted until the receiver sends an end of charge signal or is removed so no feedback signal is detected at the charger/transmitter. As described above, during the transfer of power, the bias magnetic field to the switchable layer may or may not be applied depending on the design and principle of operation.

In yet another embodiment, the receiver can contain a permanent magnet and/or electromagnet (which in some instances can be the same coil as for the receiver coil for power transfer) that is pulsed or turned on to apply a bias field to the switchable layer to saturate it to open the aperture and start power transfer. As described above, it may be possible to turn this bias off or remove the permanent magnet once the power transfer has started without affecting operation.

In many applications, it may be advantageous to control the amount of power output to or from a receiver circuit. In one embodiment where the output voltage of the receiver coil to an output device or battery needs to be regulated (or adjusted) with respect to changes in the load impedance, an output regulator stage can be used at the output of the receiver circuit or the input of the device or battery can be used. However, in another embodiment, it may be beneficial to take advantage of the properties of the magnetic aperture to control the power, voltage, or current delivered to the regulator. This may be achieved in any of the methods described above by controlling the amount of the current to a magnetizing magnet in the receiver so that by judiciously adjusting the degree of saturation of the switching magnetic material, the amount of coupling to the receiver coil is adjusted and a constant or desired output voltage to the output device or battery is provided. In this way, the non-linearity of the performance of the magnetic material is used to control the amount of the coupling to each receiver actively.

It must be noted that as described earlier the permeability is a tensor and the permeability of the material to magnetic field in one orientation may be affected by a magnetic field in another orientation in anisotropic material. So, novel single or multi-layer material and field geometries may be employed to take advantage of the magnetic aperture concept. Furthermore, modeling of the AC magnetic field of the wireless charger and the switching magnetic field and the nonlinear behavior of the ferrite layer can provide further optimization in performance and choice of materials and geometries.

It may be further possible or desirable to switch the magnetic aperture on and keep it open in a certain location of the switchable layer. An example would be a charger/power supply layer where an aperture in a particular area for power coupling is opened and kept open without continued presence of an AC or DC switching magnetic field until the user desires to close this aperture. For these cases, it may be desirable to use a hard magnetic switching layer such as shown in FIG. 16 where the magnetic state of a region is changed by applying a sufficiently large magnetic field to switch the magnetic domains in that area and change the permeability permanently to a state that allows transfer of power through the aperture due to the created remanence field continuing to saturate the material until reset by an opposing field of value equal to the coercivity of the material or heating of the material over its curie temperature. An application of this may be for example a charger/power supply table or surface or device of large area where at will, by application of a high magnetic field through the switching layer with a permanent or electromagnet or a combination thereof, a region is modified and serves essentially as a power outlet for inductive power until the user chooses to close it by application of a reverse field or heating. This would allow intriguing possibilities in essentially creating a semi-permanent (reversible) power socket or outlet at any location by using a magnet of proper strength and geometry to essentially punch a permanent aperture at that location to allow coupling to the power available in the wireless charger surface. Once the magnetic aperture is created, placement of a device even without a magnet at that location would provide power to the device. The aperture can be closed at will with a reversed and sufficient magnitude field or local heating of the region.

An analogy for the above method of regulation and control of the amount of the power transferred can be seen in a product called the Saturable Reactor or Magnetic Amplifier (shown 430 in FIG. 30) where the amount of an AC current flowing through a lamp (L) from an AC source (G) is controlled by the inductor T made of a ferrite core such as iron that is saturable. Another winding of the coil nearby is connected to a battery (B) or a DC power source and the current through the winding (i.e. the magnetic field and flux density incident on the core) are varied through a variable resistor (R) to change the permeability of the iron core or saturate it to modify the inductance value along the current path to the lamp (see Wikipedia entry for Saturable Reactor). While this is a very different application of modifying the permeability of a material with application of a magnetic field, it shows that the basic concept is solid and can be used in products.

Figure 31:
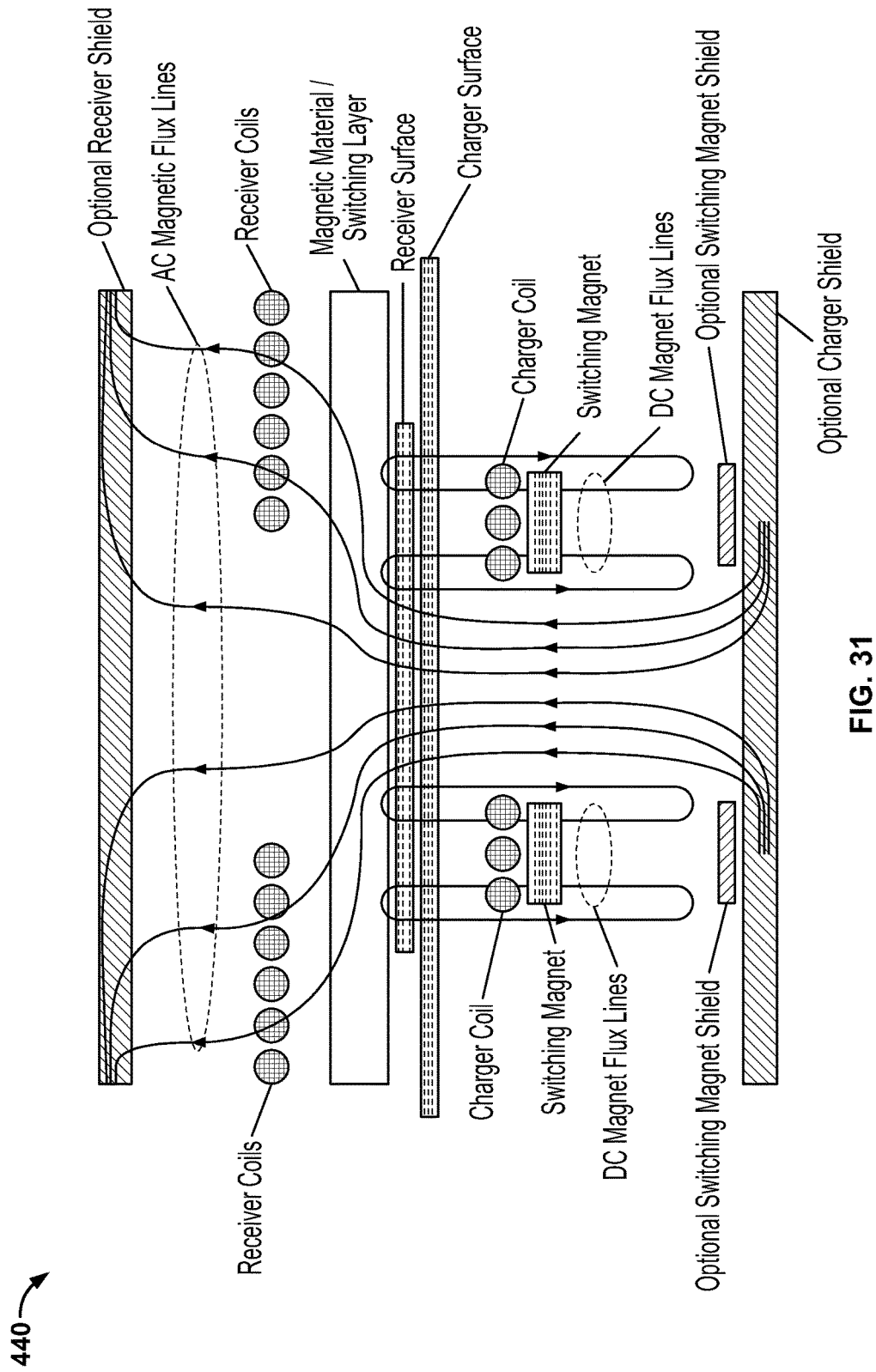
FIG. 31 illustrates a configuration that includes a charger switching magnet, and optional charger and/or receiver shielding layers, in accordance with an embodiment.

In yet another embodiment, it may be advantageous to have a system geometry whereby the relative sizes of the charger and receiver coils are reversed so that the charger coil is smaller than the receiver coil and/or the charger incorporates the switching permanent and/or electromagnet for safety or other reasons. For example in case a wireless charger for an automobile, bus, robot or other product is developed such that in the case of an automobile as an example, a driver may park a car over an area on the road or garage floor to receiver charge, it may be undesirable or impossible for the automobile (the receiver) to include a small coil and switching magnet that would open a magnetic aperture on a larger charger surface to allow efficient coupling. In such cases, it may be possible to design a large receiver coil and a magnetic switching layer placed below the coil (i.e. between the coil and the road) such that the switching layer would cover or exceed the area of the receiver coil. A smaller coil in or near the ground/road/floor and an in the case of MA configuration, appropriate permanent or electromagnet of appropriate size placed in the charger (on the ground or floor) and would open a magnetic aperture in the switching layer of the receiver (in the car) to allow optimum coupling of the charger and receiver coil when the automobile receiver coil and its switching layer is placed on the charger coil. In this configuration 440 shown in FIG. 31, the charger switching magnet and optional charger and/or receiver shielding layers are shown. In addition, the receiver may include a surface or outer layer, skin, body, etc. that may be located between the ferrite, magnetic material or switching layer and the charger surface. It must be noted that any embodiments described in this document may be combined with the geometry of FIG. 31 to be used for cases where larger receiver coils and smaller charger coils may be used.

Figure 30:
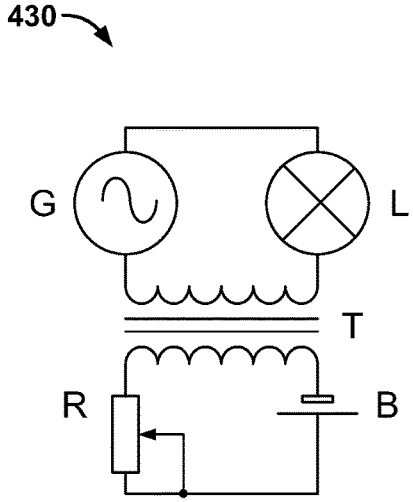
FIG. 30 illustrates a saturable reactor or magnetic amplifier, in accordance with an embodiment.

In a Magnetic Coupling (MC) embodiment of this geometry, the switching magnet and the optional switching magnet shown in FIG. 30 would not be required.

In yet another embodiment to allow for charging an automobile or other vehicle or movable system such as a robot, etc., the coil on the stationary part (the road or the floor) or alternately the moving part (car, robot, etc.), can be made to be much longer and/or wider than the other coil to avoid the need for precise alignment. For example a charger coil on a floor or road can be in a rectangular or oval shape while the receiver coil in a car is circular and placed at any location at the bottom center line of the car. In this way, the driver does not have to precisely align the coils in the front and back direction to use the charger. Similarly, different cars with the receiver coils placed at different locations in the car can use the same charger.

Another method for achieving the goal of modifying the permeability of the switchable layer locally is to use the Curie temperature property of a ferromagnet to alter its properties. Curie temperature or point is the temperature at which a ferromagnetic or a ferrimagnetic material becomes paramagnetic upon heating. An iron magnet for example will lose its magnetism if heated above the Curie temperature and the effect is reversible. In optical recording, a laser light is focused on a data track to be written and the local temperature is raised over the Curie temperature. At the same time, a nearby coil will create an alternating magnetic field that mimics the data to be recorded. As the location under the laser beam is heated, the data is erased and the magnetization is changed to the direction dictated by the applied external magnetic field. Once the laser beam is passed and the material cools, that modified location of material is fixed and the up/down magnetization is frozen into the material to be stored and/or read back through magneto optic detection of polarization change of an incident optical beam when the track is read back.

Nickel (Curie Temperature of 358° C.) and Iron (Curie Temperature of 770° C.) or alloys of these materials are often used for this type of recording application. Lower Curie temperature ferromagnetic material can also be designed. As an example, the ferrite material used with high efficiency in the MA section above has a Curie temperature of 200°. Similarly, in the wireless power case described above, in one embodiment, the receiver may locally heat a switchable layer optically or through resistive heating or a combination of the above to locally modify the permeability and affect the amount of power transfer by opening a magnetic aperture while leaving the rest of the area of a switchable layer unmodified to shield the transmitter coil magnetically and reduce or eliminate emission.

Use of the Curie temperature effect and the magnetic saturation may be combined or used individually to design an optimized system as described above and to achieve best performance.

In another implementation for use in other applications, a ferromagnetic layer that has an EM field incident on it, may be modified in a one or 2 dimensional manner as desired by placing pixels or arrays of electromagnets such as printed or assembled coils or alike along the front and/or back or inside such a material. This may be combined with field from one or more permanent magnets to bias the operation near the saturation level. By locally activating the electromagnets, the local permeability may be modified affecting the phase and amplitude transmission and/or reflection properties of the EM wave at that location.

While the above descriptions relate to modifying the amount and location of power transmitted from a 2 dimensional wireless power system, the concept can be used for modulating the transmitted and/or reflected amplitude and/or phase of any electromagnetic and/or magnetic wave by using a ferromagnetic layer. In a general sense, the description above is for the first time describing the concept of locally modifying the shielding and/or magnetic properties of a magnetic or ferromagnetic layer by application of one or more or a combination of permanent and/or electromagnets and/or temperature to modify the magnitude and/or phase of the reflected and/or transmitted electromagnetic or magnetic field at any location in the 2 dimensional space while passing through or reflecting from such a layer. Beyond wireless power, this may have applications in shielding or modulating the amplitude and/or phase of a 2 dimensional electromagnetic or magnetic wave spatially. Applications may include phased array radar, beam steering, EM cloaking, beam forming and shaping, etc.

One advantage of use of a magnetic aperture (MC) or magnetic coupling (MC) in a wireless power transmission system is that the amount of power transferred and characteristics of the system may be determined by the size of the receiver coil and associated magnetic including magnet if any. So using a large transmitter coil, a designer may have flexibility in powering a variety of receivers and associated devices/power levels with the same transmitter coil. For example, a large receiver coil and associated possible magnet or electromagnet or heater (for curie temperature operation), may be used for providing relatively large power and to charge or power a laptop, power tool, or lamp, etc. while a smaller coil and magnet (in case of MA) may be used to power or charge a mobile phone or Bluetooth headset. Such flexibility is very advantageous in many applications.

In a loosely coupled system, two or more receivers may be placed on and powered or charged from one transmitter coil simultaneously due to the size mismatch. The inventors have tested placement of two or more receivers on the both types of charger surface (MC and MA) described here, and shown that in either configuration multiple receivers can be powered simultaneously while detecting no or low emission from any other area on the surface. This allows for the development of charger systems where multiple (2 or more) receivers can be powered or charged simultaneously. In accordance with various embodiments described here, the receivers can provide different power levels and/or voltages to different products or parts or be operating with different protocols or operating frequencies. The sizes of the receiver coil, number of turns of the receiver coil, the regulation mechanism and overall system design can also be optimized to address a particular design requirement. This allows for the development of power surfaces with little or no power dissipation or emission (since the system is not in resonance and in low current draw state without a receiver). The same surface can also power or charge multiple devices including lamps, kitchen appliances, laptops, keyboards, computer mice, mobile phones, power tools, batteries, etc. as needed by simple placement on or near the surface. Experimentally, the inventors have found that, depending on the degree of resonance that can be adjusted by adjusting the Q of the system, the receiver can also be some distance (up to several cm) from the charger surface and receive power. This also allows placement of the charger pad under a table or surface if necessary. In such a system, depending on configuration, power transferred to each receiver may or may not be individually adjusted since any adjustment would affect operation and power received at all receivers. Methods for adjustment of power to each receiver may include serially or alternate powering of each receiver whereby the receiver disconnects its coil for a period allowing only one or a number of receivers to receive power or regulation of power at the receiver or a combination of the above. In this Time Division Multiplexed (TDM) arrangement, each receiver is powered for a period of time by having its receiver coil connected to the receiver circuit and output load, before disconnecting that receiver and moving on to the next receiver. The advantage of this system is that during each power delivery time slot to each receiver, a one to one power delivery and communication connection can be established and the output voltage, current, and/or power can be controlled by the charger/power supply through communication and feedback during this period before moving on to the next receiver, etc. The disadvantage of this architecture is that each receiver only receives power during some period of time instead of continuously. Such a condition may not be acceptable for some applications. In general, it would be desirable for the time slots for powering each receiver to be short enough so that the receiver or charging circuit in the device or battery does not notice the connection and disconnection of received power.

Another problem that has been noted in use of wireless power systems for charging and powering of devices or batteries has been that in case a metal object is placed between the receiver coil and the charger coil, the AC charging magnetic field may cause unwanted heating and safety issues. It is therefore desirable to detect such a presence and take corrective action. Corrective action may include termination of charging, reduction of power, notifying the user by an error message or a combination thereof. Several methods for detection of such foreign metal objects are possible. In a simple method, a thermal detector or thermistor in the charger and/or receiver detects an abnormal temperature rise in the charger or receiver coil area and corrective action is taken. Another method may be to measure or estimate the power delivered to a device or battery at any given moment and comparing it to the delivered power to the charger/transmitter, ensure that safe operation is being conducted. This can for example be done by the receiver reporting the power delivered values to the charger and the charger comparing it to the power or current it is delivering to the charger coil and taking corrective action if anomalies are observed. However, an advantage of the magnetic aperture system described here is that the magnetic aperture created depends on the application and sensing of the magnetic switching AC or DC field from the receiver to saturate the magnetic layer. Presence of metals in between the charger and receiver coils, may reduce or eliminate the magnetic aperture and therefore automatically reduce or shut off the power transfer. The degree of this effect would depend on the type, composition, and size of the metal object involved but with appropriate design of the charger and receiver coil, the switching magnet and the switching material would enable design of products that may inherently be safer in this respect. In addition, this technique may be combined with the other techniques described above to provide further safety. In practice, the inventors have tested this by placing a large magnetic metal sheet of Stainless Steel in between the charger surface and a receiver coil and its switching magnet. While the amount and efficiency of the power transfer was affected, wireless power transfer continued without or with minimal eddy current heating of the sheet. This occurs because the Stainless Steel shields the magnetic switching layer in the charger from the switching magnetic field of the ring magnet in the receiver. Thus the magnetic aperture is only partially (area wise) opened only in the areas of overlap of the receiver coil and the charger surface where the metal sheet is not. In this way, power transfer can continue in this area and since the other parts of the metal sheet are on top of the magnetic layer that is not opened, it does not receive any power from the charger and thus no or minimal eddy current and heating is generated. A ring magnet was used in this case but the results are not limited to this geometry and are general with respect to a variety of magnets and geometries. Similar results may be obtained in the MC configuration.

In some applications, it may be desirable to be able to charge wireless power receivers at a distance from the charger surface or electronics. Examples for consumer application include a wireless charger that is mounted or attached under a desk or table to charge devices placed on top. Another case may be charging of a battery powered, electric automobile or vehicle. Depending on the charger and receiver coil size and operating frequency, Q of the cavity, etc. the operating distance varies. The inventors have found that in a 'traditional' loosely coupled system (i.e. without the magnetic layer) such as described above (with 18.times.18 cm charger coil and 35 mm diameter receiver coil) coils can be separated to distances of several cm while significant power is transmitted. The inventors have obtained power transfer of over 20 W into a single coil at up to distances of 3 or 4 cm. However the system efficiency may be reduced to 50% or lower for these distances. These gaps are sufficient for most of the consumer electronics applications envisioned.

Similarly with a magnetic layer system in MC or MA configuration as described above, the distance between the receiver and the charger can be increased while continuing to receive power. However, two parameters have to be kept in mind. One is the Q of the resonator and/or the distance where the electromagnetic field exists away from the charger surface (which is governed by the frequency of operation, coil size, magnetic material properties, pattern, etc.) and the other is the field pattern from the switching permanent or electromagnet that is required to open the magnetic aperture in the MA configuration. This switching field should be of sufficient dimension, direction, and shape to effectively affect the switching magnetic layer and modify the properties to open an aperture and allow efficient coupling. It was experimentally observed that in a system similar to the loosely coupled system described in the last paragraph but with a switching layer covering the charger coil and a ring magnet similar to FIG. 22 in the receiver, efficient (up to .about.50% efficiency) power transfer at up to about 2 cm vertical coil to coil gap can be obtained. Somewhat less efficiency but larger operating distances can be obtained in the MC geometry without the switching magnet and with a different and appropriate receiver coil. It must be noted that even with a large gap between the charger and the receiver, the areas around the receiver do not contain significant Electromagnetic emission as tested by placing metal parts in this area and not observing much change in power transferred or pulled from the DC supply providing power to the charger. The reason for the presence of the coupling is the enhancement achieved by the resonant circuit (in the MC configuration) combined by the open aperture created in the MA configuration. As the gap is increased from around 2 cm, power transfer drops rapidly in the MA configuration. This may be due to the field of the switching magnet reducing and not opening the magnetic aperture completely. Proper optimization of the design and type of magnet, coils, switching layer or use of multiple layer switching layers could significantly improve this.

To enable the system to operate at larger gaps, several embodiments are possible. In one embodiment, the magnetic layer (ferrite or other material) is separated from the charger coil such that a gap between the charger coil and the switching layer exists. This gap can be several centimeters. Since the magnetic or switching layer (in the MA configuration) is a high permeability material, it is quite an effective material to draw the emitted magnetic field from the charger coil into itself. Therefore, even at large distances, the layer acts as a boost/repeater, or flux reservoir layer and good coupling into this layer exists. This power can be coupled into a receiver placed on or at a distance from this layer. In the MA configuration, when a receiver with a switching magnet is placed on or over the top surface of this layer, the magnet would switch the switching layer and receive power efficiently. Therefore, large gaps between the charger coil and a receiver can be obtained. Experimentally, a planar magnetic layer of ferrite material described above was placed at a distance of 3 cm away from the top surface of a charger coil of 18.times.18 cm as described above. An MA receiver (as described above) placed on the magnetic layer or within 2 cm of the layer would receive powers in excess of 20 W at efficiencies comparable to the case with the magnetic layer adjacent to the charger coil. In this case the magnetic layer essentially acts as a reservoir of AC power magnetic field away from the charger that is available for the receiver to tap into at a magnetic aperture location to draw power from. Similar results can be obtained in the MC geometry with the appropriate receiver and no switching magnet. Such embodiments are attractive in the case of a desk charger where the charger coil and the associated electronics can be placed or attached to the underside of a table or desk top or the console of a car and the size and bulk of this part is hidden while a thin magnetic layer (can be a thin solid, flexible ferromagnetic, ferrite or other material) is placed on top of the desk or away from the charger coil to indicate the region of operation or carry a logo or be decorative or interchangeable, etc. This repeater layer can be a 0.5 mm or thinner layer and can be flexible or curved etc. as necessary and while being decorative or used to notify the user about where to place a device for charging/power, can serve the important shielding, guiding, and/or switching functions. Any of the materials described earlier can be used for this. Optionally, the charger coil and/or electronics can also have a shield on the opposite side to prevent emissions from the opposite side of the charger. The thin shield/repeater layer on top of the desk/table/console can also provide additional functionality or information to the user. For example the layer can be combined with a wireless power and/or data receiver and/or electronics and display relevant information to the user. Examples include start of charge, status of devices being charged, errors, etc. through use of displays, LEDs, electroluminescent displays, parts, etc. Such a display or layer may be as thin as 0.5 mm or thinner and can provide a multitude of functions.

In another embodiment, a wireless charger/power supply can be placed under a table top and a display or tablet built in or attached to the top and powered from below. The display and/or tablet can also include a portion or surface for charging or powering other devices on it or separate from it. The tablet alternatively may display the charger status or information about devices being charged/powered.

In yet another embodiment, a wireless charger surface with or without a magnetic top layer (i.e. MC, MA, tightly or loosely coupled or any other configuration) may be covered totally or partially with an electroluminescent (EL) and/or LCD or other display. These structures comprise several layers that may be constructed of metal and/or semiconductor and/or plastic and/or glass but may be as thin as 0.1 mm to several mm. Even though the structures would contain metal layers for applying a field for the device to operate, these layers are extremely thin (several nm to microns) and allow the magnetic field of a charger to pass through. It has been found that the surface of a MA or MC or tightly or loosely coupled charger can be totally or partially covered by an operating EL display while the charger operates normally with no significant reduction in power transferred or efficiency. It is also possible to construct the charger and/or receiver into or on an electronic display or screen. The charger and/or receiver coil and circuits may even be constructed of printed circuit or plastic material used to manufacture the display to save processing steps and complexity.

In accordance with an embodiment, the charger is a stand-alone device/pad or other shape combining a display and charging functionality. The display can provide information useful for the user of the charger or can be a fully functional display for information such as a tablet, netbook or computer or table top computer display. For example a tablet may incorporate a wireless charger on its top display surface. By placing a mobile phone or camera on the display of the tablet, charging may commence and additionally, other functions may start. For example data, images, music, etc. may be transferred from one to another.

In the case of a desk wireless charger described above where the charger circuit is placed under the desk and a magnetic layer is placed on top as a magnetic boost or reservoir plus shield layer, it may be beneficial to provide LEDs, a charge indicator or other information to the user. In this case, according to an embodiment, all or a portion of the boost/magnetic layer is covered or integrated with an EL, LED or other layer and powered by the applied power from below and a small circuit to provide indicator LEDs, charge percentage, or other info or a full feature display to the user. As an option, in public area uses or kiosks, advertisement or other info can be provided to the user while devices are charged or powered on or near the display. The display and the charger layer can each be less than 0.5 mm thick or similar and can also be flexible or rollable and/or laminated or itself hermetic/impervious to environments and also allow accommodating a contour or curve or be rolled and unrolled like a placemat. Many applications and embodiments of this are possible and the possibility of a wirelessly powered display and/or charger can be used in many applications.

In various other applications, including U.S. patent application Ser. Nos. 12/400,703, 12/2102,00, 11/408,793, 11/654,883, 12/543,235, 12/250,015, 12/211,706, 12/427,318, 12/756,755, 12/618,555, 12/510,123, 12/323,479, 12/479,581, 12/505,353, 12/351,845, 12/189,720, 12/394,033, 12/547,200, 12/040,783; and U.S. Pat. Nos. 7,741,734 and 7,825,543, wireless power systems for operation with large distance between the charger and receiver have been described. These systems generally operate as loosely coupled systems but have also been called magnetic resonant systems. However, the inventors recognize and have described the safety and regulatory issues arising from the large electromagnetic emissions present in such systems. Meeting regulatory and human safety standards are challenging and may be only achieved for limited power outputs and in certain frequencies of operation intended for unrestricted power output. Some of the embodiments of the systems described here attempt to overcome such restrictions by limiting or eliminating the Electromagnetic emission and exposure from wireless power systems by use of a magnetic aperture.

Figure 32:
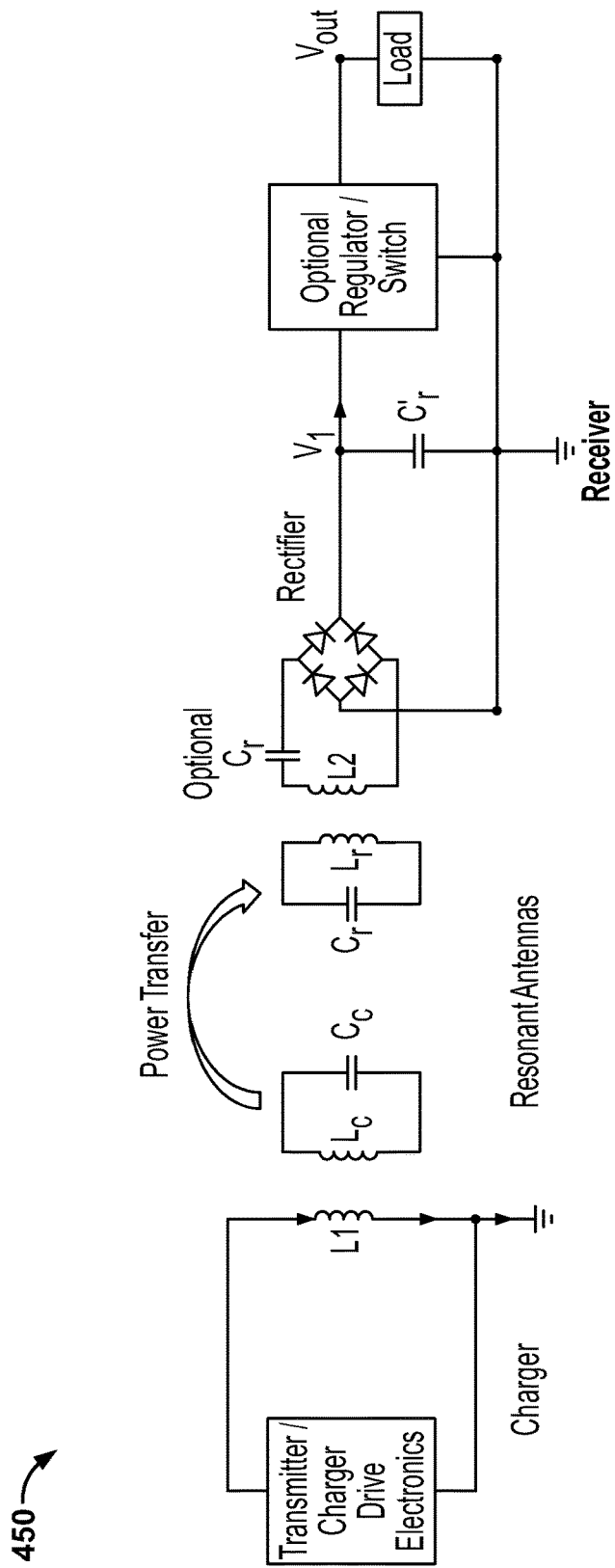
FIG. 32 illustrates a system that uses two coils for the charger and two for the receiver, in accordance with an embodiment.

To achieve the large operating distance possible by systems using loosely coupled or magnetic resonance technology whereby the coupling coefficient is small, previous investigators have found it necessary or preferable to operate the systems at high Q values often exceeding 100 or 1000. To overcome parasitic losses in a coil and driver system, previous investigators have also found it preferable to utilize 2 coils for the charger and 2 for the receiver. This system 450 is shown in FIG. 32. The charger/driver electronics in the first coil is powered by the transmitter/charger drive electronics and produces an electromagnetic wave that couples to a charger resonant antenna placed nearby through a coil L1. This antenna is the one that actually transmits power over a distance and comprises an LC circuit formed by a low resistance wire or coil loop ($L_a$) and a capacitor ($C_c$). Due to high Q's encountered, the voltages generated may exceed 1000's of V so appropriate high voltage capacitors may be needed. The receiver (used in or on or attached to a mobile or electronic device or battery) comprises a receiver resonant coil ($L_r$) and a capacitor ($C_r$). The receiver resonant antenna may have similar construction and/or Q or more typically be of smaller dimensions and/or Q of the charger. The wireless power is transmitted over a distance between the 2 resonant antennas described. This received power is then in turn coupled to a receiver circuit through a coil L2. The power is then rectified and smoothed and connected to a load. An optional regulator or power switch may also be included in the receiver. This description describes a simplified system with no communication and/or microcontroller control. In practice, these elements may be needed as described in earlier systems.

Figure 33:
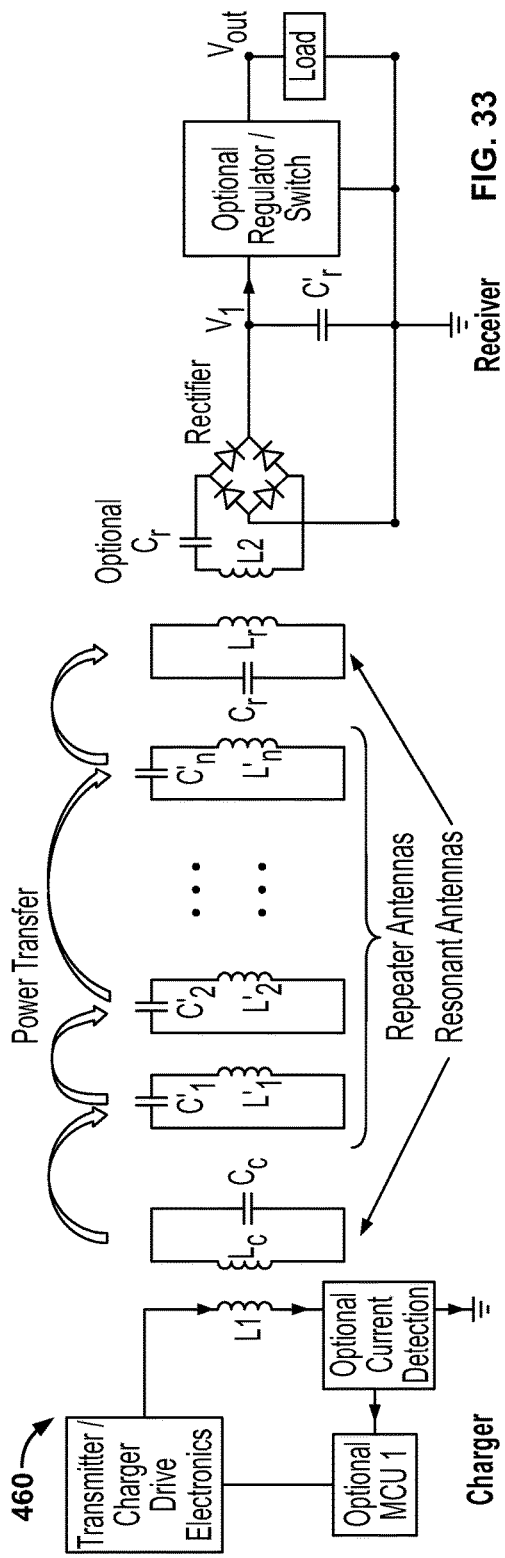
FIG. 33 illustrates a configuration where one or more repeaters are inserted between the charger and receiver resonant antennas, in accordance with an embodiment.

In loosely coupled systems as described here, it may be possible to increase the distance between the charger and receiver coils additionally by adding passive resonant antenna elements to act as repeaters. This configuration 460 is shown in FIG. 33 where one or more repeaters are inserted between the charger and receiver resonant antennas.

While some of the systems described here use 2 coils for the charger and 2 for the receiver, systems with single charger coil and single receiver coil or 2 coils on either charger or receiver are also possible for loosely coupled/magnetic resonance systems as described in earlier sections. In general, due to potentially lower Q factors, these may operate at lower charger/receiver distances. The descriptions here are attempting to capture the various systems possible in the most general sense and are not meant to limit the description of the embodiments possible.

One of the key observations in this system is that the magnetic field generated between the 2 resonant antennas (or resonant antennas and repeater antennas) is quite large and enhanced owing to the resonance and the high Q used. This would in many cases cause unnecessary emissions, human exposure, and/or eddy current heating and interaction with metals nearby.

Figure 34:
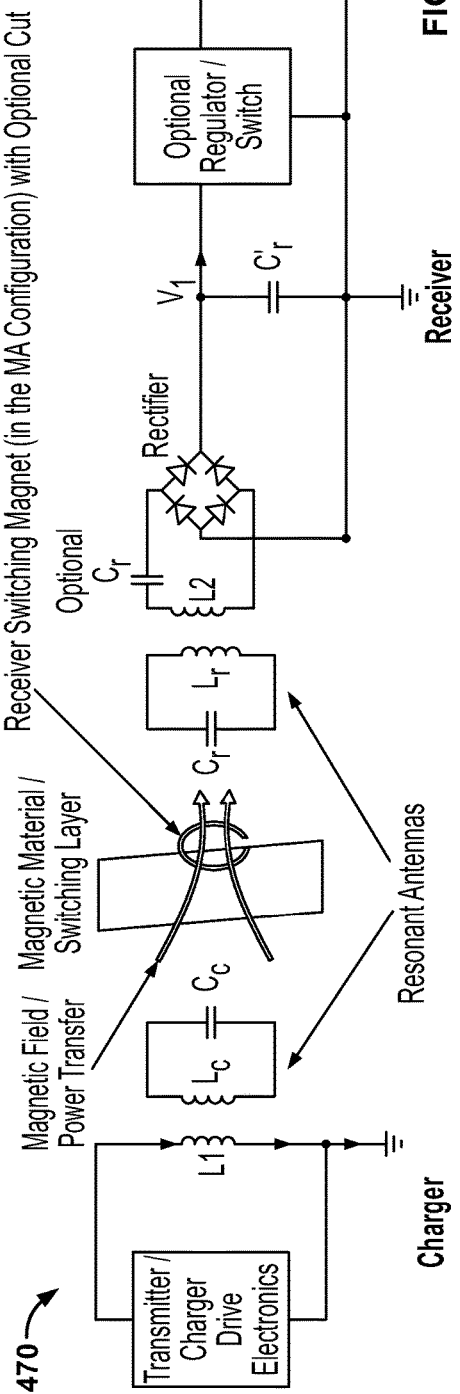
FIG. 34 illustrates a layer comprising a magnetic or ferrite or other material added to the charger to limit the emission from the charger into space, in accordance with an embodiment.

In accordance with an embodiment and building on the concepts of MC and MA configurations described above and shown 470 in FIG. 34, a layer comprising magnetic or ferrite or other material is added to the charger to limit the emission from the charger into space. The receiver may contain a permanent magnet or electromagnet (in the MA configuration) to locally modify the switching layer and create a magnetic aperture for localized and efficient transfer of power to the receiver. The efficiency of such a system would exceed the regular loosely coupled system due to the elimination or reduction of loss of power to surrounding areas and the extraneous unwanted electromagnetic emissions would be greatly reduced as described earlier. It must be kept in mind that a variety of materials, parameters, and geometries for the magnetic/switching layer, magnet, coil, rectification, regulation, or additional elements for communication, control, detection of foreign objects, thermistors, etc. are possible as described here and FIG. 34 is greatly simplified to more clearly illustrate the basic elements of the system. It must also be noted that as described earlier, the magnetic/switching layer may be placed at a distance from the charger resonant coil and similarly the receiver magnet may be at a distance from the magnetic/switching layer and/or the receiver resonant coil. In addition, as described earlier, the magnetic/switching layer may in effect act as a reservoir of power due to its high permeability and draw the power away from the charger coil in a similar manner as a resonant antenna or a repeater antenna. Thus several geometries with a large gap between the charger coil L1 and the charger resonant antenna with the magnetic/switching layer close to the charger resonant antenna or closer gap between the charger coil L1 and the charger resonant antenna and a larger gap between the charger resonant antenna and the magnetic/switching layer or a combination of the above is possible to create a larger gap between the charger and the charger surface or the receiver. Similarly many variations in placement of the receiver switching magnet or electromagnet exist. In addition, one or more magnetic/switching layers and optionally (in case of use of MA) magnets may be placed at one or more locations of a system such as shown in FIG. 34 to funnel or better control the direction and flow of the power as shown in FIG. 35 to increase efficiency and reduce unwanted emissions.

Figure 35:
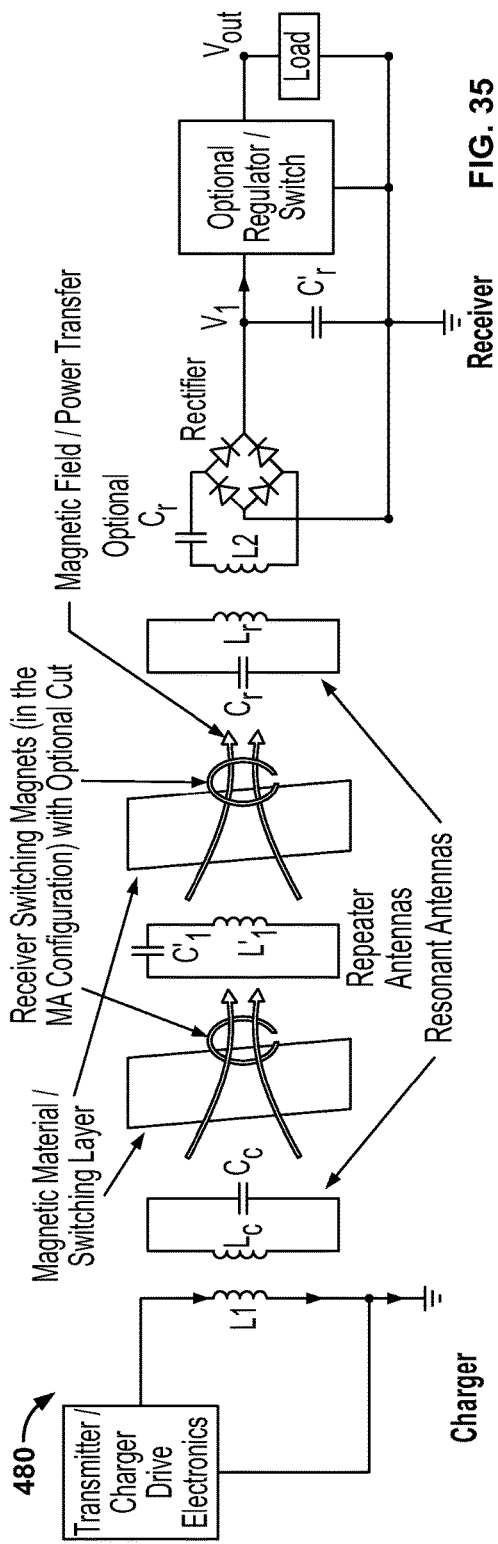
FIG. 35 illustrates the use of one or more repeater antennas and one or more magnetic/switching layers, in accordance with an embodiment.
Figure 36:
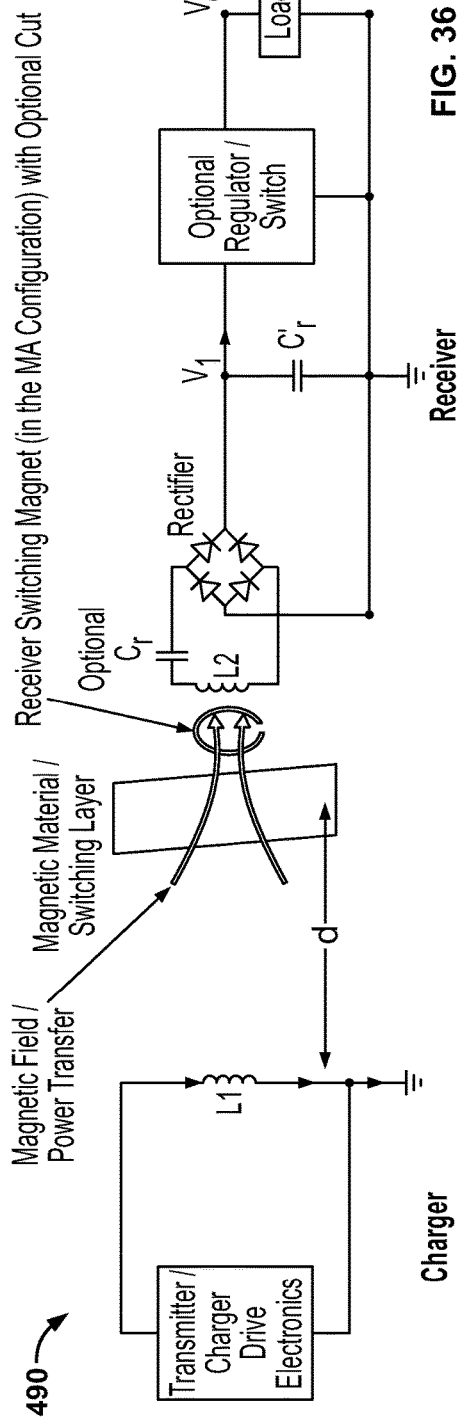
FIG. 36 illustrates another use of one or more repeater antennas and one or more magnetic/switching layers, in accordance with an embodiment.

In the geometry 480, 490 of FIG. 35 and FIG. 36 respectively, one or more repeater antennas and one or more magnetic/switching layers and optionally (in case of use of MA) magnets and/or electromagnets are used to extend the range between the charger and receiver while controlling the emissions. It must be noted that as described above, magnetic/switching layers and/or repeaters and/or resonant antennas may be used in a number of combinations and placements to extend the range as appropriate for any application.

As an example of the embodiments described above, a charger may be placed below a table or console and the resonant coil and a magnetic/switching layer placed on top of a table in a thin layer to be close to receivers embedded or attached to devices and/or batteries. In another geometry, the charger and the charger resonant coil may be under a table or a long distance away and a repeater can be placed below or on top of table with a magnetic/switching layer directly or with some distance on top of it to for the device to be placed on top of Many different geometries are possible with the combination of approaches described here to provide efficient power transfer to one or more receivers while keeping extraneous unwanted emissions to a low level.

It must be noted that in these embodiments a larger charger resonant coil and smaller receiver coils is described. However, as described earlier, the opposite may be preferable in some situations and the magnetic/switching layer may be placed closer to the receiver and any used switching magnet may be close or part of the charger.

In addition, while the MA or MC configuration and use of a possible switching magnet is described here, any of the combinations of heat, dc, and or AC magnetic fields and/or use of hard magnets or self-switching due to high AC magnetic fields, etc. can be used to achieve desired performance and characteristics. In addition, any magnet if used can have a variety of shapes and geometries as described earlier.

Many of these combinations of technologies may be advantageous to systems where high power and large charger/receiver gaps are desired such as charging electric vehicles, etc.

In accordance with an embodiment, the charger coil and/or the magnetic/switching layer is curved or folded to form a non planar or enclosed surface. Examples include a charger bowl or cup where mobile devices can be placed to be charged. Such a cup may be advantageous in an automobile cup holder as an example to allow the user to place a phone into the cup for charging. The charger coil can be constructed from Litz wire and/or flexible PCB material to cover the entire or a portion of the surface of the cup. This can be covered by an appropriate magnetic/switching layer and when a mobile device or receiver with the appropriate magnet (in case of MA configuration) is placed inside the cup, it can switch the appropriate location on the cup to allow flow of power and charging of the device without affecting nearby parts or extraneous emissions. In an MC configuration, no switching magnet would be necessary.

Figure 37:
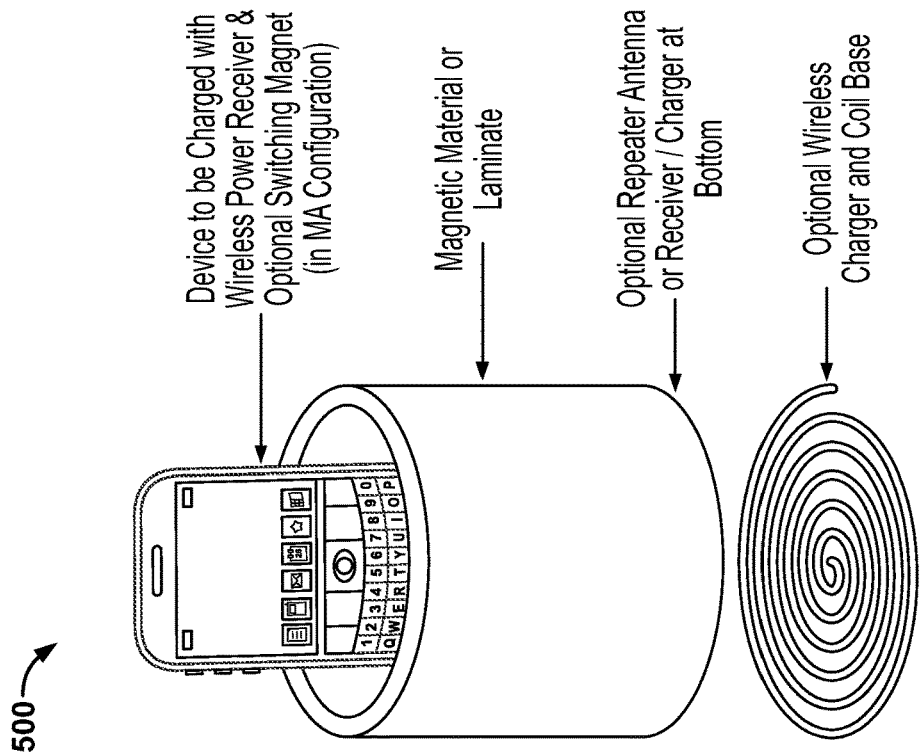
FIG. 37 illustrates a charger coil that is flat with a magnetic or switching layer formed in the shape of a cup, cup holder cylinder or other bowl, in accordance with an embodiment.

As an alternative, the charger coil may be flat and the magnetic or switching layer is formed in the shape of a cup, cup holder cylinder or other bowl, etc. or laminated with solid or flexible material such as flexible magnetic material or ferrite as shown 500 in FIG. 37. For example, in an embodiment such as shown in FIG. 37, the wireless charger may be in the shape of a cup for placement of mobile devices inside to receive charge/power. The charger can be powered with the charger circuit integrated into the cup or cup holder or inductively through integration of a receiver and charger drive circuit into the cup or cup holder or directly simply by having the charger circuit and coil at the bottom as shown in FIG. 37. When inductively powered, the bottom of the cup or cup holder may be from the same magnetic material or other material to guide the flux to the walls and may even contain a repeater antenna as described earlier to allow large gap between the charger and the cup. The charger coil may be at the bottom or at a distance from the cup and flat or curved and the flux is guided up the sides with a ferrite material shaped like a cylinder or coated or laminated with flexible ferrite or other magnetic layer to allow a device with appropriate receiver and/or switching magnet (in the case of MA configuration) to be charged when placed inside. Additional shielding material may be placed on the outer surface of the charger to shield the charger radiation externally. Many other shapes and configurations are possible with the technology described here.

Figure 38:
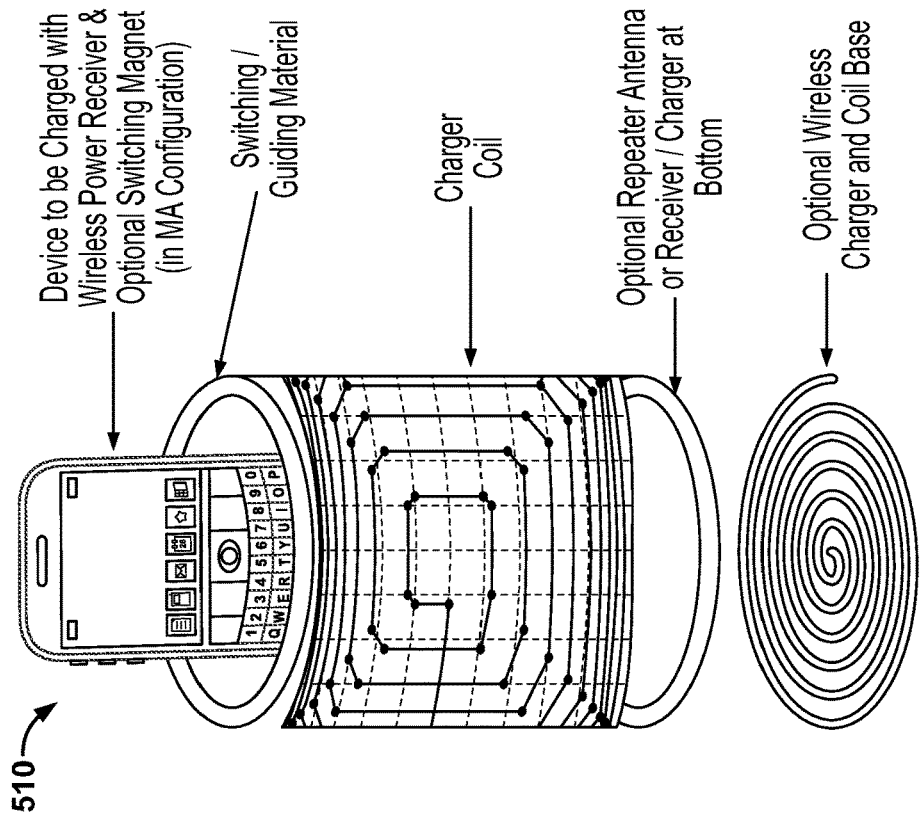
FIG. 38 illustrates how the charger coil can be wrapped around the vertical cylinder body while the inside of the cup uses the magnetic solid material, layer or laminated film, in accordance with an embodiment.

Alternately, as described above and shown 510 in FIG. 38, the charger coil can also be wrapped around the vertical cylinder body while the inside of the cup uses the magnetic solid material, layer or laminated film. The charger coil is only partially shown. The coil would wrap around the entire or the desired active part of the surface of the cylinder or cup or cup holder and comprise one or more coils. Many geometries of coil and construction by wire, PCB, Litz wire or a combination are possible. In this case as described above, the charger coil may be powered directly by a charger circuit powered by wired power or a charger circuit that is itself powered inductively whereby a wireless receiver is integrated into the cup or cup holder and is powered by a wireless charger base. The ability to separate the charger cup/cup holder from the charger body/surface (base) as shown in FIG. 37 may be advantageous and provide flexibility in some circumstances.

In all of the embodiments described here, the electronics in the charger and receiver may be implemented using discreet electronics components or Application Specific Integrated Circuits (ASICs) that would combine a variety of the functions and electronics components into one or several components and enable further integration and reduction in cost and footprint.

Overall, many geometries or architectures for wireless power systems are possible. In network systems and internet, terminology for the methods for transfer of information from a source to one or many different recipients has been developed. A similar terminology is used here to consider powering one or multiple receivers. For cases where the receiver must be placed on or near a fixed position, systems such as tightly coupled systems are used. The architectures below can use loosely, or tightly coupled systems or use a ferromagnetic layer and creation of a magnetic aperture as described above or a combination of the above to achieve positioning freedom. This description is thus more general and attempts to illustrate the different control and communication methods that can be used. In one view, the wireless power system can be described as a power transmission system (wireless charger and receiver circuitry) and systems for control, regulation, safety and other features necessary.

Having dealt extensively above with the power transmission system and methods of power delivery in tightly, loosely, and magnetic coupling and magnetic aperture systems, methods will be described herein for the control, regulation, and safety of the system (control system). To implement the systems with desired characteristics, a close interaction and appropriate design between the power transmission system design and the control system design is necessary.

FIG. 39 shows several possible architectures 520 where the charger circuit comprises sub circuits or units whereby each sub-unit is responsible for powering or charging and/or communicating with one power receiver. The arrows in FIG. 39 show the direction of the power transfer to the device to be charged. However, the direction for the communication and/or control can be in the same direction, the opposite direction, or bidirectional or no communication and/or control between the charger and receiver may exist. In addition, the communication and/or control can be through the coils, by load modulation, separate communication coil or coils, RF or optical path, etc. or a combination of such methods. As described above, existing protocols such as Bluetooth, WiFi, NFC, RFID, Zigbee, WiGig, Wireless USB, or protocols such as that provided by the Wireless Power Consortium (WPC), developed for wireless power, or a combination of the above and/or new protocols or proprietary communication mechanisms can be used. As described above, it is also possible to develop systems whereby there is no communication between the charger and receiver and any regulation or end of charge termination and/or shut off due to unexpected events occurs in the receiver.

A simple example of such one to one architectures is a multi-charger tightly coupled system where multiple identical or similar charger circuits are replicated several times in a charger and connected to similar coils to allow powering or charging several receivers simultaneously and mostly independently. a) In this architecture, a charger can only support one protocol and the Charger circuit is composed of multiple sub-units where each sub-unit powers and/or communicates with one receiver. The charger coil or active area is defined and in tightly coupled systems each receiver coil must be placed on or near a charger coil to receive power/charge. Little positioning flexibility exists. An example of such architecture is a multi-charger tightly coupled system where multiple identical or similar charger circuits are replicated several times in a charger part or product and connected to similar coils to allow powering or charging several receivers simultaneously and mostly independently. b) In this architecture, the positioning freedom is limited as in a) but the system is designed with its hardware and/or firmware so that each charging location is capable of operating in one or more communication and/or power protocols, providing different voltages, and/or power levels and thus providing more flexibility. Some of the ways to achieve this multi-protocol flexibility or achieving different voltages and/or power levels are described earlier. c) In this architecture, the charger surface may be divided into sections where a receiver can be placed anywhere or with a larger degree of positioning freedom and be powered or charged. This architecture only supports one protocol, voltage and/or power level in each of the charger sections. An example may be a magnetic resonant (loosely coupled) or magnetic aperture or a combination of these systems where the charger comprises several similar coils and/or driver and/or communication circuits and they operate mostly independently to power or charge multiple devices simultaneously. Alternately, each region may provide positioning freedom with tightly coupled technologies such as coil arrays or a moving coil as described earlier. d) This architecture is similar to (c) but it may support multiple protocols, voltages and/or power levels in each of the charger sections. This can be achieved by some of the techniques described earlier.

As an example of FIG. 39(*d*), a power transmitter/charger/power supply may comprise a number of transmitter coils and associated control and communication circuits operating in tandem or independently. The charger/power supply/transmitter surface may thus be divided (and identified to the user) to contain independent sections so that the user may place one receiver on or near each section of the charger/power supply/transmitter to be powered and/or regulated by its associated electronics. Each section may operate as a position independent charger/power supply through use of the techniques and geometries described here so that the user may place the receiver in any position on the charger/power supply/transmitter for operation. Another device to be powered and/or charged may be placed in another section and similarly operate in a position independent manner in that section.

Figure 40:
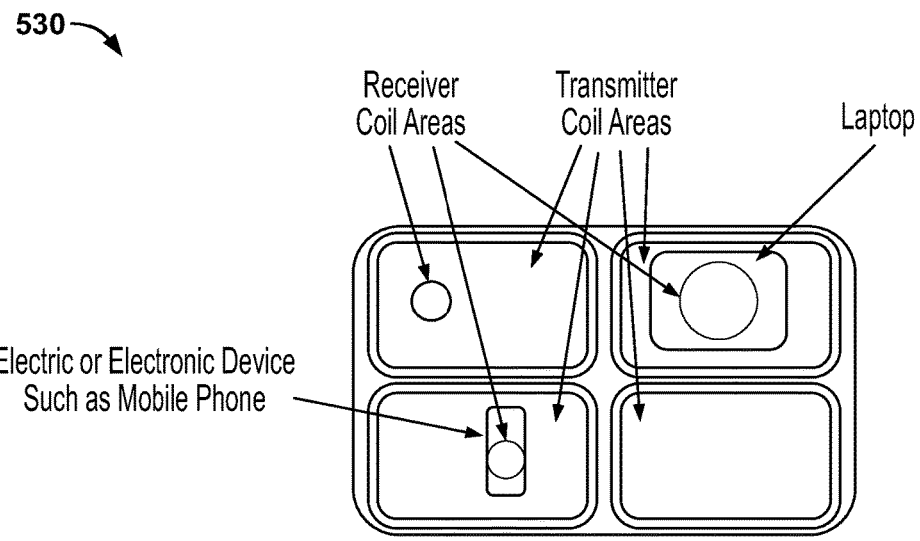
FIG. 40 illustrates a geometry where multiple transmitter coils cover different areas of a multi-charger/power supply, in accordance with an embodiment.

FIG. 40 shows a geometry 530 where multiple transmitter coils cover different areas of a multi-charger/power supply. Within each section, devices with different power rating and/or coil size and/or using the same or different protocols may receive the appropriate voltage and power required. Loosely coupled systems or tightly coupled position free systems within each section can be used to achieve positioning freedom. Although support of multiple protocols or power or voltage levels would require that any system employed in each section be flexible and adaptable in these regards.

Figure 41:
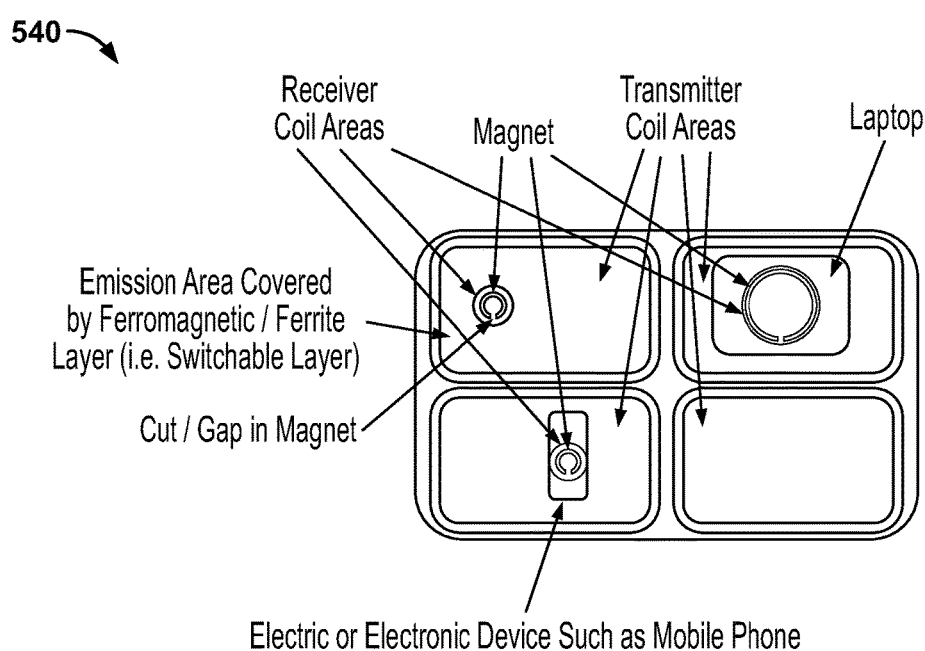
FIG. 41 illustrates use of a magnetic layer and creation of magnetic coupling or a magnetic aperture, in accordance with an embodiment.

Alternatively or in addition, as shown 540 in FIG. 41, as described earlier, use of a magnetic layer and creation of magnetic coupling or a magnetic aperture for coupling of power to receivers can provide benefits in efficiency, positioning flexibility and/or lower unwanted electromagnetic emission. Each section has an independent power driver and/or communication sub unit system to operate with the receiver nearby. In this way, control and regulation of individual devices and position independence can both be achieved. However, in protocols whereby the receiver signals to the charger about amount of power to send and takes control of the operation of the charger, placement of more than one device in each section may not be permitted since the regulation and control system operates by communication between the receiver and charger in each section and adjustment of the power/operation in that section. In practice, this may not be a significant disadvantage to the user.

One of the interesting aspects of the architecture in FIG. 40 or 41 is that even if position free technologies such as loosely coupled chargers or magnetic coupling or magnetic aperture are used in the charger, it may be designed to be backwardly compatible with tightly coupled receivers and/or protocols. As described earlier, tightly coupled systems such as those that use the Wireless Power System (WPC) protocols, are in general designed to have communication between one charger sub unit and a single receiver system and in their basic form designed to establish this through communication through the coil although other methods and paths of communication can also be supported by the architecture in FIG. 40 or 41. By appropriate design of the charger or transmitter coil, the value of the resonant capacitor, the communication system in the charger, etc. a position free charger that can detect and power receivers designed for tightly coupled systems can be designed. To achieve this, the resonant conditions of the position free system may need to be tuned to the right frequency of operation and the right protocol used to understand and act on the communication messages from the receiver. An advantage of this type of approach may be that by using a larger coil and more flexibility, multiple output powers or voltage levels may be supported in different types of receivers thus obviating the need for multiple coils or circuits in the charger to power different types of receivers. Additionally, different communication or power protocols may also be supported to provide more flexibility.

Figure 42:
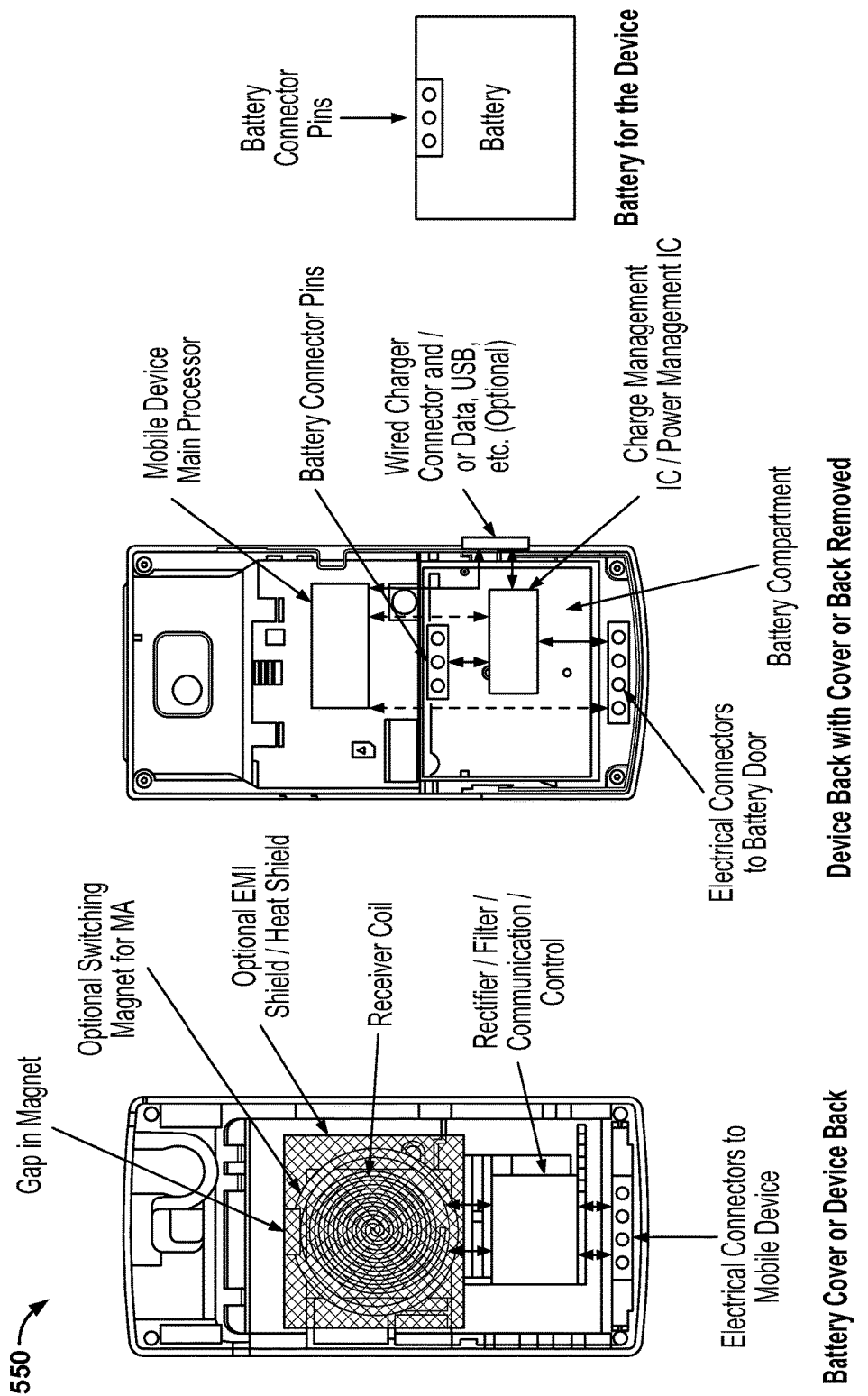
FIG. 42 illustrates a mobile device such as a mobile phone with a receiver coil and receiver circuit integrated into the back cover or battery door, in accordance with an embodiment.

FIG. 42 shows a mobile device 550 such as a mobile phone with a receiver coil and receiver circuit integrated into the back cover or battery door. The receiver circuit including rectifier, control, communication, etc. may be placed on this door and the power connection to the device made through pins or alike to the rest of the device. The main device may also contain a charger IC and or means of allowing wired power/charging for the device and an automatic or user controlled method for switching between wired and wireless charging. To use the wireless power receiver on a position free charger system using magnetic aperture, a switching magnet is also required to locally saturate the ferromagnetic switching layer. This is shown as a ring magnet with a cut (for reducing or eliminating eddy currents) here but can have different shapes and size as described earlier. Similar components may also be used in after—market or optional device cases, battery doors, skins or batteries to allow a non-wireless chargeable device to be enabled for wireless charging. In such cases, battery door or skins or batteries, the receiver coil and the circuitry may be included in the case, battery door, skin, or battery and connected to the device power input through the power connector of the device or pre-existing power connections on the back or side of the device, etc. Alternatively, the coil and the receiver may be integrated into the original or after-market battery of the device and directly charge the battery. In these cases, the receiver may also contain battery charging ICs and protection and or thermal circuits and circuits for detection of wired charging current into the battery and battery ID or other circuitry. In the MA configuration, for the receiver with a position free charger as described earlier with a switching layer, a method for switching the layer is needed. This can be a magnet, electromagnet, or a combination thereof as described above that are added or adhered to the front, back or around the receiver coil during manufacture or afterwards by the user or the product manufacturer or seller to create the appropriate magnetic aperture on the charger switching layer when the receiver is placed on the charger. For example, for a phone case or skin where the coil is in the case, the magnet may also be integrated inside the case by the manufacturer. In addition, the inventors have found that tightly coupled receivers such as those integrated into after-market cases or skins to work with tightly coupled protocols such as the wireless power consortium (WPC) can operate on position free magnetic aperture charger surfaces if one or more magnets of appropriate polarity, size, strength and material can be attached to the outside surface of the case facing the charger thus enabling a standard tightly coupled receiver to also operate on a position free charger surface providing a high degree of flexibility. It must be noted that such a receiver will continue to work on the original tightly coupled (fixed position) charger for which it was designed for since the attachment of the magnet to the outside has no effect on its performance.

In one example, the inventors attached an axially magnetized 1.5 mm thick Nd ring magnet similar to FIG. 22, aligned to be centered around the coil in the protective case. to the outside of a Wireless Power Consortium (WPC)-compatible device (such as that commercially sold by, e.g. Energizer for use with, e.g. Apple iPhones and other mobile devices), and tested this tightly coupled receiver on a position free magnetic aperture system with 18.times.18 cm surface area comprising a coil with pattern similar to FIG. 12 and covered by a layer of 0.5 thick MnZn material of appropriate permeability and switching magnetic field value. Operating the charger at the appropriate frequency of around 175 kHz, the charger can power the receiver and communication and regulation of power through the coil (through the opened magnetic aperture) can be achieved allowing position free, regulated power charging. The charger can fully implement the appropriate protocol and operate similar to a fixed position charger while retaining the flexibility in placement of the receiver. In addition, the receiver and case continue to function normally when used with a standard WPC-compatible charger. Since WPC-compatible systems contain an alignment disk magnet of pre-determined size, shape, and strength at the center of the charger coil (and a magnetic attractor at the center of the receiver coil for alignment), care must be taken in the polarity of the ring magnet attached to the case so that the case receiver would continue to align and center on the charger and not repel each other. Since a ring magnet of larger diameter is used here, addition of this magnet in fact enhances and adds in the centering by providing further tactile feedback and pull force to the user when the receiver is placed on or near the charger magnet of a smaller diameter in the charger thus enhancing the centering process with the standard WPC-compatible charger. On a position-free charger with a switching layer, the polarity (N-S orientation) of the magnet is not important for the switching layer since it responds to the magnitude of the total field (DC/AC switching magnetic field+AC wireless power magnetic field) so the choice of polarity is not important. This however, does become important if a bias DC magnetic field by a permanent or electromagnet is added to the charger as described earlier to lower the receiver magnetic field necessary to switch the layer.

Similarly, a magnet or magnets can be attached or added to the inside, backside or on the top surface of the cases, battery doors, skins, devices, batteries or back sides or batteries at the right location with respect to the receiver coil to enable a regular tightly coupled receiver to operate in a position free magnetic aperture system as well.

In accordance with an embodiment, such an addition or attachment can therefore be used to enhance the usefulness of wireless power receivers integrated into various products such as cases, skins, devices, doors, back plates, or batteries by adding or attaching one or more appropriate magnets of the appropriate size, strength, and shape to enable the receiver to operate with a position free magnetic aperture charger. This may take the shape of a thin, light weight sticker or adhesive part or logo that is adhered by the user or in the manufacturing process to the right location on or in the case, skin, battery door, back plate, or battery to enable this additional functionality. Considering that the magnet may be a very thin and/or flexible magnet, this can be also made to be quite inconspicuous and to add very little to the thickness of the device and/or receiver. As described earlier, a variety of types of magnets and even multi-pole magnets may be used. In conditions such as charging inside automobiles, airplanes or other vehicles, trains or boats where the receiver experiences rapid motions, acceleration or deceleration, the combination of the magnet and the ferrite switching layer provides an additional benefit that the attraction between the magnet and the layer provides a magnetic attraction that can keep the device from unnecessary slipping during motion and this may be quite advantageous.

In any of the examples given above, the ring magnet and its variations including the gap are described only by way of example. In accordance with other embodiments, it is also possible to achieve the same or a similar effect with use of any appropriate one or several permanent magnets or electromagnets of arc, disc, cylinder, square, rectangular, triangular, oval, or ring, etc. shape, magnetization orientation and magnetic flux density pattern. As described above, it is important to optimize the type and structure of the material and the DC switching magnetic field appropriately to achieve optimum saturation. The use of anisotropic or multi-layer switching layer also provides further flexibility and design possibilities. Since a particular type of magnet and field strength may be required to open the aperture (in conjunction with the magnetic layer), it is therefore unlikely that a casual or accidental placement of a magnet by a user will open this aperture. Furthermore, if such an aperture is opened, the system with receiver communication and/or feedback can be designed to require a communication signal to verify presence of a receiver and continue providing power. Therefore, the systems described here can be implemented in an extremely robust and safe manner.

For ease of illustration, the switching layer was described above as one layer in many of the above descriptions. In accordance with various embodiments, such as for manufacturing and/or performance reasons, it may be desirable for the switching layer to be actually made of multiple active layers. For example, the FineMET® sheet material may comprise one, two or more layers of active Ferromagnetic material sandwiched between adhesive or backing layers. This is done to accommodate the thin nature of the basic manufactured layer while providing sufficient performance and overall active layer thickness. In general, the multiple layers of the switching layer (sheet or material) of soft and/or hard magnetic material may be similar or different to improve performance and characteristics. Interesting and useful effects may be achieved by using exchange coupling between the layers as used in magnetic recording layers.

It is also possible to operate a receiver designed for tightly coupled operation in a Magnetic Coupling configuration as described earlier. Since tightly coupled systems contain resonant circuits in the receiver, by appropriate design of the charger and the magnetic layer, position free operation of the tightly coupled receiver such as a WPC receiver on an MC charger is possible.

An additional observation is that in the MA configuration, with a receiver containing an appropriate magnet placed on the charger surface, the magnetic aperture is opened as described above. The inventors have experimentally observed that a second receiver (with or without magnet) placed on top of the first receiver at distances of an inch or more apart from the first receiver coil also receives substantial amount of power if no or minimal shielding is incorporated behind the first receiver's coil. In accordance with an embodiment, the amount of power received is larger than received by a receiver coil placed at such a distance from the charger surface when a magnet placed near the surface opens an aperture. This is an indication that, in accordance with some embodiments, the coil and/or circuit from the first receiver (close to the charger surface) acts as a resonant repeater as described earlier and the second receiver coil (from the receiver not requiring a magnet farther away and above the first receiver) can be designed to interact and resonate to extend the power to larger distances from the surface. This important and useful effect demonstrates that, in accordance with various embodiments, multiple receivers can be stacked (possibly to several receivers and many inches high) from the charger surface and all the receivers may be powered and or charged simultaneously. It also demonstrates that once a magnetic aperture is opened, the power from the aperture can be effectively guided or extended far above the charger surface. By using smaller or larger dimension coils along this path, the magnetic field physical dimension can be expanded or contracted as in a column of power from the aperture. By use of different coil turns and dimensions, different power levels and/or voltages can be extracted from this column at different positions.

The system described here, thus provides a 3-dimensional power outlet that allows the user to extract power at different locations on the surface and vertically above the charger surface. Interesting and useful applications of this approach for powering products or power distribution can be envisioned. Such a system may also be used within an electric or electronic product to distribute different power or voltages to different locations.

For example, it would also be possible to develop multi-voltage and/or multi-power power supplies where different vertically stacked power receiver coils extract the appropriate power and voltage from a common primary (charger) coil. For fixed power supplies (where the receiver does not need to be physically removed), use of a switching layer may not be necessary since the x-y dimension flexibility is not required. Thus a charger coil and multiple vertically stacked receiver coils may be used.

In accordance with some embodiments, it may not be desirable to have the magnetic field extend beyond the first receiver. As described earlier, use of appropriate ferromagnetic, shielding, and/or metal layer behind any of the receiver coils can suppress this field reducing any potential effect of the magnetic radiation on nearby devices, objects, or living tissue. So the field extending in the z direction can be manipulated not to produce undesirable results. In accordance with some embodiments, it may also be possible to route the magnetic field past sensitive parts and have it then extend beyond the device to the next device without affecting the parts to be shielded. For example in the case a charger for multiple mobile phones is developed that allows stacking of the phones on the charger, the first receiver coil and magnet closer to the mobile device would open the aperture in the charger and provide power to the first receiver. This can be followed by a structure of ferrite and/or metal layer that protects the sensitive electronics of the mobile phone or any metal layers from the magnetic field but routes it above the first mobile device or phone to reach a second device's receiver coil and power that and so on and so forth, thus simultaneously powering multiple stacked mobile devices and yet shielding the electronics inside them.

While the above description is provided for the MA configuration, it also applies to the MC configuration or a combination of MA and MC chargers and receivers can be combined.

As described earlier, in accordance with an embodiment, the charger can be implemented so that it is able to decode and implement multiple communication and regulation protocols and respond to them appropriately. This enables the charger to be provided as part of a multi-protocol system, and to operate with different types of receivers, technologies and manufacturers.

To implement this, at the initial stage, the Charger may send out a ping signal at a frequency that is known to be able to power the multiple types of protocols in existence and then "listen" for a response. If the frequency range of the potential types of receivers is very wide (e.g. from kHz to MHz) it may be necessary to change the resonant frequency by changing the coupling capacitor. For example, the system may be designed so that a number of resonant capacitors such as C1 in FIG. 2 are connected through switches in between the drive circuit and the coil so that the resonant condition can be changed over a wide range. The charger can switch in a capacitor and couple to the coil through that capacitor, apply power (ping), listen for a response or check for current draw due to a receiver and if no response is detected, move to switch in another capacitor, apply power (ping), look for a response, etc. to ensure all possible protocols and possible receiver types have been interrogated.

As shown in FIG. 10, in one protocol, after the receiver sends back a communication signal back to the charger, in response to it, the charger adjusts its frequency (to get closer or further from resonance and power transferred) and then awaits further information from the receiver. The receiver acknowledges the change and as shown in the second data packet in the receiver signal, has modified its state and communicates back to the charger. This closed loop continues during the charging process.

One of the issues in developing multi-protocol systems is that the operating frequency of the different systems and protocols may be sufficiently different (e.g. from kHz to MHz) that the charger system may not achieve resonance with the receiver in the frequency range possible with the charger coil and the resonant capacitor used and therefore efficient operation with the receiver nearby can't be achieved. To solve this problem, the system may be designed so that a number of resonant capacitors such as C1 in FIG. 2 are connected through switches in between the drive circuit and the coil so that the resonant condition can be changed over a wide range. One method to overcome this is shown 560 in FIG. 43 where to achieve larger operating frequency range, the charger may contain a series of capacitors (C1 . . . Cn) and switches (S1 . . . Sn) under microcontroller control MCU1 to switch in and out the appropriate values of resonant capacitance in series or parallel to the charger coil inductance L1 to have a resonant frequency in the range appropriate for different protocols. In idle condition with no receiver nearby, the charger MCU1 may periodically power up and sequentially connect the appropriate capacitance value through S1 to Sn switches and then start powering the coil L1 by switching the AC switch S at the appropriate ping or interrogation frequency. If an appropriate receiver is nearby and is powered by the charger, it would respond back and the signal can be detected by the current detection and demodulation circuit in the charger and appropriate action can be taken by MCU1 to verify and/or continue charging/apply power at the appropriate power level by changing the switching frequency and/or duty cycle, and/or changing the input voltage level to the switch S which is switched rapidly to generate the switching frequency. If no response is received, either no receiver is nearby or it operates at a different protocol or frequency and the Charger MCU would proceed to check for a receiver at a different protocol or frequency by interrogating at a different frequency range or if necessary, switching in a different or additional capacitor before proceeding with the ping as described above. The charger would continue interrogation/pinging at different protocols until a receiver responding to one is found to be nearby and then moves to apply power appropriately and based on decoding the signal pattern of the receiver to proceed with the appropriate algorithm/protocol to continue power application.

FIG. 44 shows the system of FIG. 43 implemented in a resonant Converter architecture 570. The microcontroller MCU1 adjusts power to the coil L1 by adjusting Vin, the frequency, or duty cycle of the generated AC voltage or a combination thereof and generate the desired signal by switching Q1 and Q2 transistors. MCU1 also controls switches S1 through Sn to connect appropriate resonant capacitors to achieve a wide range of resonant frequencies. It must be noted that in a charger with different sections to charge different devices as shown in FIGS. 40 and 41, the different sections can operate at different frequencies or protocols as described above since they are independent.

In addition or instead of changing the resonant capacitor, it may be also possible to have different charger coils that are constructed of PCB or wire or Litz wire or a combination of such coils and have different turns, diameters, number of layers, construction, etc. in the entire charger pad or a subsection of the charger that can be switched in and out of the electrical path in the charger to achieve optimum power or communication coupling between the Charger and Receivers of different protocol, voltage, or power levels The added cost of inclusion of such additional coils or capacitors and possibly the extra complexity in the Firmware in the Microcontroller may be quite small but allow much more flexibility and interoperability with different receivers of different protocol, power, or voltage in these cases.

The same procedure or a subset of this can also be adopted for cases where communication is accomplished by other means than communication through coil such as RF or optical, etc. or in cases where different frequencies and also communication paths (through coil, through optics, and/or through RF) are employed in the different protocols. In this manner a multi-protocol architecture that is adaptable to many systems, powers, and/or voltage levels can be implemented.

Alternately, the receiver can be designed or implemented to accommodate different types of chargers or be multi-protocol. For example, once a receiver is awakened by a charger, it can try to detect the ping or the operating frequency used by the charger. This can be done by any number of phase locking or other frequency detection techniques. Alternately, the receiver can send back a variety of trial communication signals during ping process to establish which type of device is performing the ping. Once the type of the charger is established, the receiver can proceed and communicate with the appropriate communication protocol and frequency with the charger.

Another advantage of an architecture such as FIGS. 39(c) and 39(d) or FIGS. 40 and 41 is that in the position free systems (loosely coupled and magnetic aperture) the power transfer efficiency of a system in general decreases with the surface area of the charger. It may be therefore advantageous to subdivide a large area charger into smaller sections and by detecting the receiver's placement on this section through in coil or separate coil communication, RF, mechanical, optical, magnetic or weight detection, etc. and only activate the section where a receiver is placed to enable higher efficiencies or output powers. Of course this can be combined with verification, etc. to provide further security and safety in these conditions.

Figure 45:
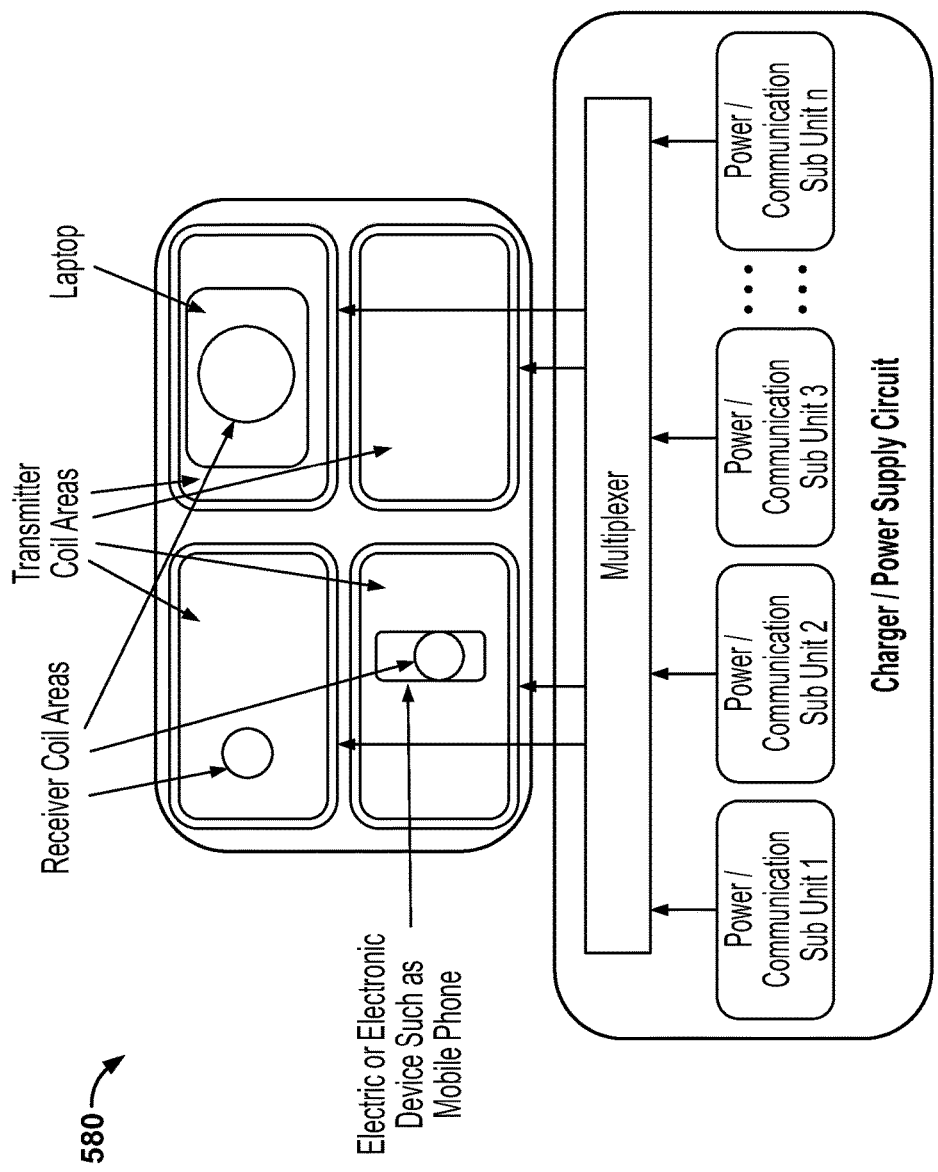
FIG. 45 illustrates a geo-cast architecture, in accordance with an embodiment.

FIG. 45 shows a geo-cast architecture 580 (similar to FIGS. 39(c) and (d) where a number of charger power and/or communication sub-units are connected through a multiplex system to the coil or coils in each section and can be connected to each section to support receivers placed in each. In a variation of this with multiple sub-units driving a single or multiple coils in a single section, multiple receivers may also be charged or powered in each section. To implement this architecture effectively, it may be necessary to have multiple coils of the same or dissimilar pattern cover the same area of a sector. For example, multiple coils patterns of shape shown in FIG. 12 or other shape/size can be stacked on top of each other under the charger top surface and connected to the multiplexer so each can be individually driven. Each coil may be designed to have different number of turns and/or shape or pattern to be more advantageous for powering different receiver types (protocols), powers, and/or voltages. Each of the coils may be driven at a different frequency and operate one at a time or simultaneously to provide power to one or more receivers placed in that sector with different protocols, power, or voltage levels. It must be noted in magnetic coupling or magnetic aperture charger geometries that the charger AC magnetic field generated in the magnetic/switching layer would be an addition of the magnetic fields from different drivers and/or coils and/or frequencies and while all receivers with appropriate resonance and/or magnets or other parts would sense the AC magnetic field in the magnetic/switching layer, only receivers that are designed to operate at a particular frequency range or tuned to that frequency intentionally would have power coupled out to them. Thus an individual virtual path (channel) for power transfer and/or communication between the appropriate sub-unit and receiver would exist. Inclusion of a parallel or series resonant capacitor in the receiver and tuning would enhance this strong dependency on the frequency and enable such independent channels to operate simultaneously.

In addition, in such architectures, it is possible to increase the amount of power delivered to a device in any section by multiplexing power from sub-unit drivers or operating multiple coils in that section (displaced vertically—i.e. stacked; or laterally—i.e. side by side) simultaneously to increase the AC magnetic field in that section. In order for this addition from multiple coils to add constructively, it may be necessary to keep the phase of the sub unit drive circuits in phase with each other. This can be easily achieved by controlling the control signal to the drive circuit from the microcontroller in the charger (MCU1).

Moving to architectures where higher degrees of flexibility in the positioning is achievable, FIG. 46 shows possible architectures for full positioning freedom 600. FIG. 46(a) shows a charger which broadcasts power to a number of receivers placed anywhere on its surface. In the simplest case, the charger may broadcast power in an open loop geometry to one or more receivers which may or may not regulate the received power and deliver it to a load. Presence of one or more loads near or on the charger can be detected by the charger being brought into resonance by presence of one or more receivers and an increase in input current. Techniques such as periodic pinging of power can be used to detect the presence of receivers. In more controlled architectures, the receiver and or the receiver in combination with the charger establish some form of communication and control protocol to control and/or regulate the output power, voltage, or current from each receiver. In the case shown in FIG. 45 (a), all receivers operate with the same protocol and require the same voltage and power level. In FIG. 46(b), the charger powers or charges multiple receivers that may operate in different protocols, and/or have different voltage and/or power requirements. FIG. 46(c) In this architecture, different sub-units and/or coils in the charger power or charge receivers with different protocols, voltage and/or power levels placed anywhere on a charger. And finally in FIG. 46(d), each sub-unit and/or coil in the charger is responsible for up to one receiver on the charger. Each sub-unit and/or coil may be multi-protocol, support different voltages, and/or powers. The maximum number of receivers that can be powered or charged on a charger is the same as the number of sub-units.

It must also be noted that it is possible to provide a system that can operate in any of the modes shown in FIG. 39 as well as a mode or architecture in FIG. 46. For example, it may be possible to have a charger that contains 3 sets of coils and drivers and communication sub-units configured to operate as in FIG. 39(d) to provide charging for up to 3 receivers operating in different voltages, powers, or protocols simultaneously with each receiver being limited to a certain surface area of charger only (similar to shown in FIG. 39) so no more than one receiver can be placed in each area. At the same time, the charger can for example have a large coil covering the entire or majority or a section of the charger surface that allows the charger to simultaneously or at different times power one or many receivers operating in a different protocol placed at any location on the charger such as in FIG. 46(a) or 46(b) by broadcasting power and receiving it on this particular type or types of receivers. This may be achieved by having different coils and/or power driver/communication circuits power the different parts or multiplexing the same coil and/or power driver/communication circuit to function in the different modes. In an embodiment, the 3 coils to achieve the operation for mode shown in FIG. 39(d) (Multi-protocol Geo-cast) are in one physical layer behind the charger top surface and/or the magnetic switching layer and the coil or coils to achieve the mode shown in FIG. 46(a) or 46(b) are in another layer. These may be PCB, wire, or a combination of PCB and wire coils. The 2 modes mentioned here are only by way of example. Obviously, even more simultaneous modes of operation or different modes allowing simultaneous interoperability or support for many modes of operation are possible.

In accordance with an embodiment, to implement the architectures in FIG. 46, a number of methods for communication and/or regulation of power can be used.

In many wireless power/charger systems, it is desired to control the output power, voltage, or current from a receiver. In many cases where the receiver is used to power or charge a device, it is necessary to keep the output voltage constant as the impedance of the device changes. In other cases where the output is used to charge a battery, it may be beneficial to adjust the output voltage in a pre-determined or pre-programmed manner as the impedance of the battery is changed. FIG. 8 is an example of such a charging profile. To achieve such a result, a regulator comprising buck, boost, buck-boost, flyback, or linear type can be incorporated into the receiver output stage. In order to operate efficiently, it is desirable for any wireless charger system to be designed so that as the output current is reduced (higher load resistance), the input power draw by the charger and the output power of the receiver is reduced. It is found that in many cases, a higher load resistance (lower output current), shifts the resonance curve of the system (output voltage or power vs. Frequency) to the lower frequency. In such cases, especially for systems where the frequency and/or duty cycle of the charger power signal is not changed during charging, the system must be operated at frequencies higher than the resonance peak so that as the battery connected to the receiver is charged and the current drawn decreases, less power is delivered by the receiver and also drawn from the input power source to the charger avoiding unnecessary heating/over voltage at the receiver regulator and efficient operation throughout the charging profile.

In addition, the output voltage of the receiver coil may be measured and its value or the difference between its value and the desired value may be reported to the charger to adjust one or many parameters such as voltage, duty cycle, and/or frequency of the charger signal to bring the voltage from the coil to within an acceptable range. Methods for such communication and control have been described earlier. However, such a closed loop may not be able to provide rapid adjustment of the power to transients and the optional output regulator stage can provide another level of regulation to provide faster performance. FIGS. 2, 3, 4, 6, 42, 43, and 44 show systems where this optional output regulator stage is included. In an embodiment here with a multi-receiver system such as architectures shown in FIG. 46 and developed with loosely coupled or magnetic coupling or magnetic aperture technology, a regulation stage in the receiver can be used to provide the output power to the device or battery. This regulator may or may not be in addition to any communication, active feedback and/or control to control the output from the receiver coil to the regulator. Systems such as shown in FIG. 46(a) or 46(b) may use such a regulation in the receiver to provide appropriate output power to devices and batteries.

Figure 47:
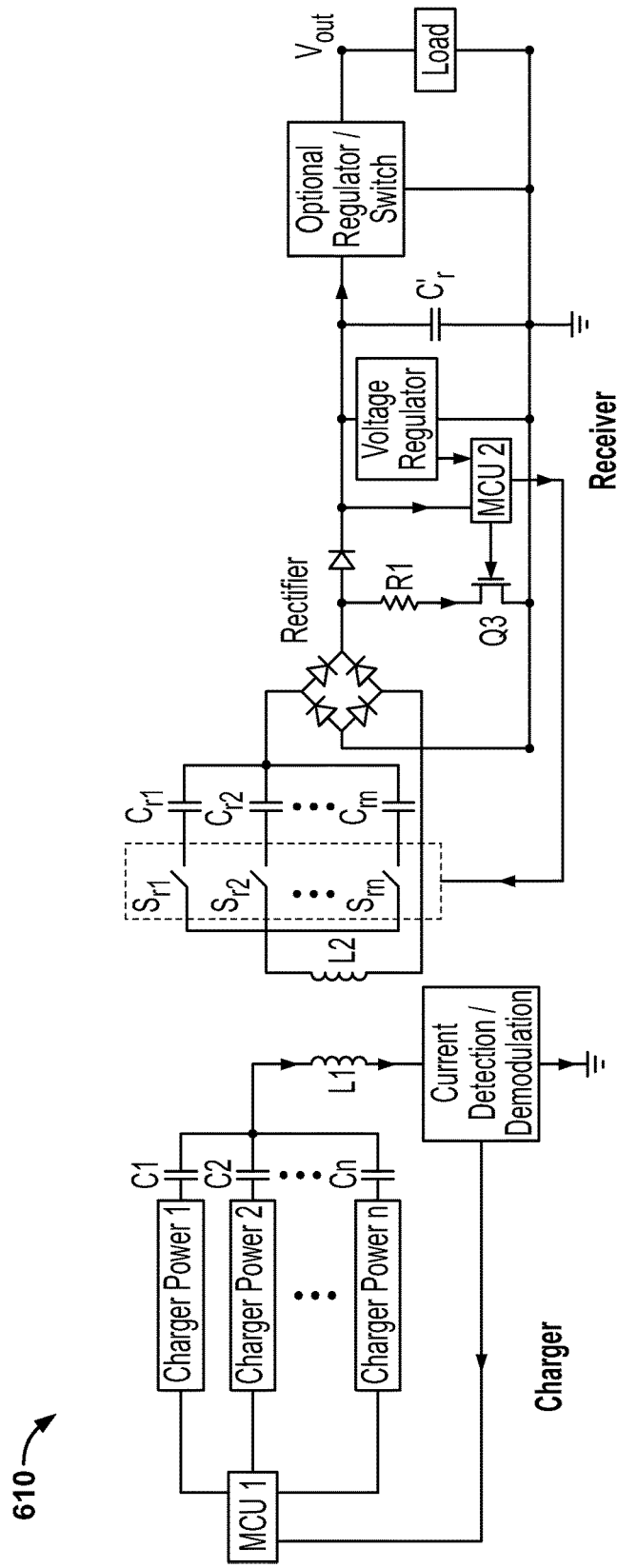
FIG. 47 illustrates a multi-receiver system, in accordance with an embodiment.

In a multi-receiver system such as shown 610 in FIG. 47, presence of one receiver may also influence the power delivered to other receivers. This effect has been observed previously (Zhen Ning Low, Joaquin Jesus Casanova, and Jenshan Lin, Advances in Power Electronics, Volume 2010, PP 1-13) where 2 receivers were connected directly to individual variable resistors and the individual and combined performance of the power transfer was studied. In the above references, it was noted that the power delivered to one receiver was not affected by another receiver placed on a loosely coupled charger as long as the load resistance for the second receiver was greater than a certain value (40.OMEGA. in this case). In this method, the input impedance of the receivers is designed to be high to allow operation of the system with no or minimal interference between 2 or more receivers. Using regulators in the output stage to control the output power, it is necessary to select the appropriate regulator and design the overall system so that the interaction due to presence of multiple receivers is minimized or eliminated. Loss of efficiency due to the regulation stage can be minimized by using switching regulators that can have very high efficiencies. In addition, any inductor for the switching regulator can be similarly integrated into the printed circuit board of the receiver or on the magnetic material used for the shield or another magnetic component in the receiver to provide lower cost, smaller size, or further integration.

Furthermore, the receivers can communicate with the charger by in-band (modulating the power signal such as load modulation) or out of band (Separate RF, optical or other) communication and can be uni-directional or bi-directional. This communication can validate the receivers, provide info about the power requirement, output voltage, power, temperature, state of charge, foreign object detection (metal in between charger and receiver) or other fault conditions. The charger can act on this info by adjusting the overall power transmission frequency, duty cycle or voltage input to the switching stage to bring the overall output to a range to provide sufficient power to the multiple receivers. The charger can also decide to terminate charge, declare a fault condition or take other actions.

For example if in-band communication is used, this can be achieved by load modulation as described earlier or through a separate RF, optical or other method. To avoid collision between messages being sent from different receivers acting independently and transmitting messages to a charger, the interval between message transmission packets from the receiver can be pre-programmed to be random, semi-random, or have a pattern to allow the charger to be able to distinguish between messages from each receiver without confusion about its origin or corruption of the message. If two messages from 2 receivers are received by a charger at the same time, it can ignore the messages and wait for the next transmission from those receivers until a valid transmission is received.

Figure 48:
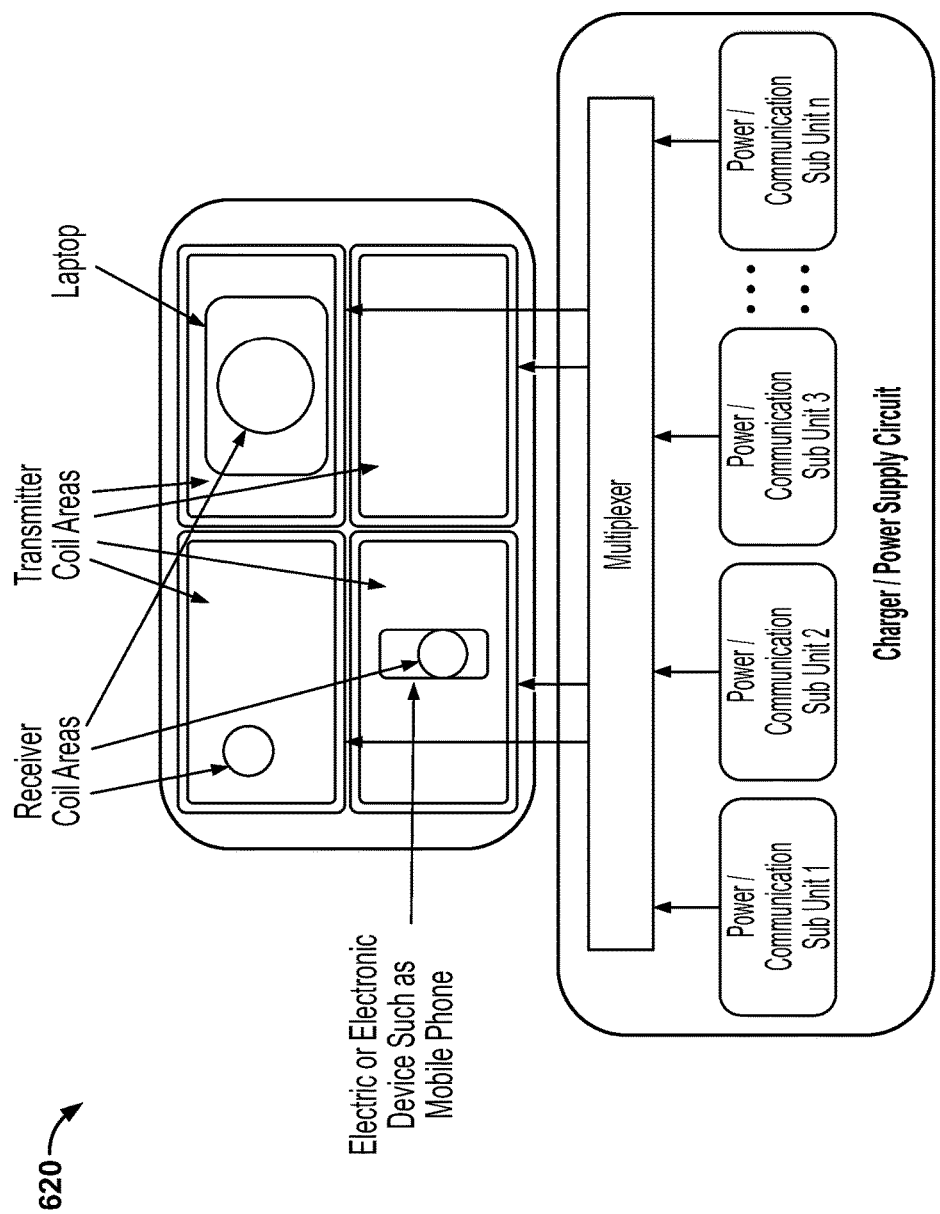
FIG. 48 illustrates the use of multiple charger sections, in accordance with an embodiment.

As described above, charger surfaces with sizes of up to 18.times.18 cm with loosely coupled, Magnetic Aperture or Magnetic Coupling technology have been tested and provide high efficiencies and power transfers to multiple receivers. In certain applications, it may be desirable to have even larger charger areas, for example, a full table top or surface (such as kitchen counter, etc.) that is fully active and can charge or power multiple devices placed anywhere on its surface. To enable such an embodiment and retail high efficiency, uniformity, or power transfer, it may be necessary to use multiple charger sections 620 as shown in FIG. 48 that are tiled to be adjacent or overlapping to provide a continuous active surface. In cases that some gap between the charger coils exist, if the receiver coil area is larger than this gap, the existence of the gap would not pose a non-uniformity problem. The sections may be driven by one charger, in parallel by one charger circuit or by multiple drive circuits or have a multiplexer that connects charger circuits possibly with even different protocols or power levels to different sections as needed.

Another method of regulating the output voltage of a wireless charger receiver has recently been demonstrated by Seong-Wook Choi and Min-Hyong Lee, ETRI Journal, Volume 30, PP 844-849. In FIG. 49 a simplified system 630 for wireless transmission of power with constant output voltage is shown. A capacitor C2 is added in parallel in the charger. The system is operated at slightly higher frequency than the resonance at an optimum frequency that can be calculated. With the optimum frequency determined, the value of C2 can be optimized to minimize the current in the charger coil and optimize transfer efficiency. It can be shown that by choosing the values of capacitors C1, C2 and $C_r$ appropriately, constant voltage $V_1$ regardless of the load value can be obtained. The output stage regulator and/or switch are optional and are another safety/reliability measure that can be added if needed. For cases where the output is charging a battery directly, the output regulator would provide the necessary output voltage profile for the particular type of battery as for example shown in FIG. 8 earlier. In the simple geometry shown in FIG. 49, no communication and/or feedback between the receiver and charger is assumed. Optionally, the charger may include a means of measuring the current through the charger coil and using it to determine the number of receivers on the charger or presence of a receiver or fault conditions. An optional microcontroller detects this current and controls the drive circuitry.

The optimum frequency in the geometry above is dependent on the coupling coefficient between the charger and receiver coils and therefore the gap between the charger and receiver coil. In practice a system that is more robust may be needed. Presence of multiple receivers may also require adjustment of the frequency or other operating conditions of the system. Furthermore, fault or end of conditions or other information may need to be relayed back to the charger. FIG. 50 shows a system 640 that is similar to the system of FIG. 49 but with a simplified communication and feedback channel added. Such a system may provide more functionality and a closed loop system in addition to the inherent design to provide constant voltage $V_1$ regardless of coupling coefficient variations and affects of coil to coil distance, etc. therefore providing a more robust system.

In cases where direct communication or control and/or regulation between the receiver and charger are necessary or desired (such as architectures in FIGS. 46(c) and 46(d), this may be achieved by using a different frequency and/or charger or receiver coil to provide separate communication and/or power channels to individual receivers and/or groups of receivers. In addition, such techniques and/or Frequency Division Multiplexing (FDM) may be used to communicate and/or power devices using different protocols or no protocols at all (where the receiver does not communicate and receives power passively when placed on a charger). As shown in FIG. 47, one or more charger units operating at same or different frequencies can drive one or multiple charger coils that may cover the same physical area or cover different distinct regions of the charger surface. In the receiver, by closing the appropriate switch $S_{r1}$ to $S.s_m$, the receiver can tune to receive power from the power and/or communication channel for itself or its group of receivers. In the charger, the communication back from each receiver or types of receivers is demodulated at a different frequency of its communication or in a Time Division Multiplexed method and regulation or adjustment of power or other changes to power or termination for that device or group of device is carried out. While in FIGS. 43, 44 and 47, adjustment of resonant frequency by changing of the capacitor is shown, any change to impedance of the charger or receiver circuit would provide a shift in the optimum charging frequency as shown in FIG. 14. It is therefore possible to use inductive or capacitive components in the charger and receivers to shift the optimum power transfer frequency.

Figure 51:
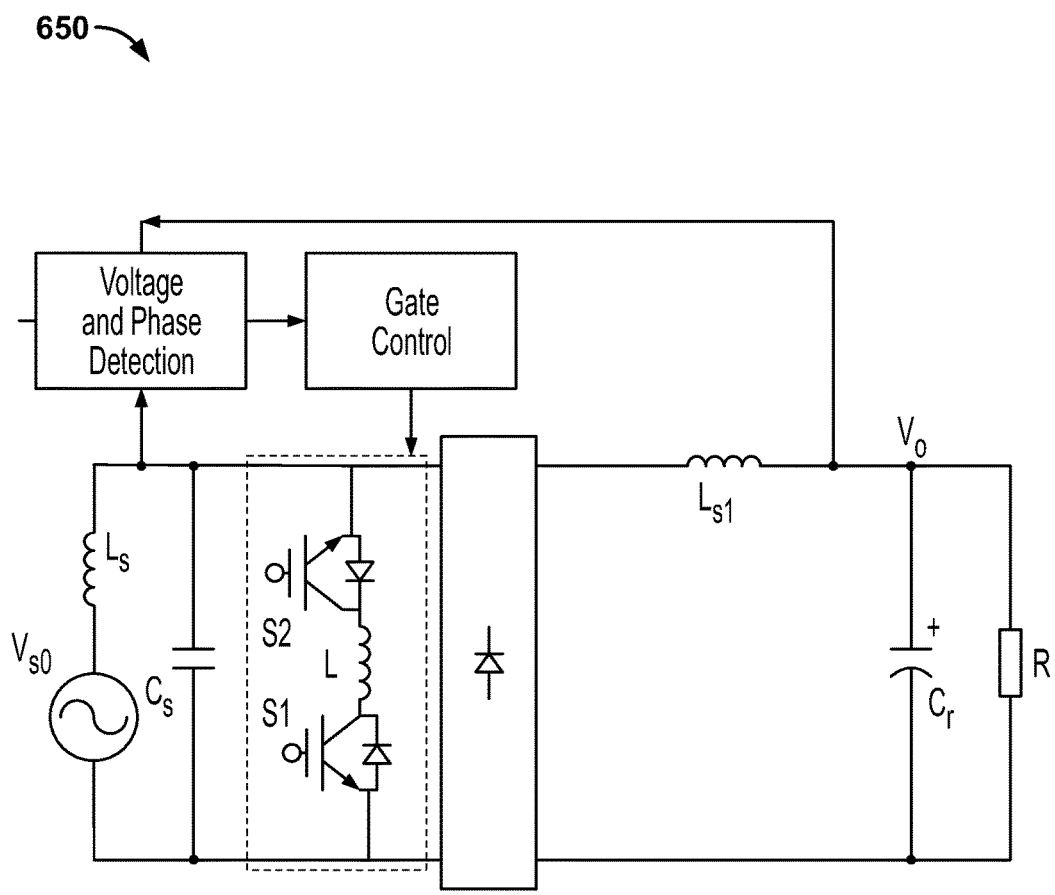
FIG. 51 illustrates use of a variable inductor in parallel to the charger and/or receiver coil, in accordance with an embodiment.

In U.S. Patent Application Nos. 2008/0211478, 2007/0109708, and 2008/0247210, methods for regulation of output power that depend on charger and/or receiver based regulation are described. The main method used (shown 650 in FIG. 51) introduces a variable inductor in parallel to the charger and/or receiver coil that can be optimized to adjust the frequency and/or phase of the power transfer to the output stage. The current through the inductor is adjusted by a phase and voltage detection and control circuit to adjust the control voltage to the transistor gates and use the transistors to adjust the current through the variable inductor and regulate the output. Similar performance may be achieved by using a variable capacitor.

In an embodiment described here, the inductance in the receiver and/or charger is adjusted by using multi-tap coil(s) (with PCB or Litz wire coil) and by adjusting the length of the coil used and therefore the related inductance (as well as the coupling between the receiver and charger coils) by connecting or disconnecting switches to change the resonance condition of the system and therefore control the output power. Thus regulation of the output power could be realized by the receivers or chargers. In particular, it would be beneficial to perform the regulation completely by the receivers individually and independently.

It can be readily appreciated that in the above descriptions many geometries and systems have been described. In practice, one or several of these systems can be used in combination in a charger and/or receivers to provide the desired performance and benefits.

The above description and embodiments are not intended to be exhaustive, and are instead intended to only show some examples of the rich and varied products and technologies that can be envisioned and realized by various embodiments of the invention. It will be evident to persons skilled in the art that these and other embodiments can be combined to produce combinations of above techniques, to provide useful effects and products.

Some aspects of the present invention can be conveniently implemented using a conventional general purpose or a specialized digital computer, microprocessor, or electronic circuitry programmed according to the teachings of the present disclosure. Appropriate software coding can readily be prepared by skilled programmers and circuit designers based on the teachings of the present disclosure, as will be apparent to those skilled in the art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. For example, the invention may include or exclude elements set forth above. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

All patents, patent applications, and publications mentioned herein are hereby incorporated by reference to the fullest extent possible not inconsistent with the above disclosure.

What is claimed is:

1. A system for use in wireless charging or wireless powering, comprising:
   a base for wirelessly charging or wirelessly powering; and
   a receiver receiving electricity wirelessly from the base, the receiver associated with a battery or device,
   wherein the base or the receiver is capable of detecting and operating under a plurality of power protocols or a plurality of charging protocols that require different base operation frequencies or messages between the base and the receiver, thereby allowing the base to transfer electricity wirelessly to the battery or device in a manner consistent with a common charging or common power protocol shared between the base and the receiver of appropriate form factors.

2. The system of claim 1, wherein the receiver is associated with a battery wirelessly charged by the base.

3. The system of claim 1, wherein the receiver is associated with a device wirelessly charged or powered by the base.

4. The system of claim 1, comprising a plurality of receivers, each receiver capable of receiving electricity from the base, and each receiver associated with a different battery or a different device.

5. The system of claim 4, wherein the different batteries or devices have a common charging or a common power protocol.

6. The system of claim 4, wherein at least one battery or at least one device has a charging or power protocol that is not common to another battery or to another device of the system.

7. The system of claim 1, wherein the base transfers electricity wirelessly with an efficiency of at least about 40%.

8. The system of claim 1, wherein the base or the receiver include a coil optimized to operate efficiently with different protocols.

9. The system of claim 1, having coils in the base or in the receivers, the coils being switched between electrical paths or being switched or tuned by capacitors or inductors to achieve efficient power or efficient charging operation.

10. The system of claim 9, wherein the plurality of protocols include at least one of a Wireless Power Consortium protocol, a Power Matters Alliance protocol, an Alliance for Wireless Power protocol, or an Apple protocol.

11. The system of claim 1, wherein the protocols use different power transfer frequencies, or different charging methods that allow for presence detection for the device, battery or base.

12. The system of claim 11, wherein the charging methods between the receiver and the base includes communication through a coil as used for transfer of power, through a separate coil, through an RF or optical link, or through a means involving RFID, Bluetooth, WiFi, Wireless USB, NFC, Felica, Zigbee or Wireless Gigabit (WiGig).

13. The system of claim 1, wherein the battery or the device is not charged or powered by the base in a wired manner.

14. The system of claim 1, wherein the base has a substantially flat surface on which a battery or a device may be placed for charging or powering.

15. The system of claim 1, wherein the base has a substantially non-flat surface for interfacing with a battery or a device to be charged or powered.

16. A unit of a system for use in wireless charging or wireless powering, comprising:
   a base for wirelessly charging or wirelessly powering a receiver receiving electricity wirelessly from the base, the receiver associated with a battery or device,
   wherein the base is capable of detecting and operating under a plurality of power protocols or a plurality of charging protocols that require different base operation frequencies or messages between the base and the receiver, thereby allowing the base to transfer electricity wirelessly to the battery or device in a manner consistent with a common charging or common power protocol shared between the base and the receiver of appropriate form factors.

17. The unit of claim 16, wherein the base is capable of wirelessly charging or powering a plurality of receivers simultaneously.

18. The unit of claim 16, wherein the base is capable of transferring electricity wirelessly with an efficiency of at least about 40%.

19. The unit of claim 16, wherein the plurality of protocols include at least one of a Wireless Power Consortium protocol, a Power Matters Alliance protocol, an Alliance for Wireless Power protocol, or an Apple protocol.

20. A unit of a system that includes a base for use in wireless charging or wireless powering:
   a receiver receiving electricity wirelessly from the base, the receiver associated with a battery or device,
   wherein the receiver is capable of detecting and operating under a plurality of power protocols or a plurality of charging protocols that require different base operation frequencies or messages between the base and the receiver, thereby allowing the base to transfer electricity wirelessly to the battery or device in a manner consistent with a common charging or common power protocol shared between the base and the receiver of appropriate form factors.

* * * * *